(12) United States Patent
Gangumalla et al.

(10) Patent No.: US 12,470,166 B2
(45) Date of Patent: Nov. 11, 2025

(54) MOUNTING DEVICES

(71) Applicant: Unirac, Inc., Albuquerque, NM (US)

(72) Inventors: Deepthi Gangumalla, Hyderabad (IN);
Nikhil Babu P, Hyderabad (IN)

(73) Assignee: Unirac, Inc., Albuquerque, NM (US)

( * ) Notice: Subject to any disclaimer, the term of this patent is extended or adjusted under 35 U.S.C. 154(b) by 67 days.

(21) Appl. No.: 18/456,078

(22) Filed: Aug. 25, 2023

(65) Prior Publication Data

US 2025/0070708 A1 Feb. 27, 2025

(51) Int. Cl.
*H02S 20/22* (2014.01)
(52) U.S. Cl.
CPC .................... *H02S 20/22* (2014.12)
(58) Field of Classification Search
CPC ........................................ H02S 20/22
USPC ....................................... 248/205.1
See application file for complete search history.

(56) References Cited

U.S. PATENT DOCUMENTS

| 2,187,974 | A | * | 1/1940 | Johnson | A47J 31/44 |
| | | | | | 248/314 |
| 8,806,815 | B1 | * | 8/2014 | Liu | F24S 25/615 |
| | | | | | 52/173.3 |
| 8,839,575 | B1 | * | 9/2014 | Liu | F24S 25/613 |
| | | | | | 52/173.3 |
| 9,151,519 | B2 | * | 10/2015 | Esken | F24S 25/613 |
| 9,595,911 | B2 | * | 3/2017 | McPheeters | F24S 25/613 |
| 9,791,096 | B2 | * | 10/2017 | Mahoney | F16B 5/02 |
| 10,663,195 | B2 | * | 5/2020 | Ash | H02S 20/23 |
| 2015/0060619 | A1 | | 3/2015 | Krannich et al. | |

FOREIGN PATENT DOCUMENTS

EP 2828588 B1 12/2019

OTHER PUBLICATIONS

IronRidge, "All Tile Hook," cut sheet, version 1.0, 2018, 2 pages.
IronRidge, "All Tile Hook," downloaded from https://www.ironridge.com/mobile-landing/all-tile-hook/ on Jul. 25, 2023, 2 pages.
K2 Systems, "K2 SingleRail System with roof hooks," Assembly Manual, 2023, 28 pages.
K2 Systems, "Roof Hook SingleHook 3S," downloaded from https://catalogue.k2-systems.com/roof-hook-singlehook-3s/2003215 on Jul. 25, 2023, 3 pages.
QuickBolt, "All Tile Roof Hook for Side Mount Rails; Adjustable," AHJ Condensed Permit Package, version 8, 2023, 31 pages.

(Continued)

*Primary Examiner* — Anita M King
(74) *Attorney, Agent, or Firm* — Lee & Hayes, P.C.

(57) ABSTRACT

A mounting device may include a hook arm including a first vertical portion, a center portion coupled to the first vertical portion at a first end of the center portion, and a second vertical portion coupled to the center portion at a second end of the center portion. The mounting device may also include a hook plate coupled to the hook arm at the second vertical portion via a fastener. The hook plate may include a third vertical portion and a base portion to couple the hook plate to a surface. The mounting device may further include an anti-rotation system to restrict rotation of the hook plate relative to the hook arm.

20 Claims, 45 Drawing Sheets

(56) References Cited

OTHER PUBLICATIONS

QuickBolt, "Height Adjustable All Tile Roof Hook for Side Mount Rails 17587," downloaded from https://quickbolt.com/product/17587#details on Jul. 25, 2023, 4 pages.

SnapNrack "Adjustable Tile Hook," product data sheet, downloaded from 4. https://snapnrack.com/wp-content/uploads/2021/02/SnapNrack_Ultra-Rail-Adjustable-Tile-Hook_v.1.5.pdf on Aug. 25, 2023, 2 pages.

Unirac, "Pro Series SolarHooks Compatibility Report," Apr. 2018, 14 pages.

Unirac, "Pro Series SolarHooks Application Guide," Nov. 2020, 1 page.

Unirac, "Pro Series SolarHooks Detail Drawings," created Sep. 2019, modified Oct. 2020, 8 pages.

Unirac, "Pro Series SolarHooks Installation Guide," Feb. 2022, 14 pages.

Unirac, "SolarHooks," downloaded from https://unirac.com/product/solarhooks/ on Jul. 25, 2023, 4 pages.

\* cited by examiner

MOUNTING DEVICES

TECHNICAL FIELD

The present disclosure relates generally to devices used to mount objects to a surface. Specifically, the present disclosure relates to systems and methods for mounting solar panels and solar panel arrays to a surface such as a rooftop or other structural feature via a mounting bracket.

BACKGROUND

In many situations and use cases, an individual or entity may wish to mount an object to a surface of a structure such as a vehicle, a residential home, a government, or corporate building, among other structures. Mounting devices to objects that are, or may be, exposed to unpredictable and varying force vectors caused by wind, rain, and other elements of weather present technical problems that are often difficult to solve. A long-standing challenge in the solar energy industry, for example, has been resolving how best to mount panels, modules, and arrays of photovoltaic devices (collectively, "module" or "modules") on a variety of surfaces, not only securely and safely, but also quickly. The obverse problem also is significant to the industry, namely; safely removing or reconfiguring a module that has been installed on a surface.

Further, the structures on which the panels, modules and arrays of photovoltaic devices may be mounted may include surfaces that, if compromised via the use of fasteners impinging on the surfaces, may compromise the structures by allowing for precipitation (e.g., rain, snow, etc.) and other environmental hazards to penetrate into the structure. Therefore, it is beneficial for a mounting device used to mount the module(s) to the structure to have very little or no impact on the structure including, for example, roofing elements. In an embodiment, a structure may be roofed using ceramic or clay tiles that may break if a fastener such as a lag bolt is screwed into the tile. Thus, the tile my be removed entirely to allow the mounting device to be mounted to an underlying substructure such as an ice and water shield, an underlayment, a decking, or combinations thereof. However, removal of the tile exposes the ice and water shield, underlayment, and/or decking directly to the environment as described above, and replacement of the roofing tile may not be possible given that the mounting device is occupying that space. Thus, the construction, installation, and use of the modules presents a number of unsolved problems.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
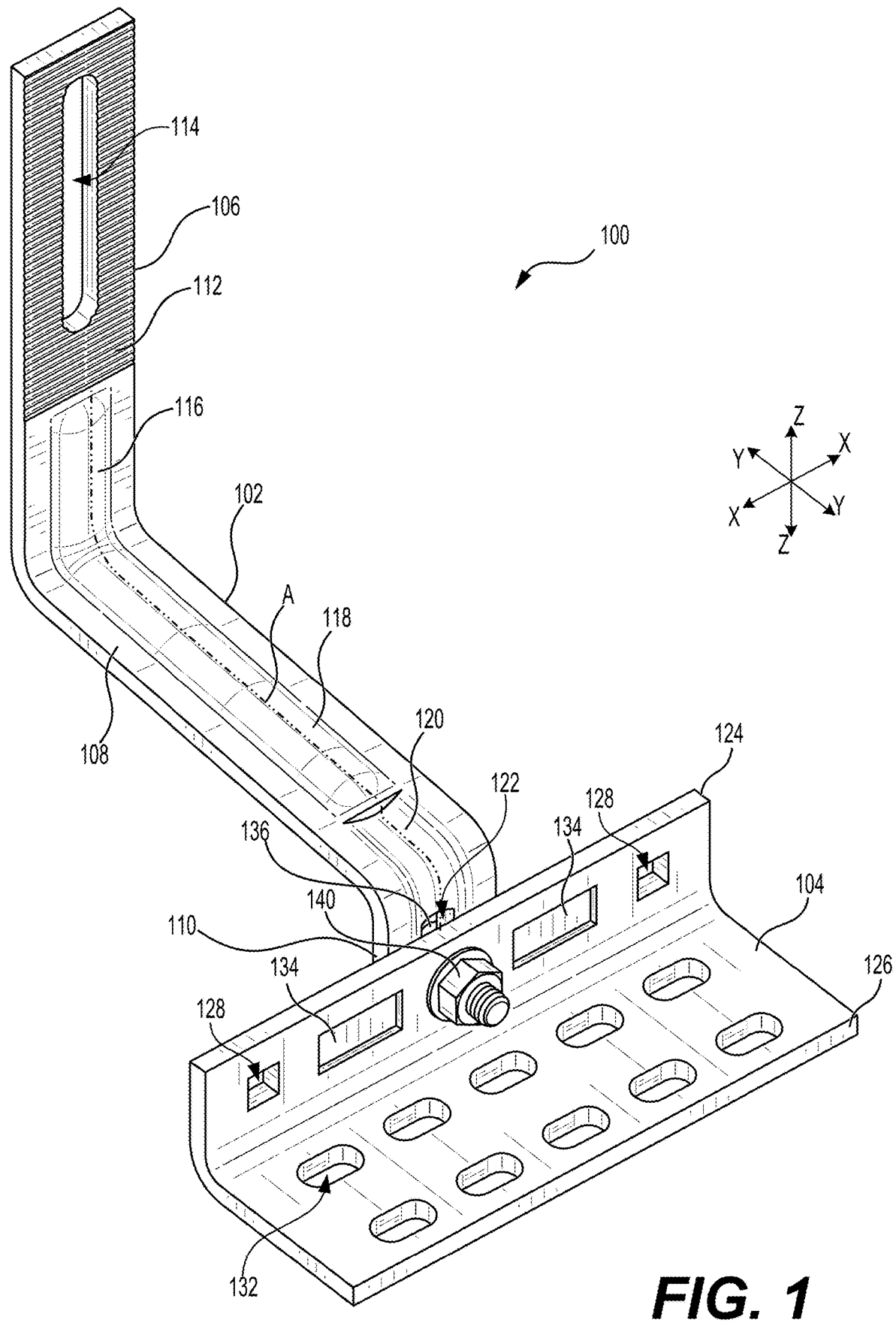
FIGS. 1 through 9 illustrate a mounting device including at least one raised portion as an anti-rotation system, according to an example of the principles described herein.

This disclosure describes a mounting device including a hook arm, a hook plate coupled to the hook arm, and an anti-rotation system to restrict rotation of the hook arm relative to the hook plate. Solar energy radiation from the sun is capable of producing heat, causing chemical reactions, or generating electricity. The sun is an extremely powerful energy source, and solar radiation is by far the largest source of energy received by Earth, but its intensity at the Earth's surface is comparatively low. This is partly because Earth's atmosphere and its clouds absorb or scatter as much as 54 percent of all incoming sunlight. Solar energy, however, due to technological improvements in the manner of collecting the potential energy, has become increasingly attractive as an energy source. Solar energy is inexhaustible in supply, and non-polluting in stark contrast to fossil-fuel sources like coal, oil, and natural gas.

Sunlight reaching earth consists of approximately 50 percent visible light, 45 percent infrared radiation, and small amounts of ultraviolet light and other forms of electromagnetic radiation. Radiation is convertible either into thermal energy or directly into electricity by photovoltaic cells. In photovoltaic cells, a small electrical voltage is generated when light strikes the junction between a metal and a semiconductor or a junction between two different semiconductors. Although the voltage generated from a single photovoltaic cell may be only a fraction of a volt, by connecting large numbers of cells together into panels, modules and arrays, significant electric power may be generated. To harness radiation for direct generation of electricity using cells collected into panels, modules and arrays, a number of apparatus and methods for using and installing the apparatus have been devised on which to mount modules on surfaces exposed to the radiation. The construction, installation, and use of such apparatus present a number of unsolved problems.

A wide variety of clamp assemblies, racks, frames, mounting devices, and associated hardware have been proposed to mount modules on structures or other objects. Some solutions have proposed modifications of the shape, structure, and size of components of a module to achieve more rapid and secure mounting. Other solutions have proposed altering the construct and design of hardware associated with installing racks, framing, and footings into a footing grid on which modules are mounted. As used in the present specification and in the appended claims, the term "footing grid" is meant to be understood broadly as any array of mounting devices used to mount modules to a surface with or without other intervening coupling elements The mounting devices forming the footing grid may be connectable to a surface and may be formed and shaped to permit attachment of other hardware components such as rails and frames on which modules may be attached.

Prior approaches suggested for mounting a module on an object include significant limitations and problems. A serious challenge to providing a useful apparatus and method for mounting a module on a surface arises from the variety of surfaces on which modules may or must be mounted, including roofs, tops and sides of poles, the ground, and other locations. Earlier solutions, therefore, required construction of custom-built racks to fit each of the enumerable iterations of the sizes and shapes of modules.

Many earlier suggestions for mounting panels, modules, and/or arrays of photovoltaic devices on surfaces are cumbersome, unsafe, and not easily assembled or reconfigured. In the industry associated with clamps for installation of photovoltaic modules, the term "top down" refers to attaching a module to a rail on a frame using a clamp that secures to the uppermost portion of the module. For example, in the case of a module to be mounted on a building, one or more rails first would be attached to a footing grid including a number of mounting devices that earlier have been attached to the surface (e.g., a roof). Thereafter, one or more modules would be attached to the mounting devices either directly or indirectly via the rails, clamps, etc. Hardware that secures the module to the mounting devices may be attached from the top, or front, of the module.

The term "bottom up." in contrast, refers to positioning a photovoltaic module by first attaching the module to the footing grid and to the roof or other surface. In bottom-up mounting, hardware used to secure the module to the mounting devices may be attached from the bottom or back of the module. The uniqueness of each installation, an installer's preferences, and/or the particular module may determine whether a top down or bottom-up installation is used. The embodiments described in the present disclosure refer to the either the top-down or bottom-up configuration and the inclusion of a plurality of mounting devices to which the rails, clamps, etc. may be attached. The mounting devices forming the footing grid may be first attached to the surface.

Another limitation of current approaches for mounting photovoltaic modules to a surface is the excessive number and variety of hardware parts and components that are required to form the footing grid. The complexity of current footing hardware may present a challenge to installers. Further, many mounting devices that are coupled to the structure may include multiple elements that may rotate or shift with respect to one another. This may result in poor installation of the footing grid and unlevel or otherwise uneven installation of rails, clamps, and/or modules.

Still another unresolved problem arises from the varying shapes, sizes, and configurations of modules. The arrangement of the modules on a surface such as a roof May not be dimensionally consistent with the location of rafters underneath the roof into which hardware must be inserted to hold the footing grid and/or rails. Some mounting devices may not be capable of aligning with and coupling to both the rafters and the varying-sized modules. Thus, the mounting devices need to be versatile enough to allow for several orientations and positions at which the mounting device may be coupled to the rafters.

Therefore, a previously unaddressed need exists in the industry for a new and useful mounting device, assembly, or system for positioning a photovoltaic panel, modules, or arrays of photovoltaic devices on a surface such as a roof, pole, or other surface. Particularly, there is a significant need for a mounting device, assembly, or system for mounting one or more photovoltaic modules safely, reliably, and quickly on a surface, removing or reconfiguring the modules as safely, reliably and quickly. Further, there is a signification need for mounting device, assembly, or system that is versatile and adjustable to allow a variety of dimensions and configurations. Additionally, there is a need for a mounting device that will secure a module to a structure and resist and support loads in all three directions.

Examples described herein provide a mounting device that may include a hook arm including a first vertical portion, a center portion coupled to the first vertical portion at a first end of the center portion, and a second vertical portion coupled to the center portion at a second end of the center portion. In this manner, the hook arm forms a generally s-shaped arm that may be coupled to a hook plate at the second vertical portion. The hook arm and hook plate may be coupled to one another via a fastener. The hook plate may include a third vertical portion and a base portion to couple the hook plate to a surface such as a surface of a structure such as a building. The mounting device may further include an anti-rotation system to restrict rotation of the hook arm relative to the hook plate. This anti-rotation system ensures case of installation of the mounting device and coupling of other elements to the mounting device such as the herein-mentioned rails, clamps, couplers, and/or modules. Details regarding a number of embodiments of the mounting device and the anti-rotation system are described herein.

Example Embodiments

This disclosure describes a mounting device including a hook arm, a hook plate coupled to the hook arm, and an anti-rotation system to restrict rotation of the hook arm relative to the hook plate. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 2:
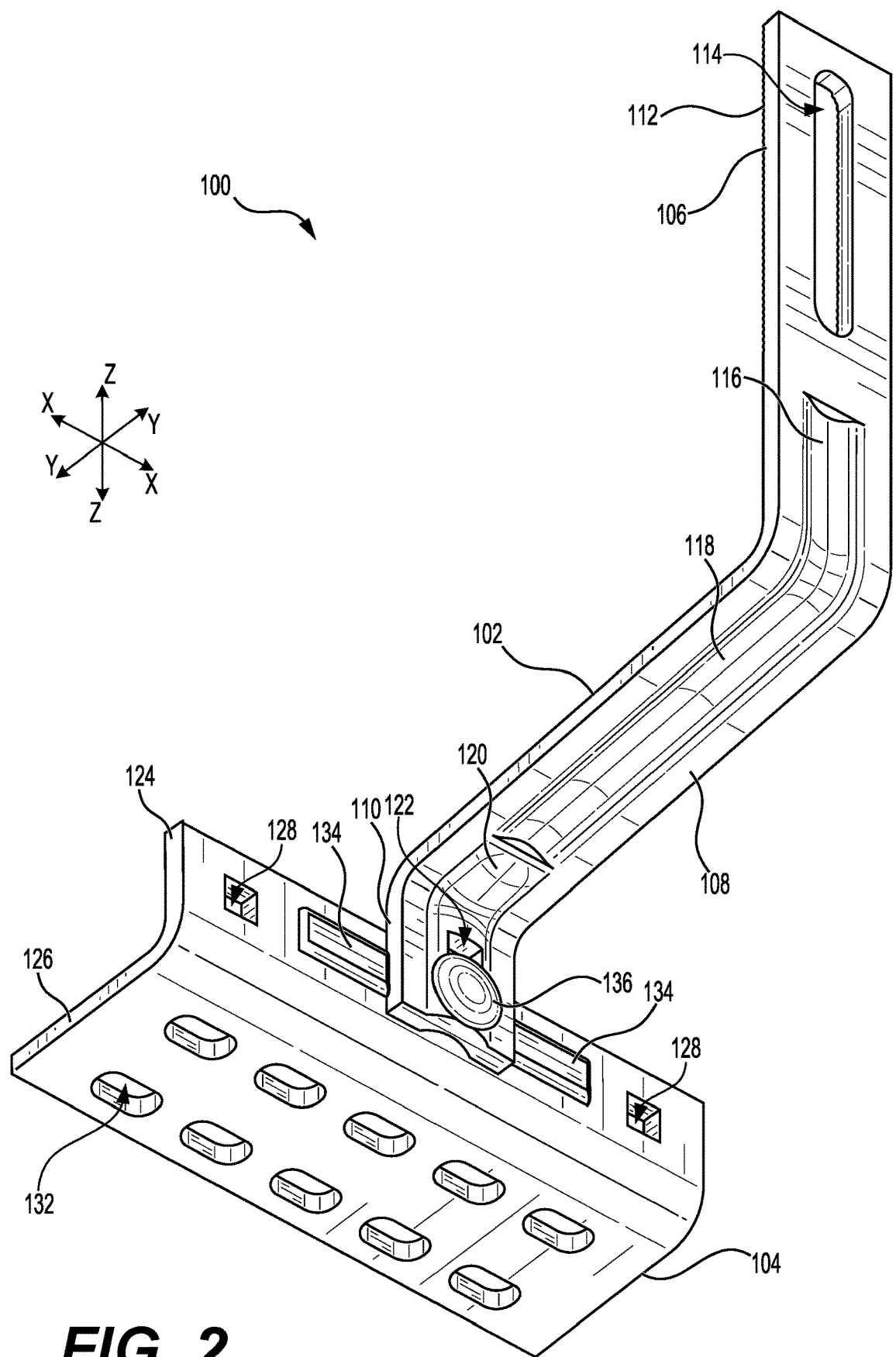
Figure 3:
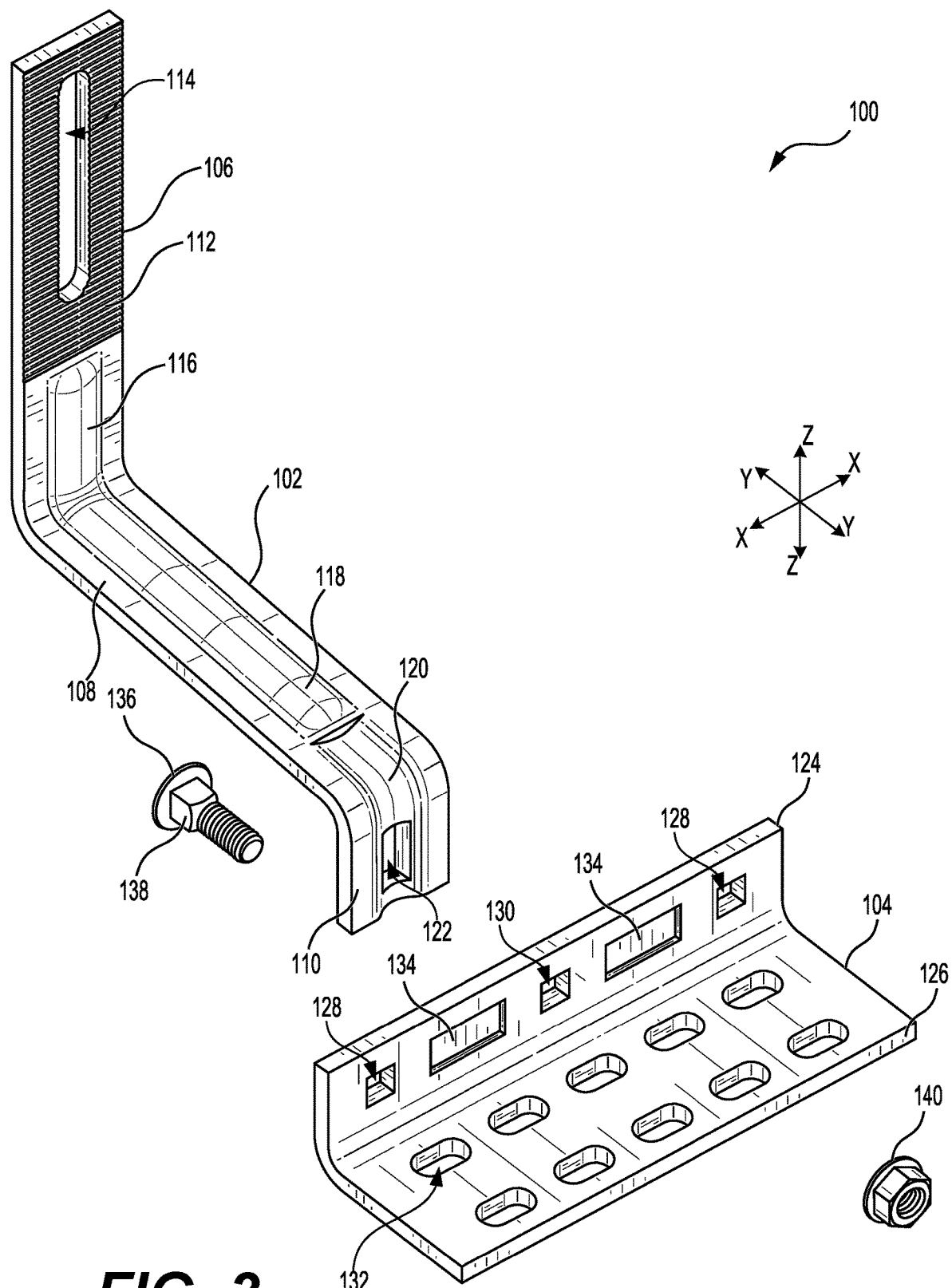
Figure 4:
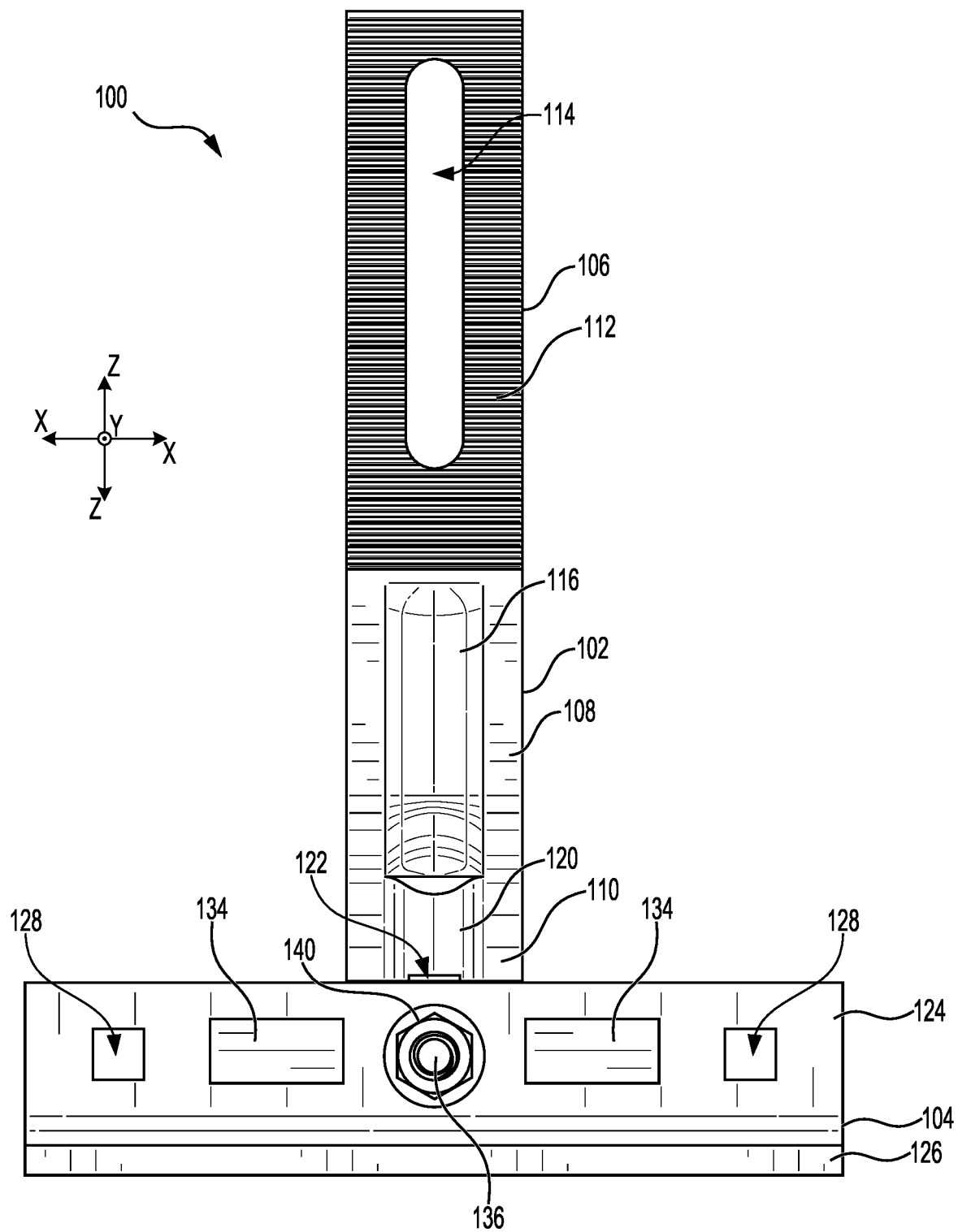
Figure 5:
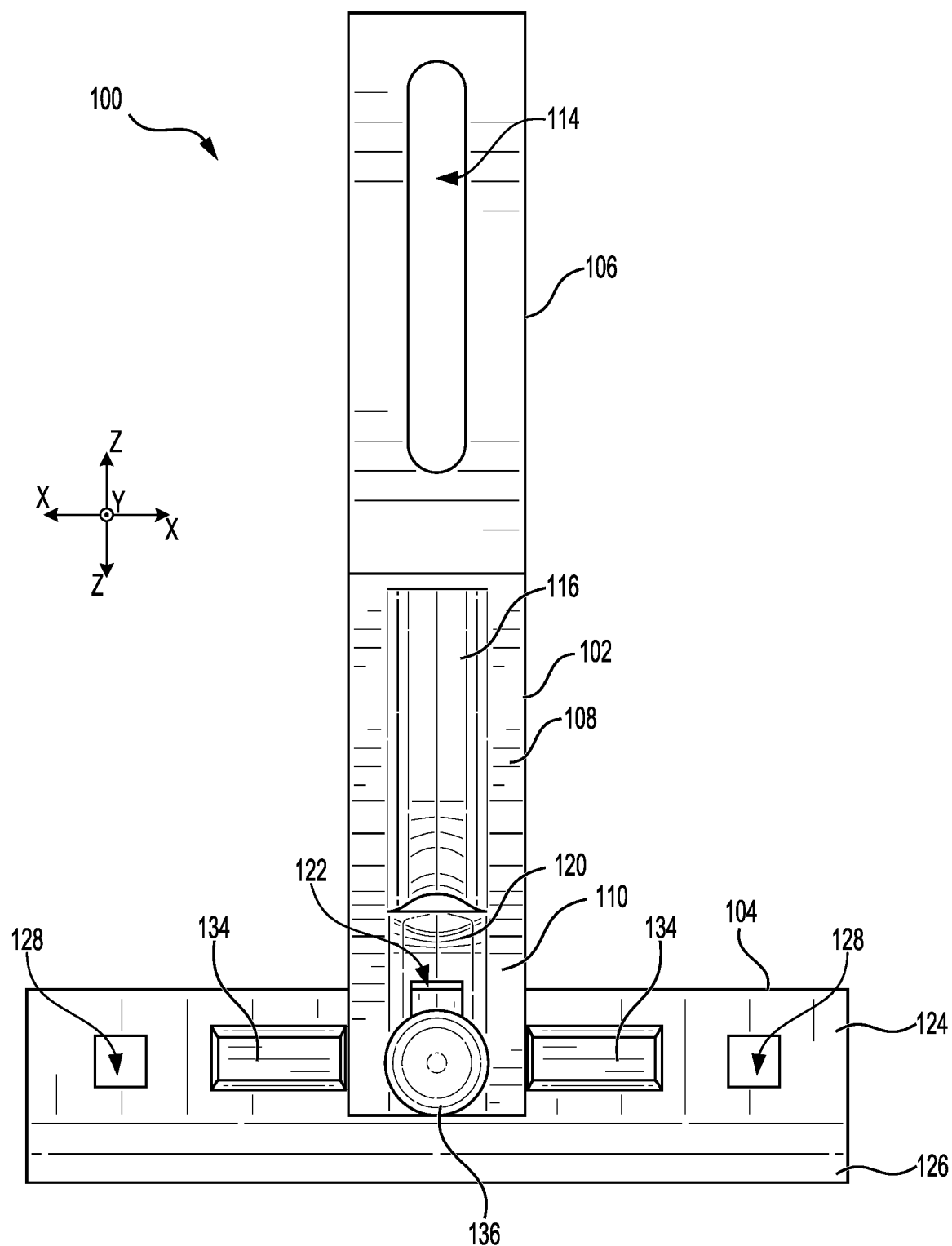
Figure 6:
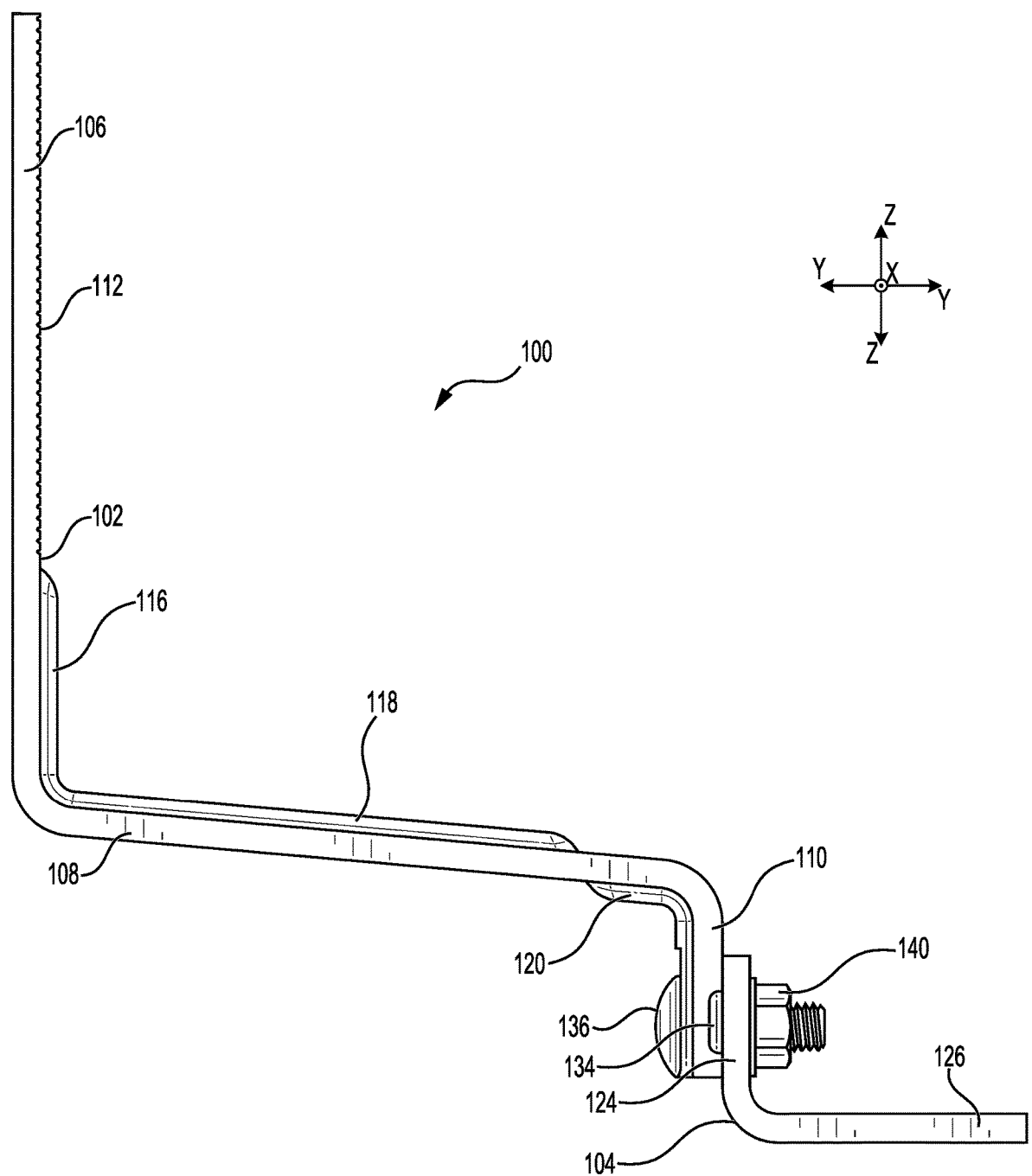
Figure 7:
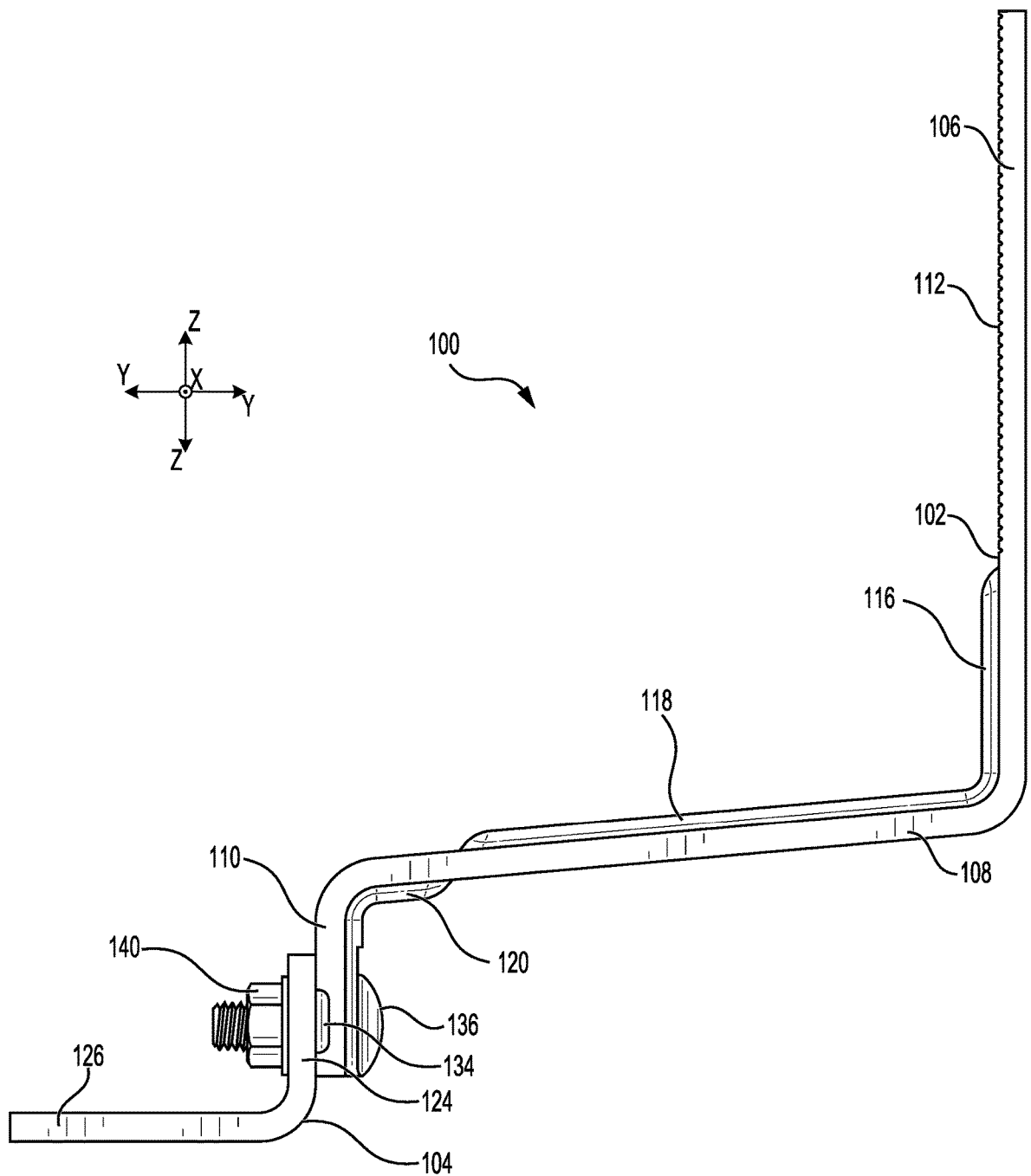
Figure 8:
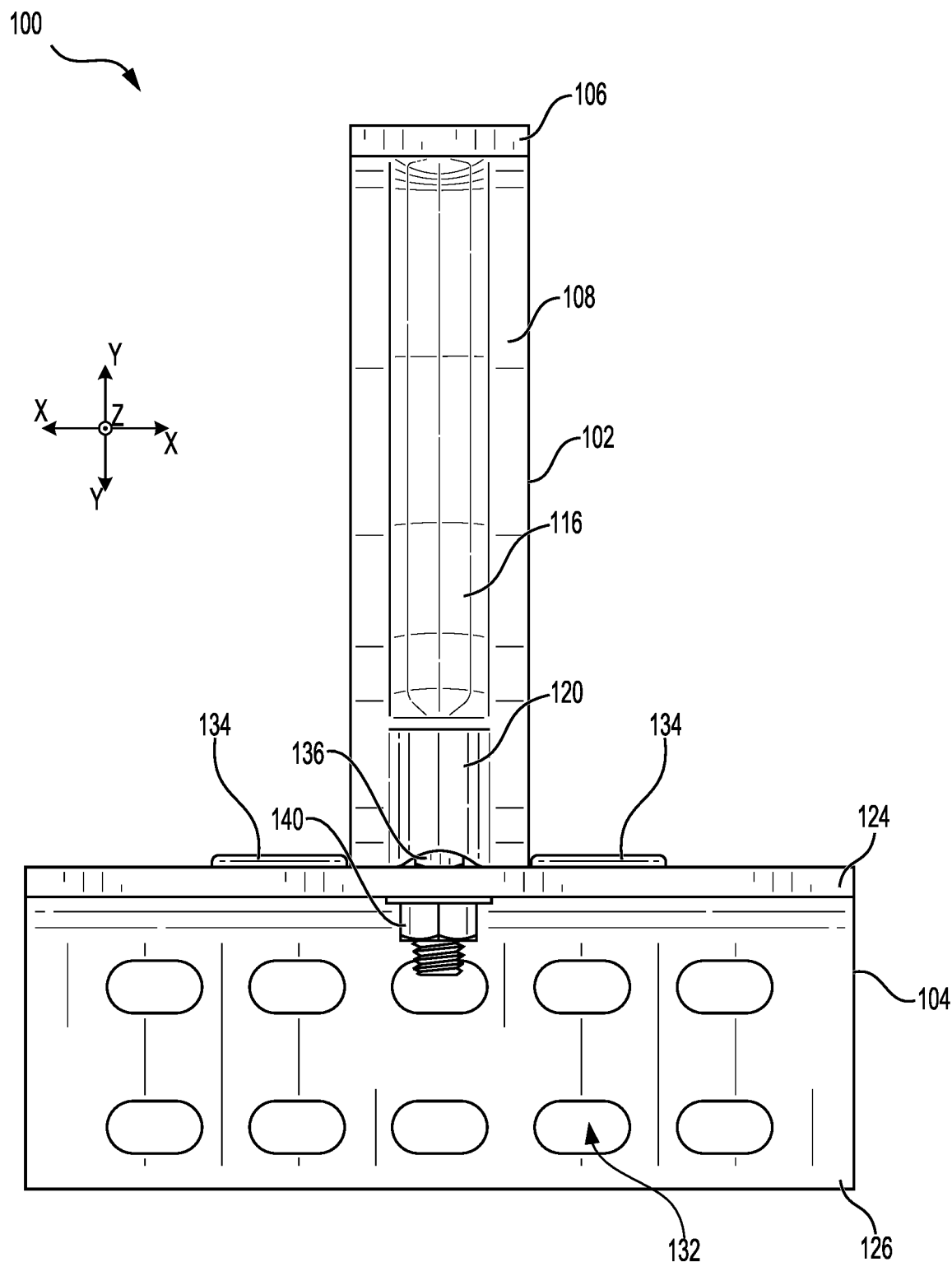
Figure 9:
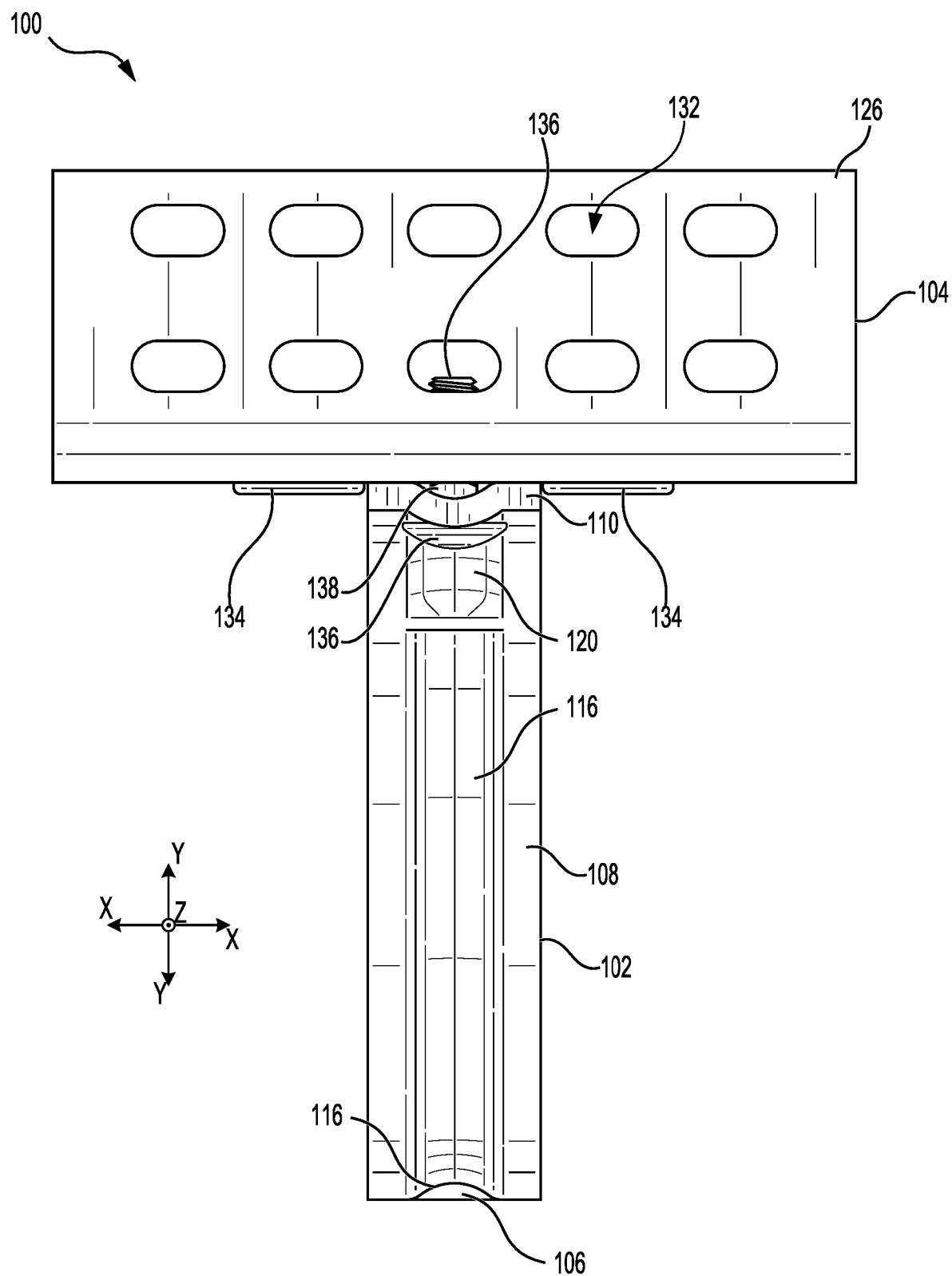
Figure 10:
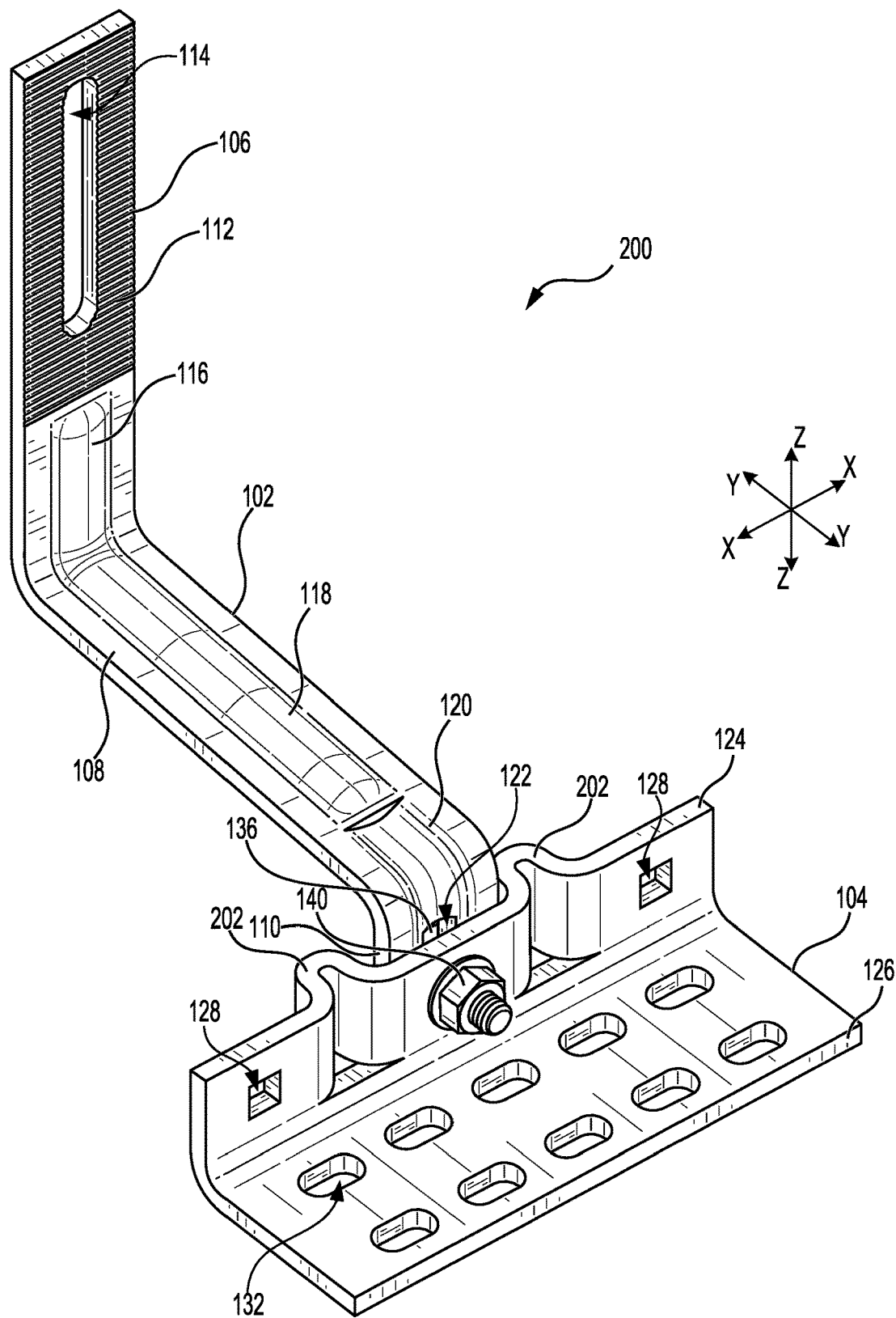
FIGS. 10 through 18 illustrate a mounting device including at least one formed portion as an anti-rotation system, according to an example of the principles described herein.

FIGS. 1 through 9 illustrate a mounting device 100 including at least one raised portion (discussed further hereinafter) as an anti-rotation system, according to an example of the principles described herein. As all FIGS. 1 through 45 include similar elements, those elements common among the FIGS. 1 through 45 will be described in detail in connection with this description of FIGS. 1 through 9. As to FIGS. 1 through 9, FIG. 1 illustrates a top, front, right-side perspective view of the mounting device 100 including at least one raised portion as an anti-rotation system, according to an example of the principles described herein. FIG. 2 is a bottom, rear, left-side perspective view thereof. FIG. 3 is a top, front, right-side, exploded, perspective view thereof. FIG. 4 is a front side view thereof. FIG. 5 is a rear side view thereof. FIG. 6 is a right-side view thereof. FIG. 7 is a left side view thereof. FIG. 8 is a top view thereof. FIG. 9 is a bottom view thereof.

The mounting device 100 may include a hook arm 102 and a hook plate 104. Upon installation, the hook plate 104 is intended to be coupled to the structure to which the mounting device 100 is to be secured.

It is noted that for the sake of convenience, the term "vertical" as used herein is intended to mean that a feature has at least a portion of the structure that extends in the "Z" direction (shown in FIG. 1), and the direction need not be perpendicular to the horizontal "X" or "Y" directions. That is, a "vertical portion," as used herein may extend merely transverse and not completely orthogonal to another portion to which the orientation might be compared. Likewise, where the term "horizontal" or derivatives thereof are used, the intended meaning is not to be considered strictly along the "XY" plane. Moreover, such terms are used only as useful terms of relative orientation between parts of the disclosed embodiments. Accordingly, Applicant considers alternative language (i.e., non-orientation specific language) to satisfy description requirements for the scope of the inventions described herein as well. For example, a "vertical portion" and a "horizontal portion" may be referred to as a "first portion" and a "second portion," respectively, and/or likewise, a "base portion" and an "upper portion," respectively, and those terms may further be described as extending transversely with respect to each other and/or being positioned relative to one another.

The hook arm 102 of the mounting device 100 may include a first vertical portion 106, a center portion 108, and a second vertical portion 110. The center portion 108 is coupled and extends transversely to both the first vertical portion 106 and the second vertical portion 110. In an embodiment, the center portion 108 may be coupled to the first vertical portion 106 and the second vertical portion 110 via any coupling means including being monolithically formed with the center portion 108 as a single piece and bent or formed to be oriented in an approximately s-shape as depicted. In an embodiment, the first vertical portion 106, the center portion 108, and the second vertical portion 110 may be coupled via welding or other fastening methods. Further, in an embodiment, the center portion 108 may be oriented with respect to the first vertical portion 106 and the second vertical portion 110 at a slightly sloped orientation as indicated in, for example, FIGS. 6 and 7, depicting the side profiles of the mounting device 100. In an embodiment, the center portion 108 may be oriented with respect to the first vertical portion 106 at approximately 95°, and the center portion 108 may be oriented with respect to the second vertical portion 110 at approximately 95° to obtain a slight non-horizontal slope of the center portion 108. However, in the examples described herein, the first vertical portion 106, the center portion 108, and the second vertical portion 110 may be oriented in any manner with respect to one another.

Further, textural features 112 may be formed on the first vertical portion 106 of the hook arm 102 to allow for the other devices such as rails, couplers, modules, and other devices to be coupled to the first vertical portion 106. The textural features 112 may resist slipping or movement in the vertical direction with respect to the first vertical portion 106 of the hook arm 102 due to the increase in the coefficient of friction afforded by the textural features 112. In an embodiment, the textural features 112 may include, for example, knurling, ridges, a rough surface, other forms of textural features, and combinations thereof.

The first vertical portion 106 of the hook arm 102 may include an aperture 114 (e.g., elongated opening, throughhole, slot, etc.). The aperture 114 may be defined in the first vertical portion 106 such that the aperture 114 functions as a slotted connection. In this manner, the aperture 114 defined in the first vertical portion 106 may allow for other devices such as rails, couplers, modules, and other devices to be coupled to the first vertical portion 106 at various desired heights relative to the surface of the structure. Further, the aperture 114 defined in the first vertical portion 106 may allow the rails, couplers, modules, and other devices to be adjusted during installation and to accommodate undulations of the surface of the structure.

The first vertical portion 106, the intermediate, center portion 108, and the second vertical portion 110 may further include one or more arched indents 116, 118, 120 defined therein, respectively. The arched indents 116, 118, 120 may increase the bending strength of the hook arm 102 in the direction perpendicular to the length of the arched indents 116, 118, 120. This, in turn, strengthens the hook arm 102 allowing the hook arm 102 to significantly reduce or eliminate deformation under a load and/or through stress from the environment such as wind and snow loads. In an embodiment, the arched indents 116, 118, 120 may be formed along at least a portion of a center line (designated as "A" in FIG. 1), which extends through a length of the hook arm 102, of at least one of the first vertical portion 106, the center portion 108, or the second vertical portion 110.

In an embodiment, a first arched indent 116 may be formed on the first vertical portion 106 toward an end of the first vertical portion 106 that couples to the center portion 108. Further, in an embodiment, a second arched indent 118 may be formed on the center portion 108 toward an end of the center portion 108 that couples to the first vertical portion 106. The second arched indent 118 may be formed along at least a portion of the length of the center portion 108.

Further, in an embodiment, a third arched indent 120 may be formed on the second vertical portion 110. For example, the third arched indent 120 may be formed on the second vertical portion 110 beginning at a first end of the second vertical portion 110 distal from a second end of the second vertical portion 110 at which the second vertical portion 110 is coupled to the center portion 108. Further, in an embodiment, the third arched indent 120 may be defined at a transition between the second vertical portion 110 and the center portion 108. Further, in an embodiment, the third arched indent 120 may be defined in at least a portion of the center portion 108 of the hook arm 102 such that the third arched indent 120 is continuously formed from a point along the length of the center portion 108 and into and along at least a portion of the length of the second vertical portion 110.

In an embodiment, the first arched indent 116 and second arched indent 118 may protrude toward a first side (e.g., a front surface, etc.) of the hook arm 102, and the third arched indent 120 may protrude toward a second side (e.g., a rear surface) of the hook arm 102 opposite the first side. In these examples, the first arched indent 116, the second arched indent 118, and the third arched indent 120 may serve to increase the strength of the hook arm under a load (e.g., a 60% strength increase) over a hook arm without such arched indents. Further, the first arched indent 116, the second arched indent 118, and the third arched indent 120 may improve spans and eliminate the possibility of cracking roofing tiles or destroying other roofing materials.

In an embodiment, the first arched indent 116, the second arched indent 118, and the third arched indent 120 may protrude toward a first side of the hook arm 102 and/or continuously extend across the first arched indent 116, the second arched indent 118, and the third arched indent 120. In an embodiment, this configuration of the first arched indent 116, the second arched indent 118, and the third arched indent 120 may allow the hook arm 102 to be connected to a first side or a second side of the vertical portion 124 of the hook plate 104, depending on the side of the hook arm 102 the first arched indent 116, the second arched indent 118, and the third arched indent 120 is formed.

Additionally, as seen in FIG. 3, an aperture 122 may be defined within the second vertical portion 110 of the hook arm 102 via which the hook arm may attach to the hook plate 104.

In an embodiment, the hook plate 104 may include a vertical portion 124 coupled to a base portion 126. In an embodiment, the base portion 126 may be coupled to the vertical portion 124 at approximately a 90 degree (°) angle. Further, in an embodiment, the base portion 126 may be coupled to the vertical portion 124 via any coupling means including being monolithically formed integrally with the base portion 126 as a continuous piece, and subsequently bent or formed to be oriented transversely with respect to one another (e.g., approximately 90°, if desired). In an alternative embodiment, the base portion 126 may be a separate piece that is coupled to the vertical portion 124 via welding or other fastening methods.

The vertical portion 124 of the hook plate 104 may include one or more apertures 128. In an embodiment, the apertures 128 may include two apertures 128 located, respectively, on distal opposing ends of the vertical portion 124. Additionally, a central aperture 130 may be located on the vertical portion 124. The apertures 128 may be located at different portions of the vertical portion 124 of the hook plate 104 in order to allow for the hook arm 102 to be coupled to the hook plate 104 at different and various positions along the vertical portion 124. This will allow for the hook arm 102 to be coupled to hook plate 104 at an optimal location along the length of the vertical portion 124 and to allow the hook arm 102 to be placed at an optimal location such that the hook arm 102 does not interfere with the location of the roof tile or other roofing material.

The manner in which the hook plate 104 may be coupled to the structure may include extending a fastener such as a lag screw, a lag bolt, a carriage bolt, etc. through at least one of a plurality of hook plate apertures 132 and into the structure (e.g., into an underlayment, a decking, a rafter, a truss, a stud, or combinations thereof). However, the hook plate 104 may be coupled to the structure using any method or means. Although the examples depicted in the figures show ten hook plate apertures 132, more or less than ten hook plate apertures 132 may be defined in the base portion 126 of the hook plate 104. Further, the hook plate apertures 132 may be defined in the hook plate 104 at any portion of the length and breadth of the based portion and in any pattern or layout that may serve any particular purpose. The hook plate apertures 132 may be defined in the hook plate 104 at varying and different locations in order to allow for the hook plate 104 to be adjusted laterally and for the hook plate apertures 132 to be aligned with, for example, the underlayment, decking, rafter, truss, stud, or combinations thereof to which the mounting device 100 is to be secured.

As to the anti-rotation system of the example mounting device 100 of FIGS. 1 through 9, an anti-rotation system may include at least one raised portion 134 (e.g., protrusion, detent, etc.) formed on the vertical portion 124 of the hook plate 104. The at least one raised portion 134 may, in an embodiment, include two raised portions 134. The two raised portions 134 may be formed on the vertical portion 124 adjacent to a location where a side edge (e.g., a side surface, a first side surface, a second side surface, etc.) of the second vertical portion 110 of the hook arm 102 couples to the vertical portion 124 of the hook plate 104. As mentioned above, the apertures 128 defined in the vertical portion 124 of the hook plate 104 may be located at different portions of the vertical portion 124 of the hook plate 104 in order to allow for the hook arm 102 to be coupled to the hook plate 104 at different and various positions along the vertical portion 124. Thus, in an embodiment, the raised portion(s) 134 may be located between the apertures 128 located on the distal ends of the vertical portion 124 and the central aperture 130 located at approximately center of the vertical portion 124. In this manner, if the hook arm 102 is coupled to the vertical portion 124 of the hook plate 104 at one of the apertures 128 located on the distal ends of the vertical portion 124, the raised portions 134 may abut at least one side of the second vertical portion 110 of the hook arm 102 and restrict rotation of the hook arm 102 relative to the hook plate 104. Further, if the hook arm 102 is coupled to the vertical portion 124 of the hook plate 104 at one of the central aperture 130, both of the two raised portions 134 may abut a respective side of the second vertical portion 110 of the hook arm 102 and restrict rotation of the hook arm 102 relative to the hook plate 104. In an embodiment, additional raised portions 134 (not shown) may be formed at the edges of the vertical portion 124 of the hook plate 104 such that in instances where the hook arm 102 is coupled to the vertical portion 124 of the hook plate 104 at one of the apertures 128 located on the distal ends of the vertical portion 124, these additional raised portions (not shown) may, along with the raised portions 134 depicted in FIGS. 1 through 9, abut both sides of the second vertical portion 110 of the hook arm 102 and restrict rotation of the hook arm 102 relative to the hook plate 104. Thus, any number of raised portions 134 may be formed along the length of the vertical portion 124 including more raised portions than those depicted in FIGS. 1 through 9.

In the examples of FIGS. 1 through 45 the hook arm 102 may be coupled to the hook plate 104 via the use of one or more fasteners, which may be considered to be non-permanent couplings. For the sake of this disclosure, the term "non-permanent coupling" is meant to be understood broadly as any coupling that may be removed or dismantled without damaging the joining components (e.g., the hook arm 102, the hook plate 104, and/or the fastener). Alternatively, in an embodiment, the hook arm 102 may be coupled to the hook plate 104 using a permanent or semi-permanent, coupling. The term "permanent coupling." where used herein, is meant to be understood broadly as any coupling that may be removed or dismantled while damaging at least a portion of the joining components (e.g., the hook arm 102, the hook plate 104, and/or the fastener) such as in the case of a weld solder, braze, tape, flue, cement, etc. Further, the term "semi-permanent coupling." where used herein, is meant to be understood broadly as any coupling that may be removed or dismantled while damaging at least a fastener and without damaging the joining components (e.g., the hook arm 102 and/or the hook plate 104) such as in the case of a rivet.

In an embodiment, a fastener used to couple the hook arm 102 to the hook plate 104 may include a carriage bolt 136 having a neck 138, secured by a nut 140. The aperture 122 may be sized within the second vertical portion 110 of the hook arm 102 to accommodate the carriage bolt 136 therein. Further, the carriage bolt 136 may be extended through one of the apertures 128 or the central aperture 130 defined in the vertical portion 124 of the hook plate 104. The nut 140 may then be coupled to the carriage bolt 136 and tightened and secured against the vertical portion 124 of the hook plate 104 in order to draw the second vertical portion 110 of the hook arm 102 toward the vertical portion 124 of the hook plate 104. In an embodiment, the neck 138 of the carriage bolt 136 may be shaped to interface (e.g., cause an interference with, engage, etc.) with the interior walls of the aperture 122 defined within the second vertical portion 110 of the hook arm 102, in order to restrict rotation of the carriage bolt 136 with resect to the hook arm 102. Further, In an embodiment, the neck 138 of the carriage bolt 136 may be shaped and dimensioned to interfere with the interior walls of the aperture 122 and/or the interior walls of apertures 128 or 130 (as described in more detail in connection with FIGS. 28-36) in order to restrict rotation of the hook arm 102.

The hook plate 104 and hook arm 102 of the mounting device 100 may be made of a material that is sufficiently strong enough to bear the weight of the modules (e.g., panels and arrays of photovoltaic devices) along with any devices intermediately coupled between the mounting device 100 and the modules such as rails, clamps, frames, etc. In the examples described herein, the mounting device 100 may include an anti-rotation system to restrict rotation of the hook plate 104 relative to the hook arm 102. The examples of FIGS. 1 through 45 each include a different anti-rotation system. The anti-rotation systems provided in these examples may be utilized as individual anti-rotation systems or may be combined with one or more other example anti-rotation systems.

FIGS. 2, 5, 8, and 9 depict the interface between the raised portions 134 and the second vertical portion 110 of the hook arm 102. When the carriage bolt 136 is extended through the aperture 122 defined within the second vertical portion 110 of the hook arm 102 and one of the apertures 128, 132 defined in the vertical portion 124 of the hook plate 104 and the nut 140 is engaged with the carriage bolt 136, the second vertical portion 110 seats between the raised portions 134. In this state, the raised portions 134 restrict rotation of the hook arm 102 with respect to the hook plate 104. Thus, the raised portions 134 serve as the anti-rotation system for the example of FIGS. 1 through 9 as they interface with the hook arm 102. Specifically, the raised portion 134 serving as the anti-rotation system for the example of FIGS. 1 through 9 may restrict rotation of the hook arm 102 with respect to the hook plate 104 about the Y-axis as indicated throughout the figures.

Figure 11:
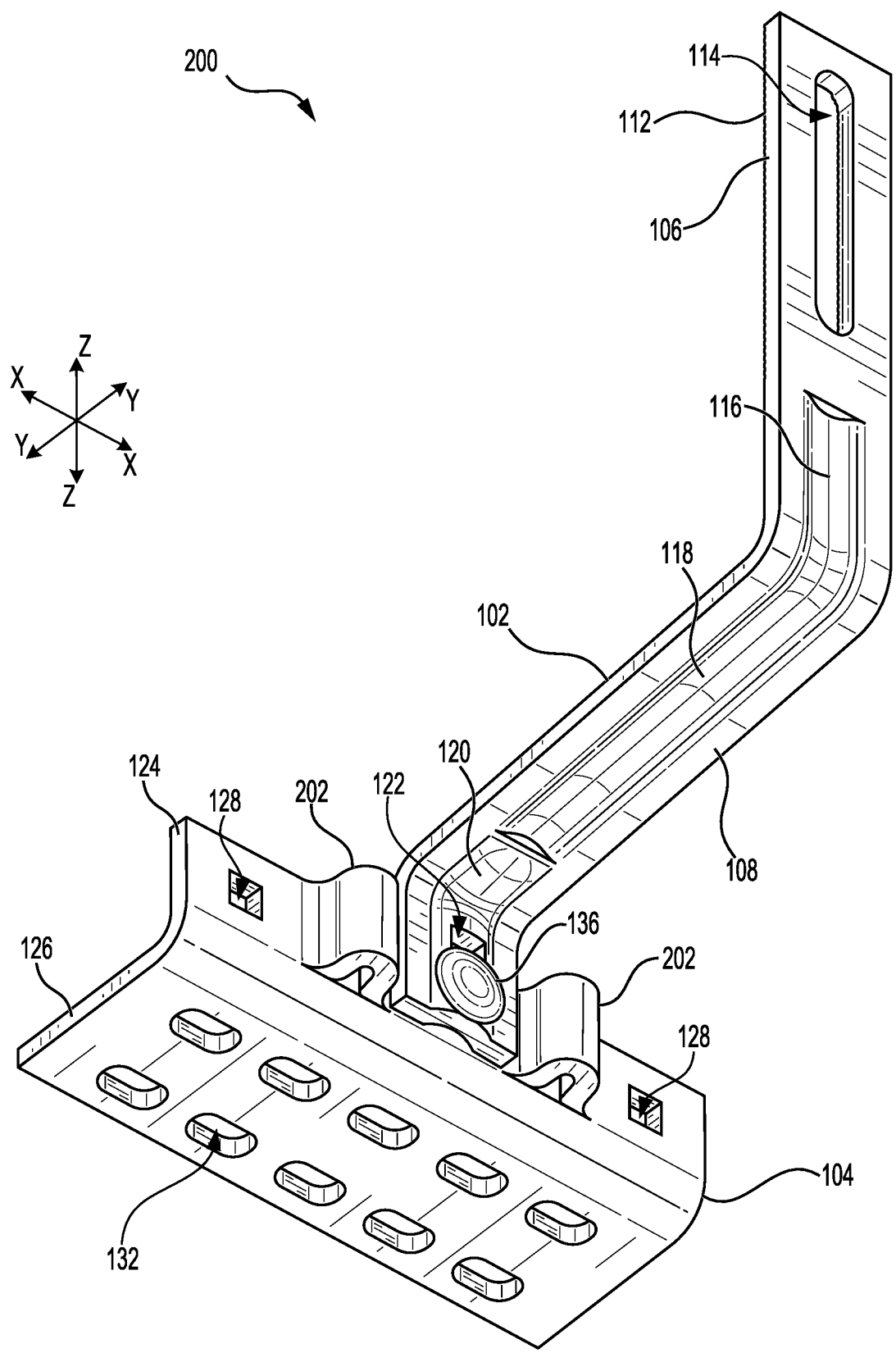
Figure 12:
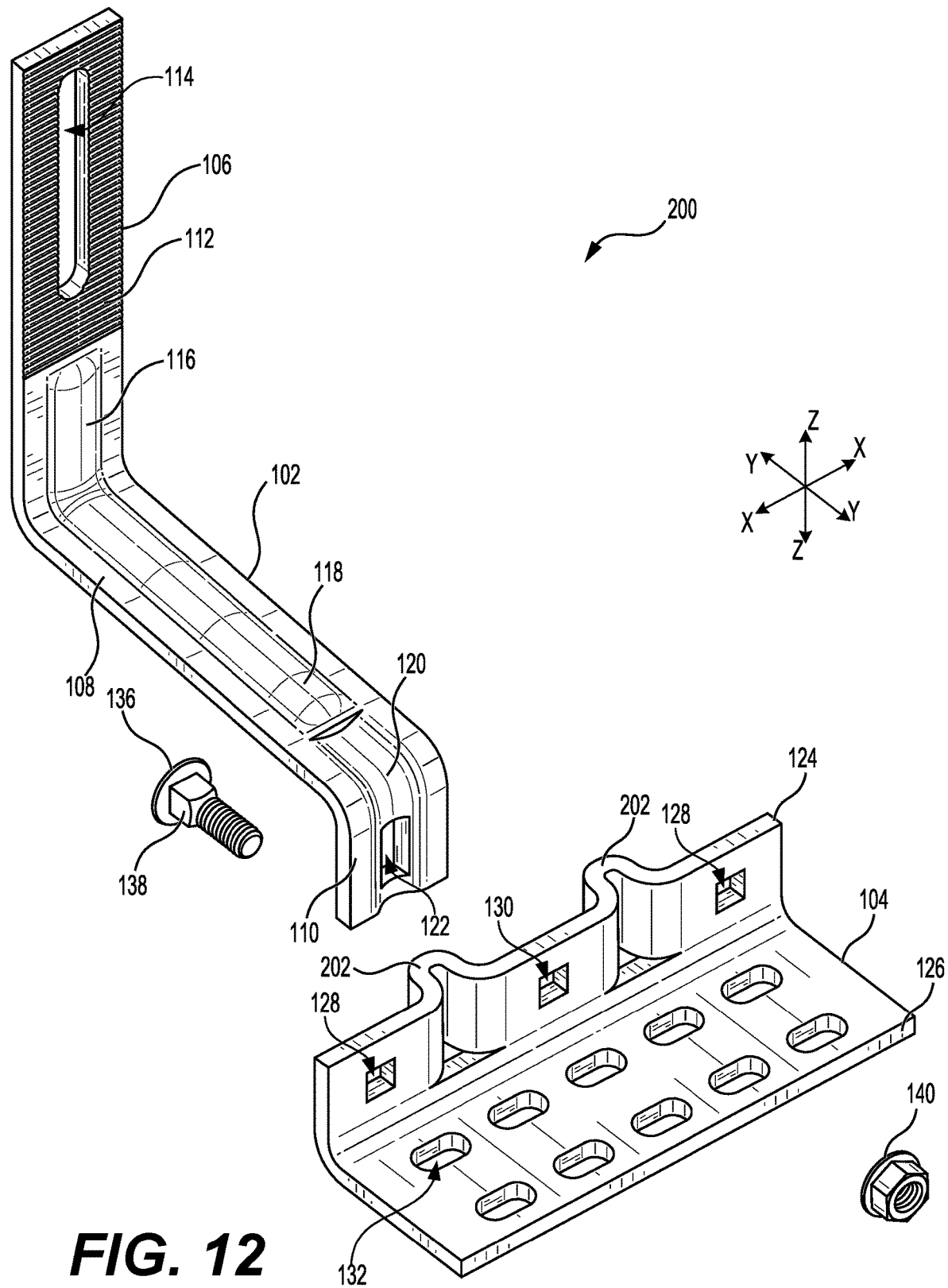
Figure 13:
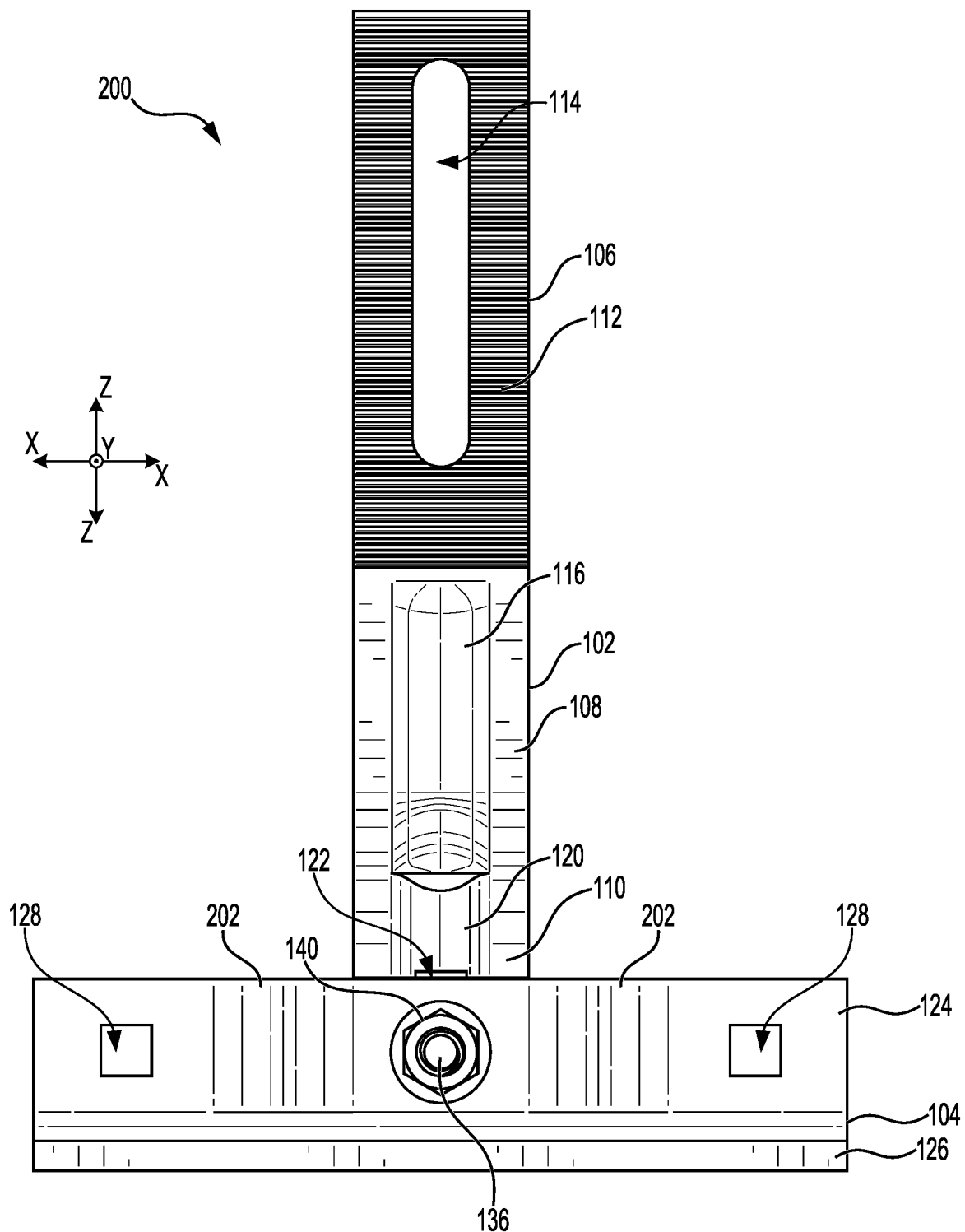
Figure 14:
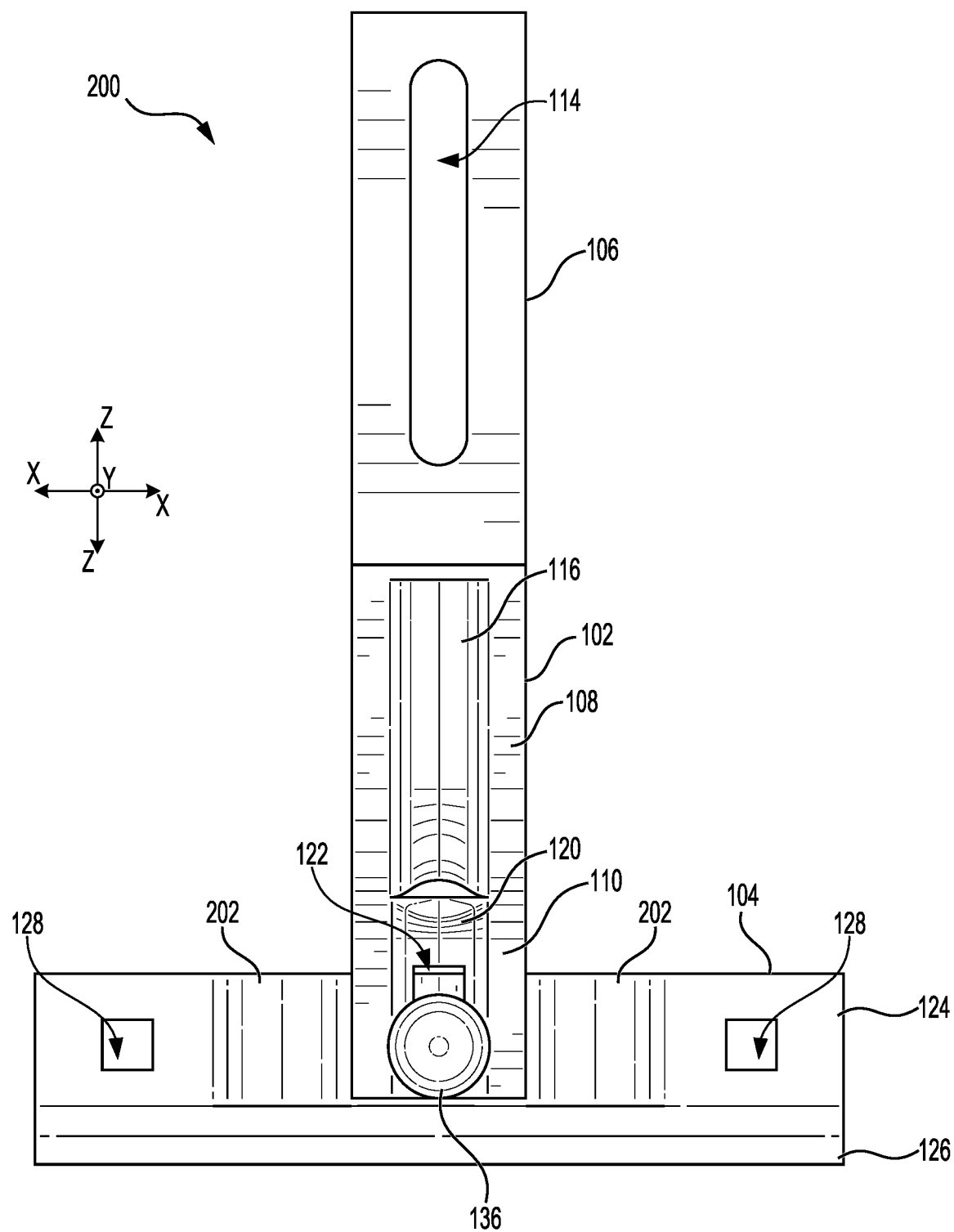
Figure 15:
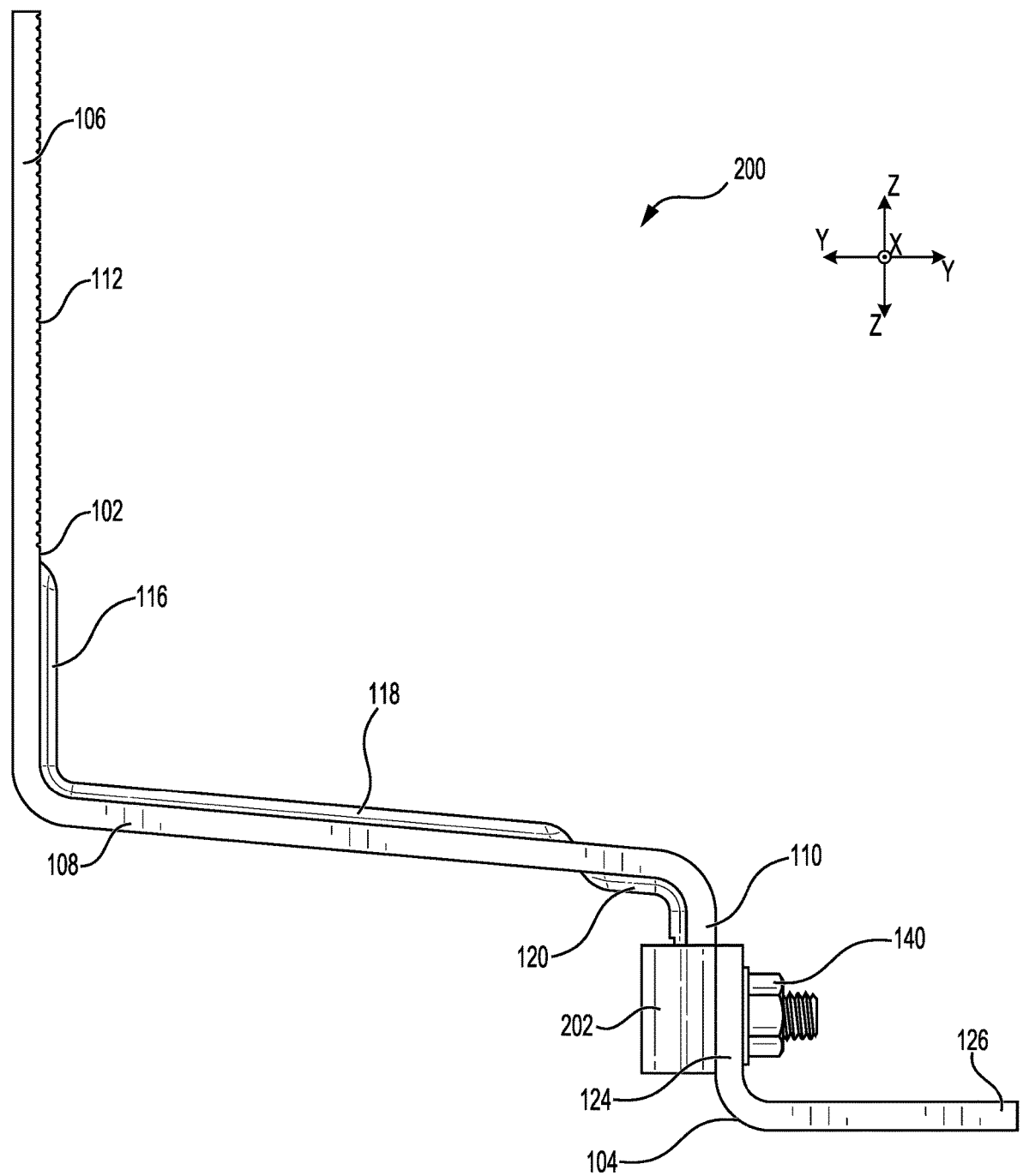
Figure 16:
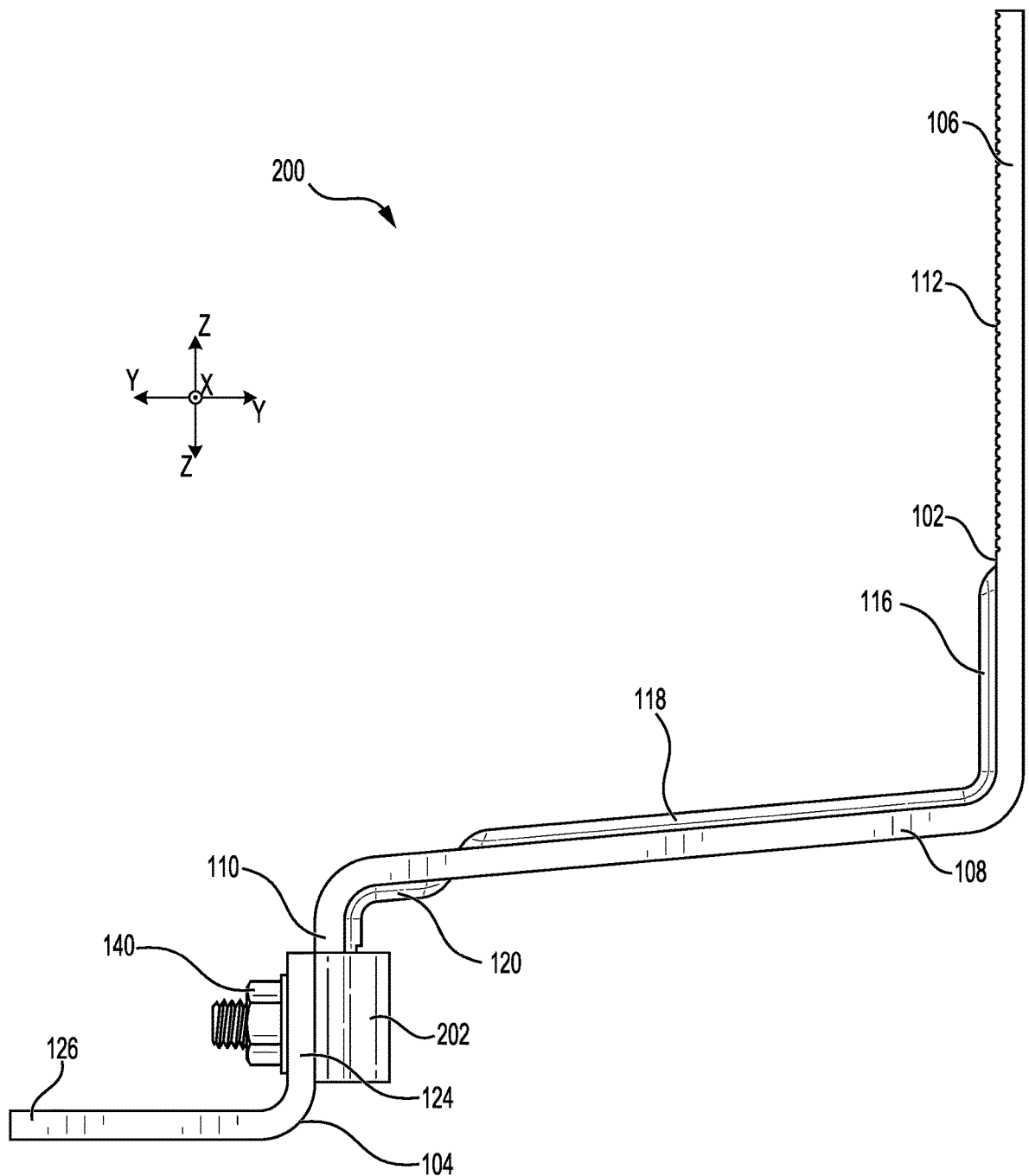
Figure 17:
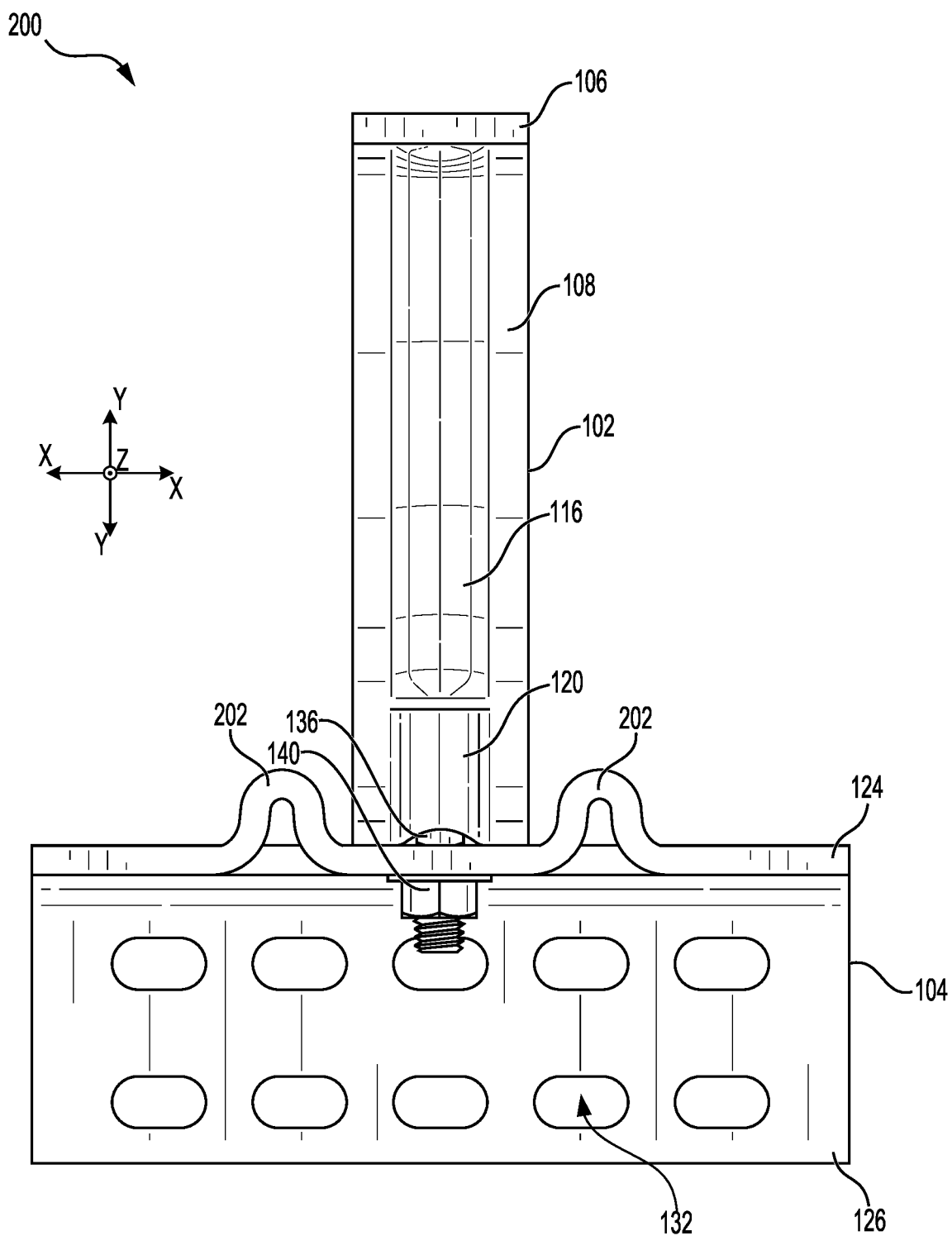
Figure 18:
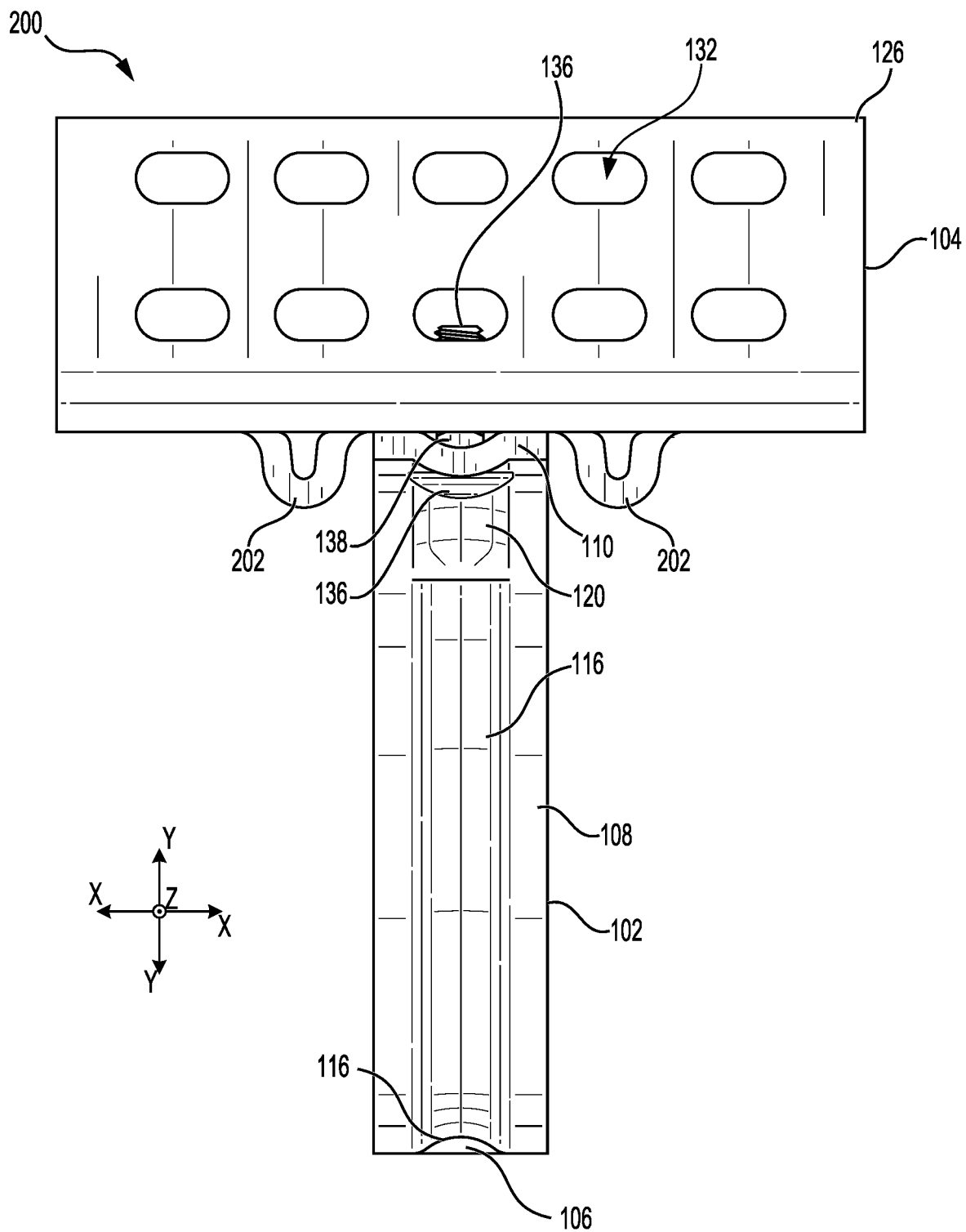
Figure 19:
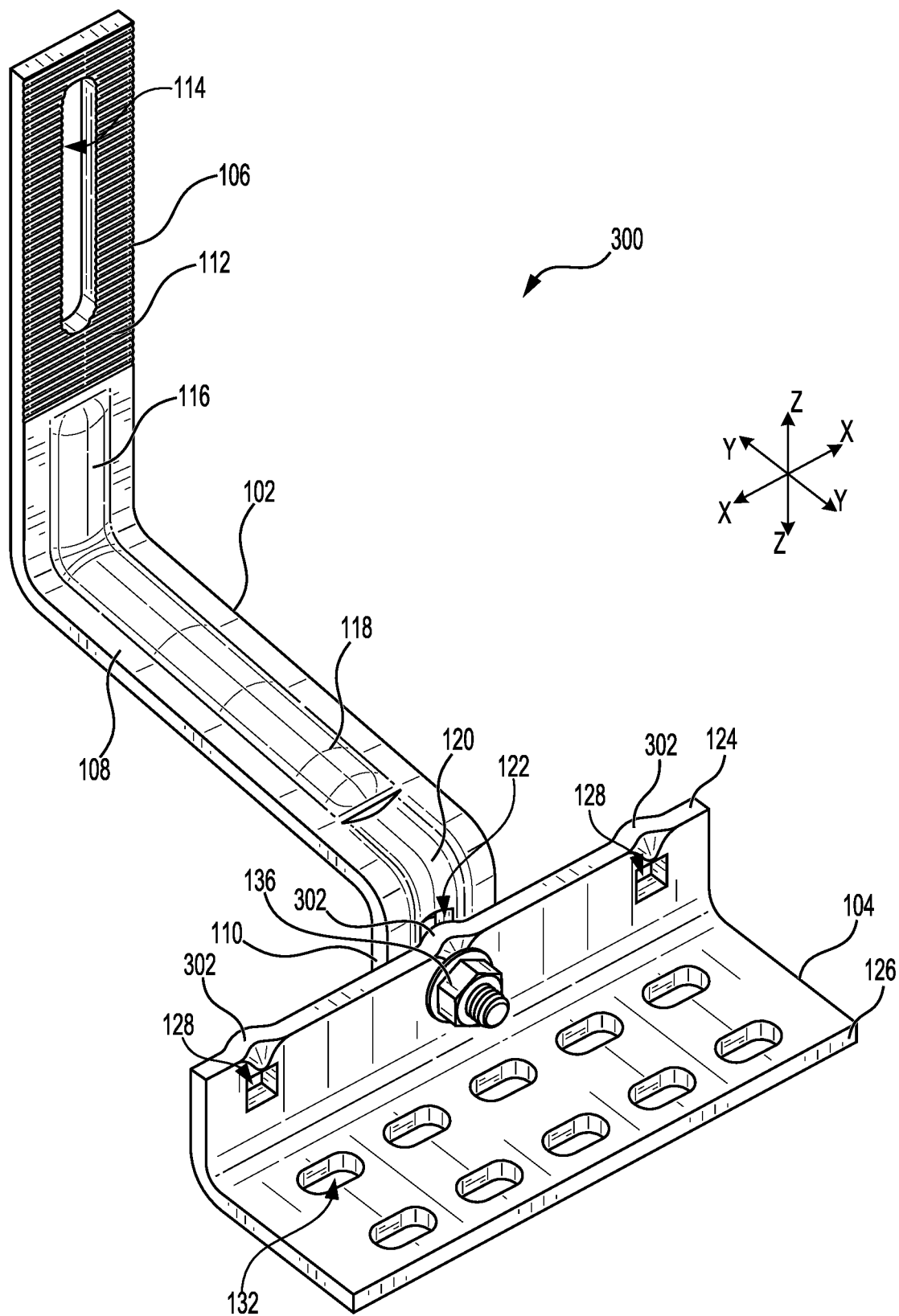
FIGS. 19 through 27 illustrate a mounting device including at least one protrusion as an anti-rotation system, according to an example of the principles described herein.

FIGS. 10 through 18 illustrate a mounting device 200 including at least one formed portion 202 as an anti-rotation system, according to an example of the principles described herein. With the description of FIGS. 1 through 9 provided above detailing common elements of the hook arm 102 and the hook plate 104, the anti-rotation system of the example of FIGS. 10 through 18 will now be described. As to FIGS. 10 through 18, FIG. 10 illustrates a top, front, right-side perspective view of the mounting device 200 including at least one formed portion 202 as an anti-rotation system, according to an example of the principles described herein. FIG. 11 is a bottom, rear, left-side perspective view thereof. FIG. 12 is a top, front, right-side, exploded, perspective view thereof. FIG. 13 is a front side view thereof. FIG. 14 is a rear side view thereof. FIG. 15 is a right-side view thereof. FIG. 16 is a left side view thereof. FIG. 17 is a top view thereof. FIG. 18 is a bottom view thereof.

As to the anti-rotation system of the example mounting device 200 of FIGS. 10 through 18, the anti-rotation system may include at least one formed portion 202 formed on the vertical portion 124 of the hook plate 104. The at least one formed portion 202 may, in an embodiment, include two formed portions 202. The two formed portions 202 may be formed on the vertical portion 124 adjacent to a location where the second vertical portion 110 of the hook arm 102 couples to the vertical portion 124 of the hook plate 104. In an embodiment, the formed portion(s) 202 may include a u-shape as depicted in FIGS. 10 through 18. However, any formed shape may be used to restrict rotation of the vertical portion 110 of the hook arm 102 with respect to the vertical portion 124 of the hook plate 104.

As mentioned above, the one or more apertures 128 and central aperture 130 of the hook plate 104 may be located at different portions of the vertical portion 124 of the hook plate 104 in order to allow for the hook arm 102 to be coupled to the hook plate 104 at different and various positions along the vertical portion 124. Thus, in an embodiment, the formed portion(s) 202 may be located between the apertures 128 located on the distal ends of the vertical portion 124 and the central aperture 130 located at approximately center of the vertical portion 124. In this manner, if the hook arm 102 is coupled to the vertical portion 124 of the hook plate 104 at one of the apertures 128 located on the distal ends of the vertical portion 124, the formed portion(s) 202 may abut at least one side of the second vertical portion 110 of the hook arm 102 and restrict rotation of the hook arm 102 relative to the hook plate 104. Further, if the hook arm 102 is coupled to the vertical portion 124 of the hook plate 104 at one of the central aperture 130, both of the two formed portions 202 may abut a respective side of the second vertical portion 110 of the hook arm 102 and restrict rotation of the hook arm 102 relative to the hook plate 104. In an embodiment, additional formed portion(s) (not shown) may be formed at the edges of the vertical portion 124 of the hook plate 104 such that in instances where the hook arm 102 is coupled to the vertical portion 124 of the hook plate 104 at one of the apertures 128 located on the distal ends of the vertical portion 124, these additional formed portion(s) (not shown) may, along with the formed portion(s) 202 depicted in FIGS. 10 through 18, abut both sides of the second vertical portion 110 of the hook arm 102 and restrict rotation of the hook arm 102 relative to the hook plate 104. Thus, any number of formed portion(s) 202 may be formed along the length of the vertical portion 124 including more raised portions than those depicted in FIGS. 10 through 18.

FIGS. 11, 14, 17, and 18 depict the interface between the formed portion(s) 202 and the second vertical portion 110 of the hook arm 102. When the carriage bolt 136 is extended through the aperture 122 defined within the second vertical portion 110 of the hook arm 102 and one of the one or more apertures 128 and central aperture 130 of the hook plate 104 and the nut 140 is engaged with the carriage bolt 136, the second vertical portion 110 seats between the formed portion(s) 202. In this state, the formed portion(s) 202 restrict rotation of the hook arm 102 with respect to the hook plate 104. Thus, the formed portion(s) 202 serve as the anti-rotation system for the example of FIGS. 10 through 18 as they interface with the hook arm 102. Specifically, the formed portion(s) 202 serving as the anti-rotation system for the example of FIGS. 10 through 18 may restrict rotation of the hook arm 102 with respect to the hook plate 104 about the Y-axis as indicated throughout the figures.

Figure 20:
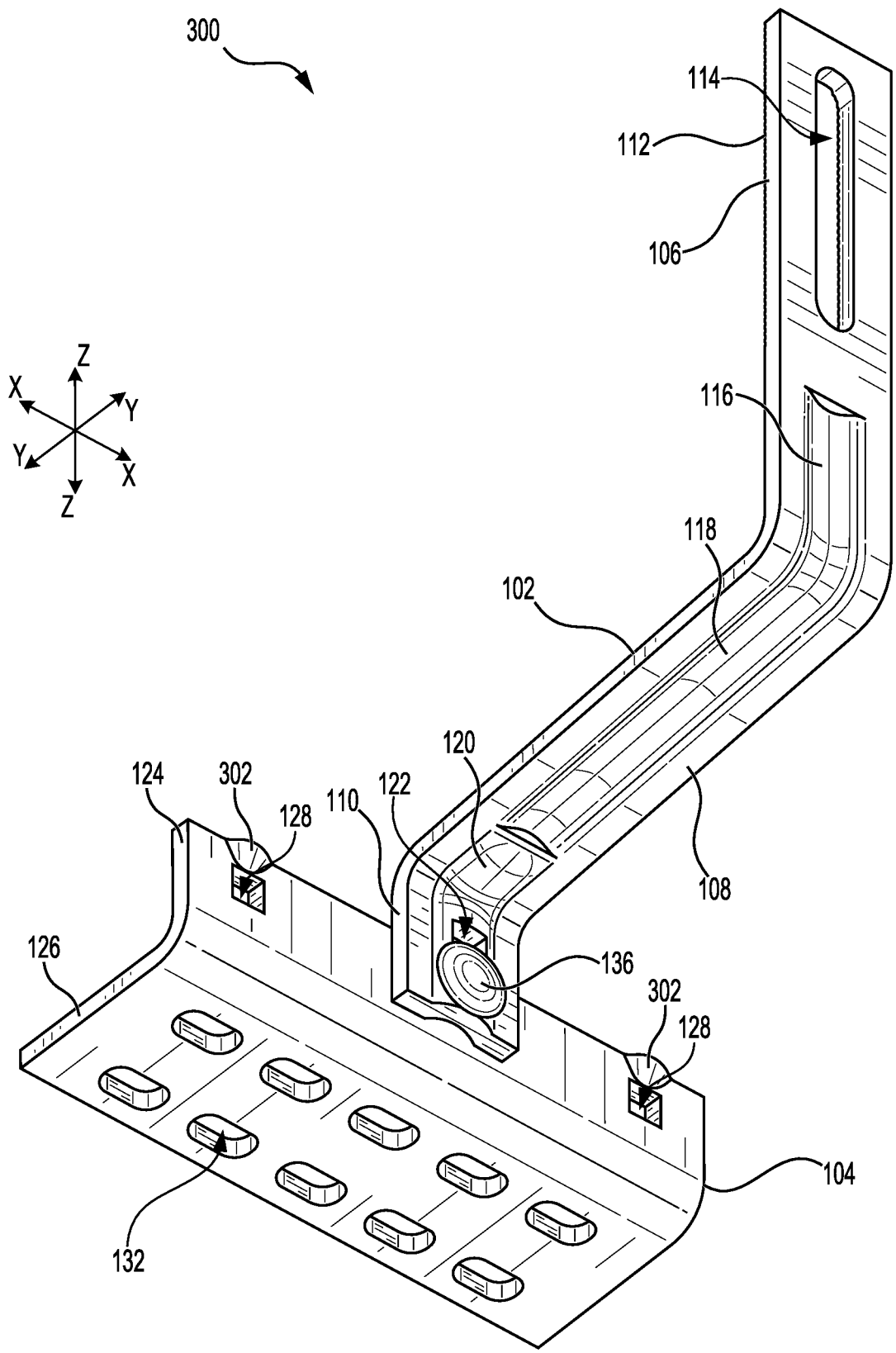
Figure 21:
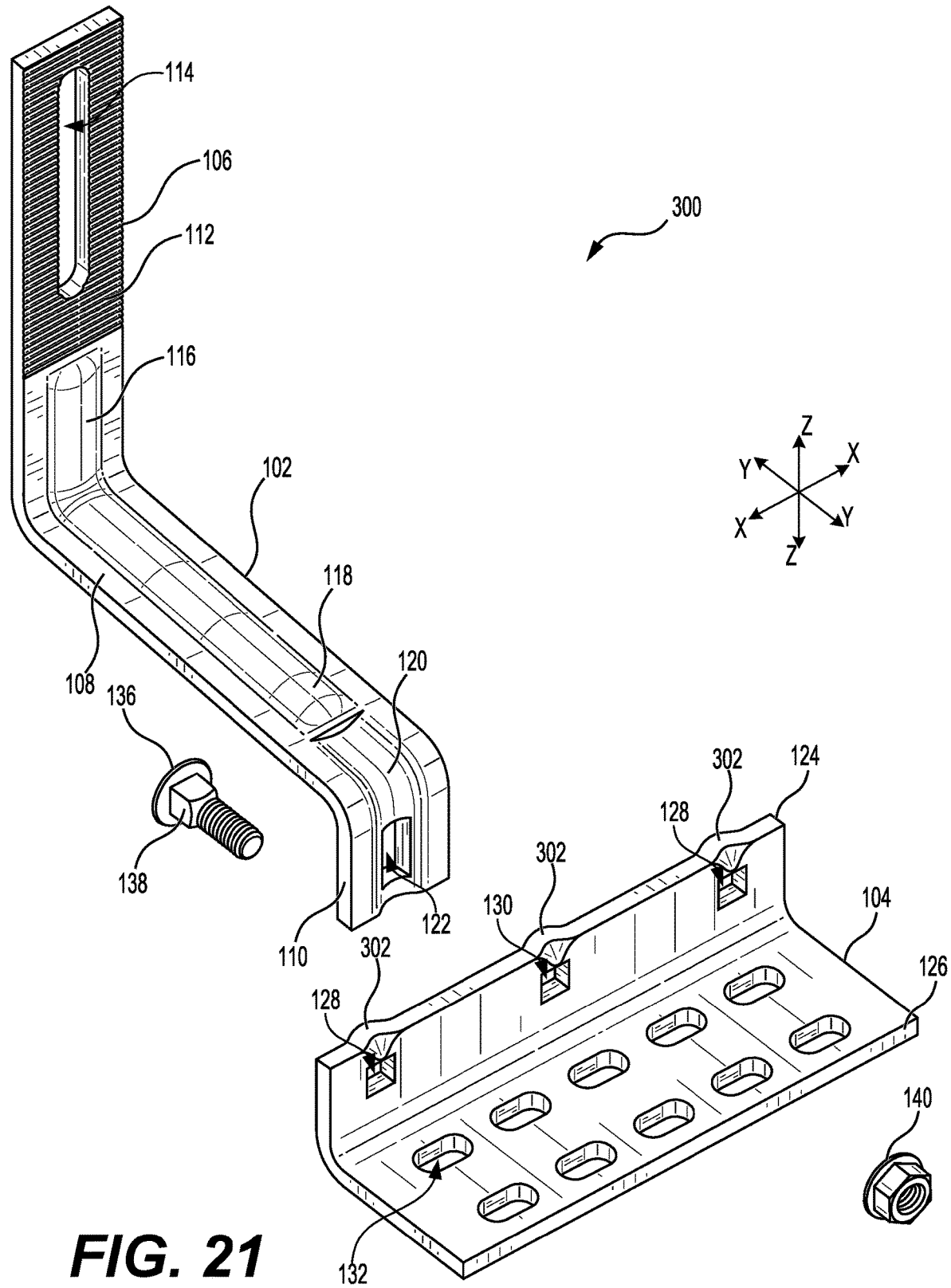
Figure 22:
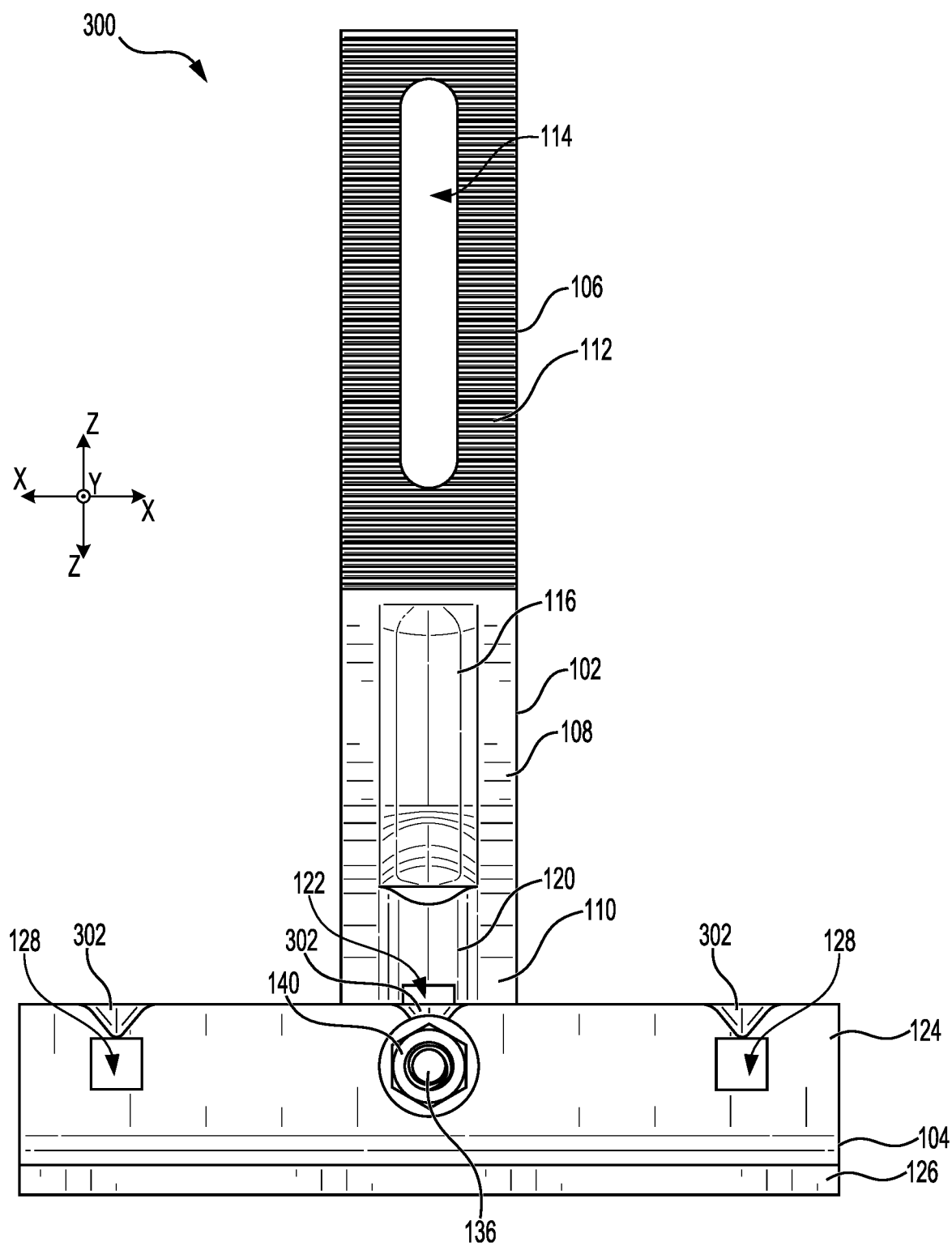
Figure 23:
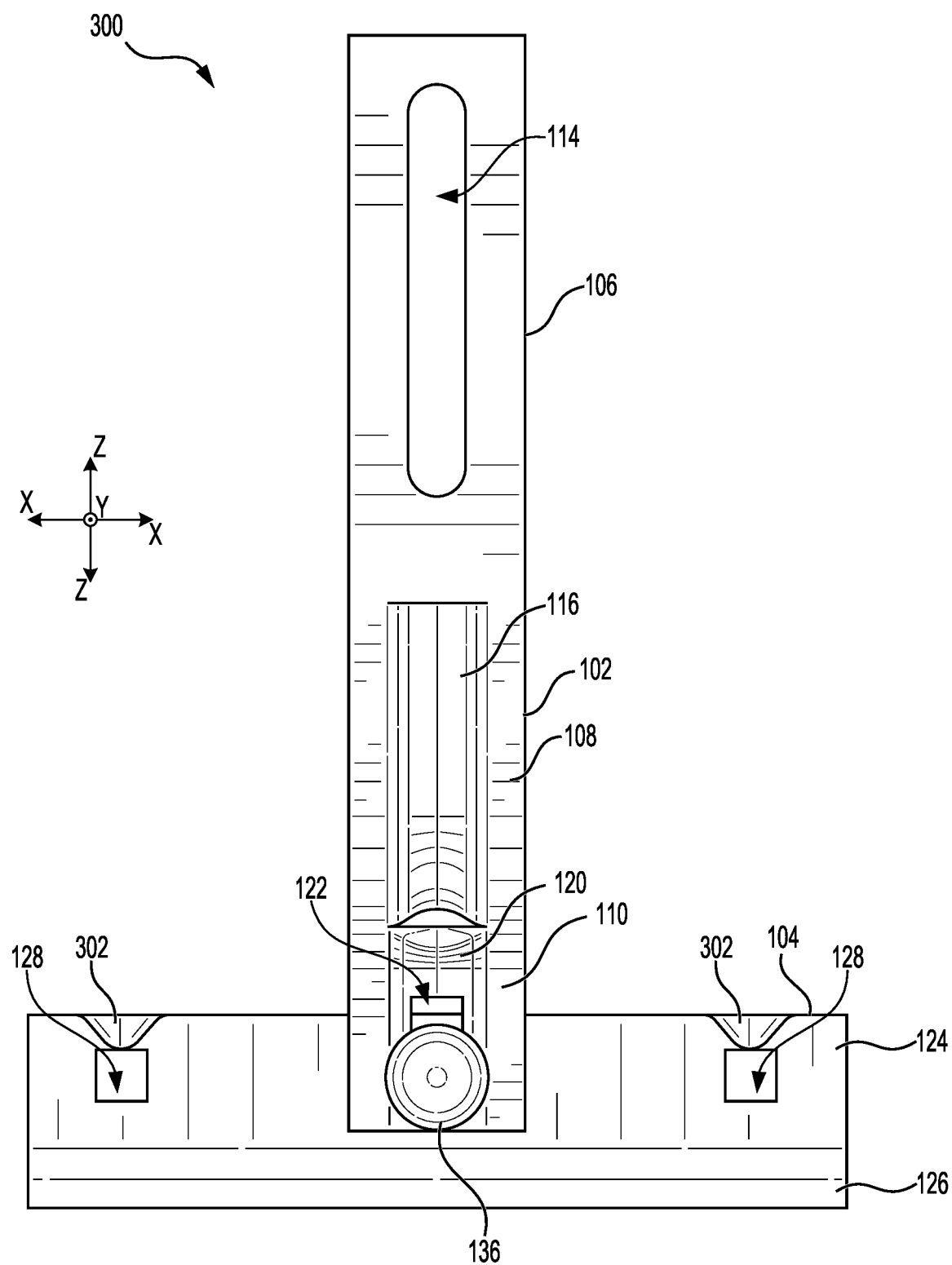
Figure 24:
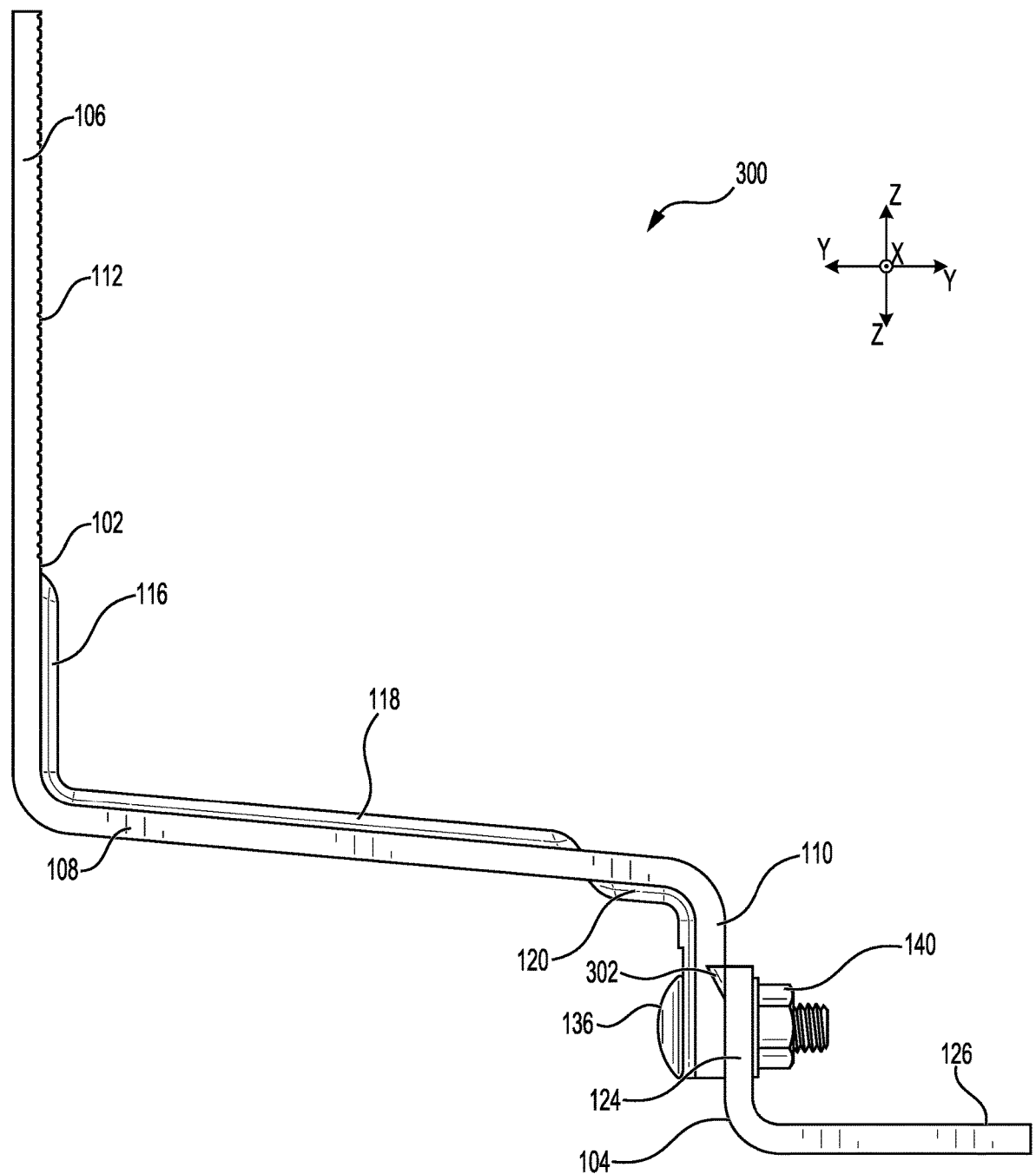
Figure 25:
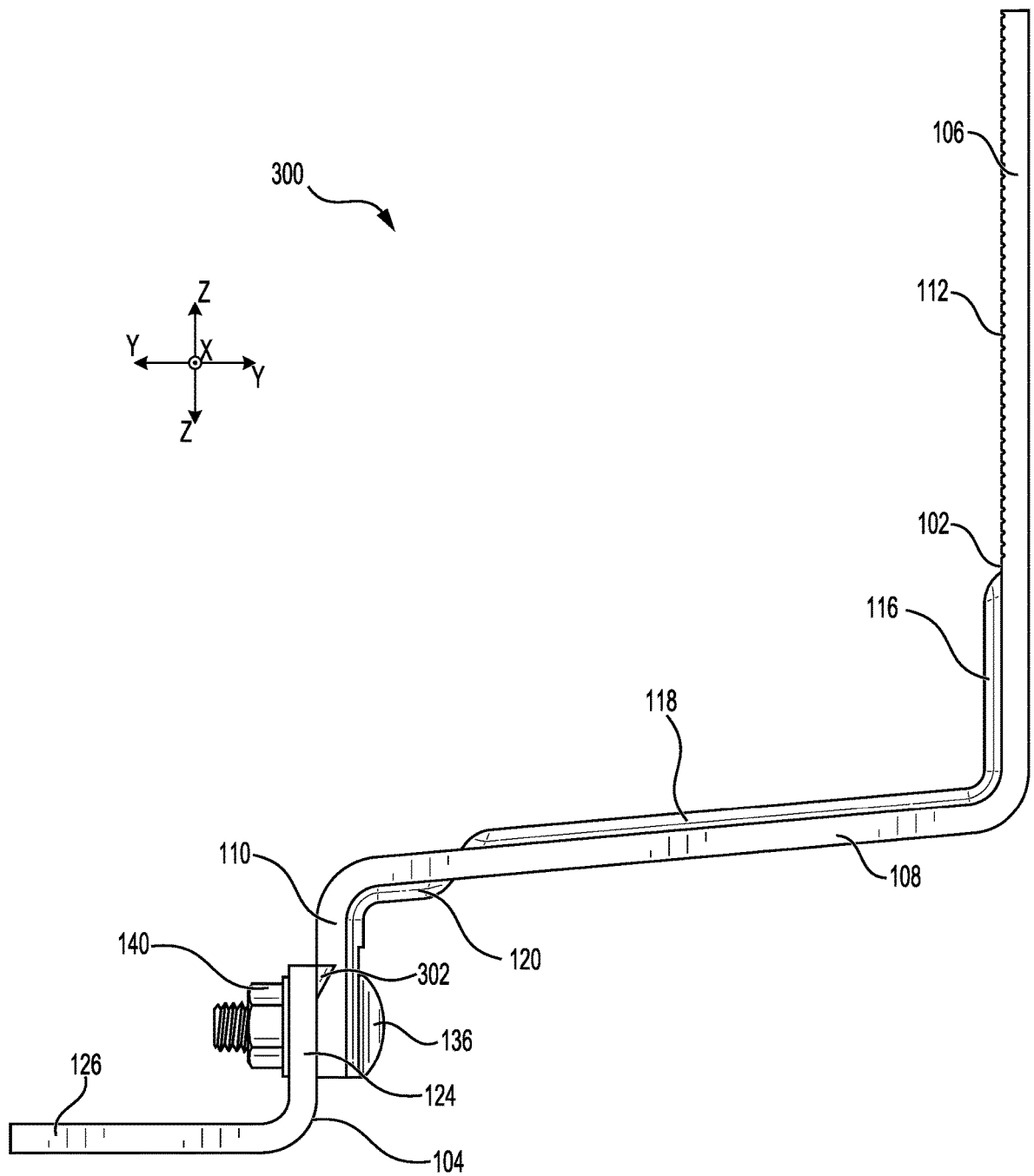
Figure 26:
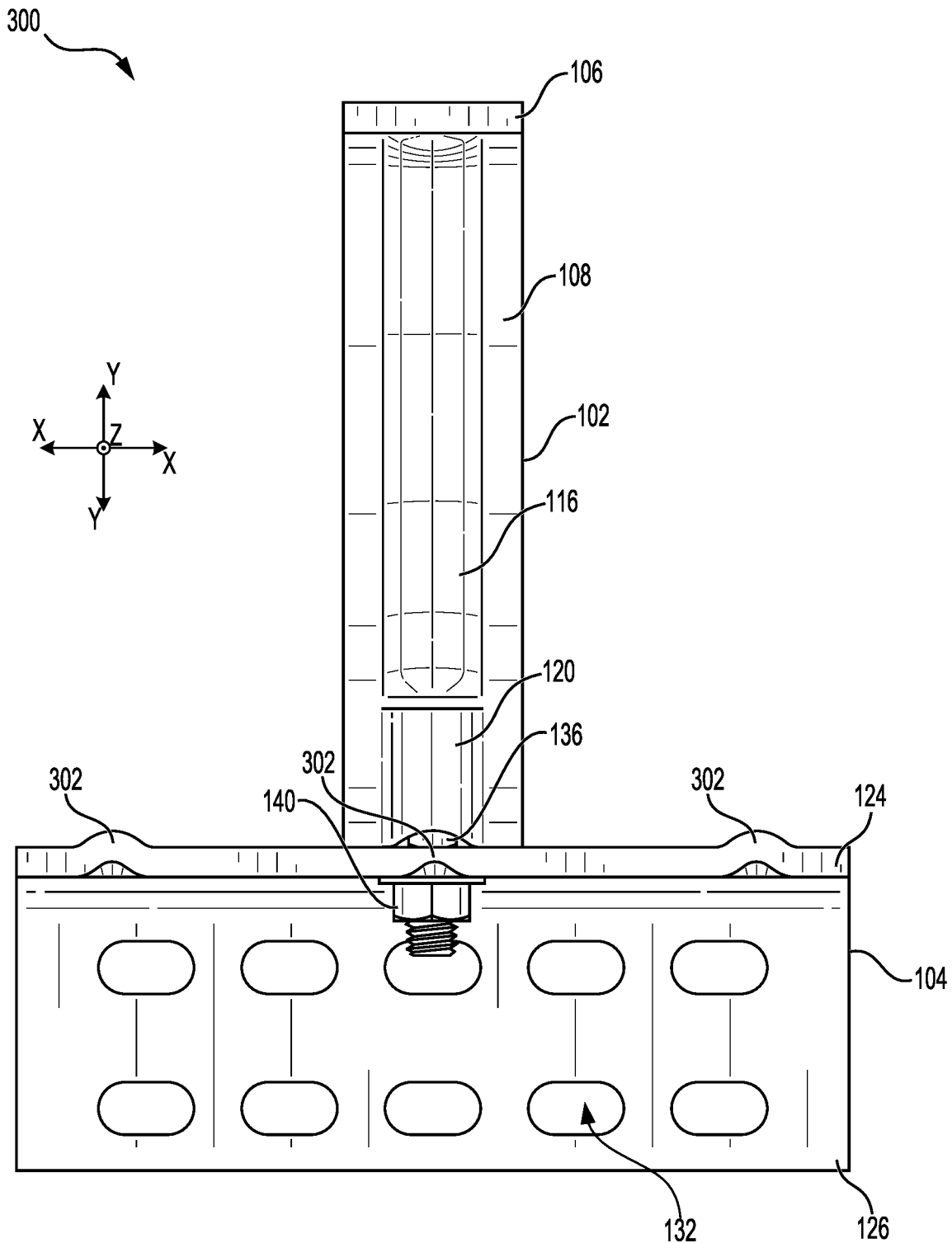
Figure 27:
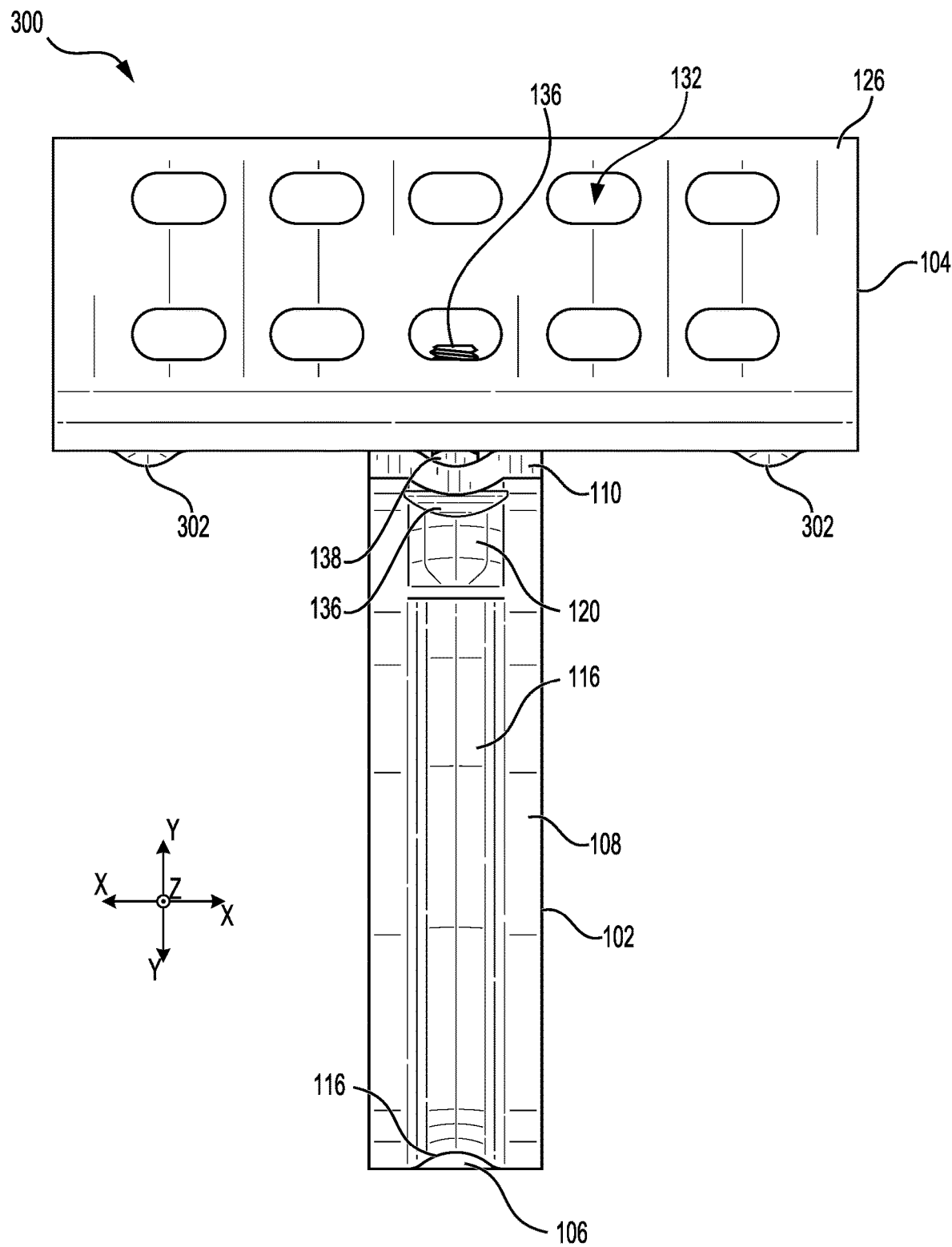
Figure 28:
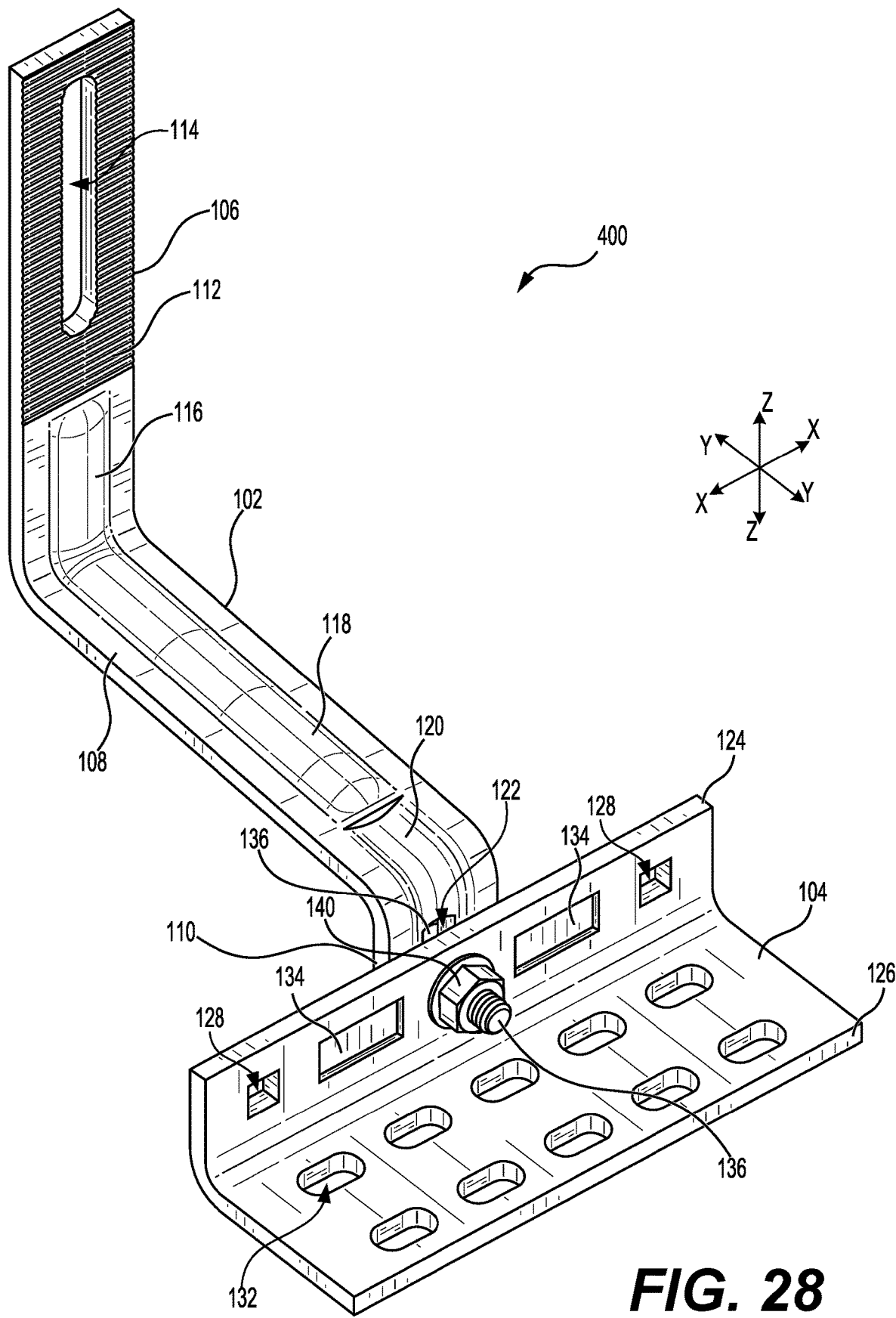
FIGS. 28 through 36 illustrate a mounting device including a carriage bolt as an anti-rotation system, according to an example of the principles described herein.

FIGS. 19 through 27 illustrate a mounting device 300 including at least one protrusion 302 as an anti-rotation system, according to an example of the principles described herein. Again, with the description of FIGS. 1 through 9 provided above detailing common elements of the hook arm 102 and the hook plate 104, the anti-rotation system of the example of FIGS. 19 through 27 will now be described. As to FIGS. 19 through 27, FIG. 19 illustrates a top, front, right-side perspective view of the mounting device 300 including at least one protrusion 302 as an anti-rotation system, according to an example of the principles described herein. FIG. 20 is a bottom, rear, left-side perspective view thereof. FIG. 21 is a top, front, right-side, exploded, perspective view thereof. FIG. 22 is a front side view thereof. FIG. 23 is a rear side view thereof. FIG. 24 is a right side view thereof. FIG. 25 is a left side view thereof. FIG. 26 is a top view thereof. FIG. 27 is a bottom view thereof.

As to the anti-rotation system of the example mounting device 300 of FIGS. 19 through 27, the anti-rotation system may include at least one protrusion 302 formed on the vertical portion 124 of the hook plate 104. The at least one protrusion 302 may, in an embodiment, include three protrusions 302 formed adjacent to or above the one or more apertures 128 and central aperture 130 of the hook plate 104.

As mentioned above, the one or more apertures 128 and central aperture 130 of the hook plate 104 may be located at different portions of the vertical portion 124 of the hook plate 104 in order to allow for the hook arm 102 to be coupled to the hook plate 104 at different and various positions along the vertical portion 124. Thus, in an embodiment, the protrusion(s) 302 may be formed adjacent to or above the one or more apertures 128 and central aperture 130. The protrusion(s) 302 may be configured to project into and/or seat within the aperture 122 defined within the second vertical portion 110 of the hook arm 102. In an embodiment, the protrusion(s) 302 may be formed and dimensioned to nested within the aperture(s) 122 in the hook and/or the third arched indent 120 formed on the second vertical portion 110 of the hook arm 102, and upon tightening of the carriage bolt 136 there is enough interference between the protrusion(s) 302 and the aperture(s) 122 and/or the third arched indent 120 to restrict rotation of the hook arm 102 relative to the hook plate 104. In this manner, if the hook arm 102 is coupled to the vertical portion 124 of the hook plate 104 at one of the one or more apertures 128 and central aperture 130, the protrusion(s) 302 interface within the aperture 122 and restrict rotation of the hook arm 102 relative to the hook plate 104. In an embodiment, additional protrusion(s) (not shown) may be formed along the length of the vertical portion 124 of the hook plate 104 such that in instances where the hook arm 102 is coupled to the vertical portion 124 of the hook plate 104 at one of the one or more apertures 128 and central aperture 130, these additional protrusion(s) (not shown) may, along with the protrusion(s) 302 depicted in FIGS. 10 through 18, abut both sides of the second vertical portion 110 of the hook arm 102 and restrict rotation of the hook arm 102 relative to the hook plate 104. Thus, any number of protrusion(s) 302 may be formed along the length of the vertical portion 124 including more protrusions than those depicted in FIGS. 10 through 18.

FIGS. 19, 22, 26, and 27 depict the interface between the protrusion(s) 302 and the aperture 122 defined within the second vertical portion 110 of the hook arm 102. When the carriage bolt 136 is extended through the aperture 122 defined within the second vertical portion 110 of the hook arm 102 and one of the one or more apertures 128 and central aperture 130 of the hook plate 104 and the nut 140 is engaged with the carriage bolt 136, the protrusion(s) 302 seat within the aperture 122. In this state, the protrusion(s) 302 restrict rotation of the hook arm 102 with respect to the hook plate 104. Thus, the protrusion(s) 302 serve as the anti-rotation system for the example of FIGS. 19 through 27 as they interface with the hook arm 102. Specifically, the protrusion(s) 302 serving as the anti-rotation system for the example of FIGS. 19 through 27 may restrict rotation of the hook arm 102 with respect to the hook plate 104 about the Y-axis as indicated throughout the figures.

Figure 29:
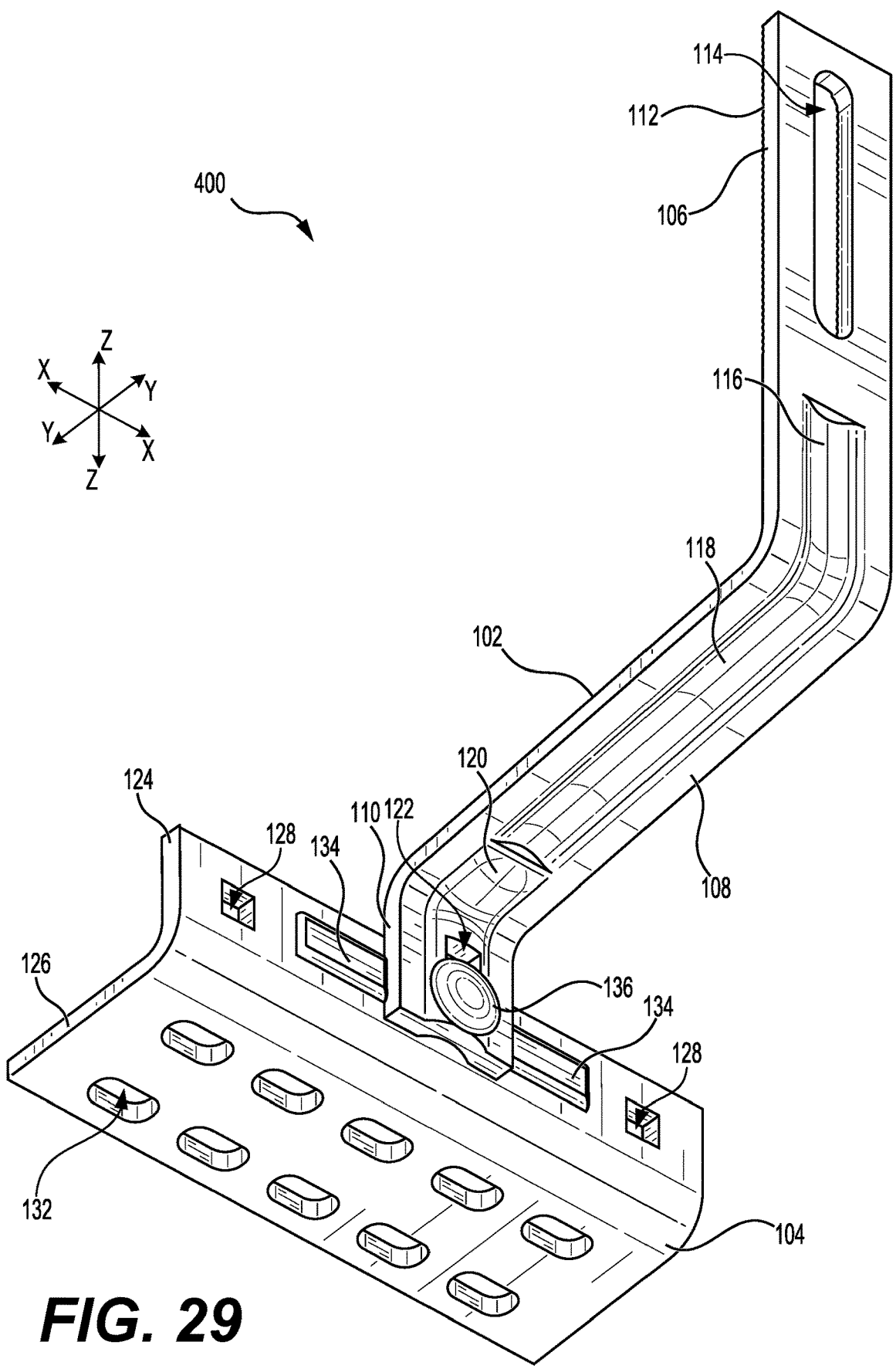
Figure 30:
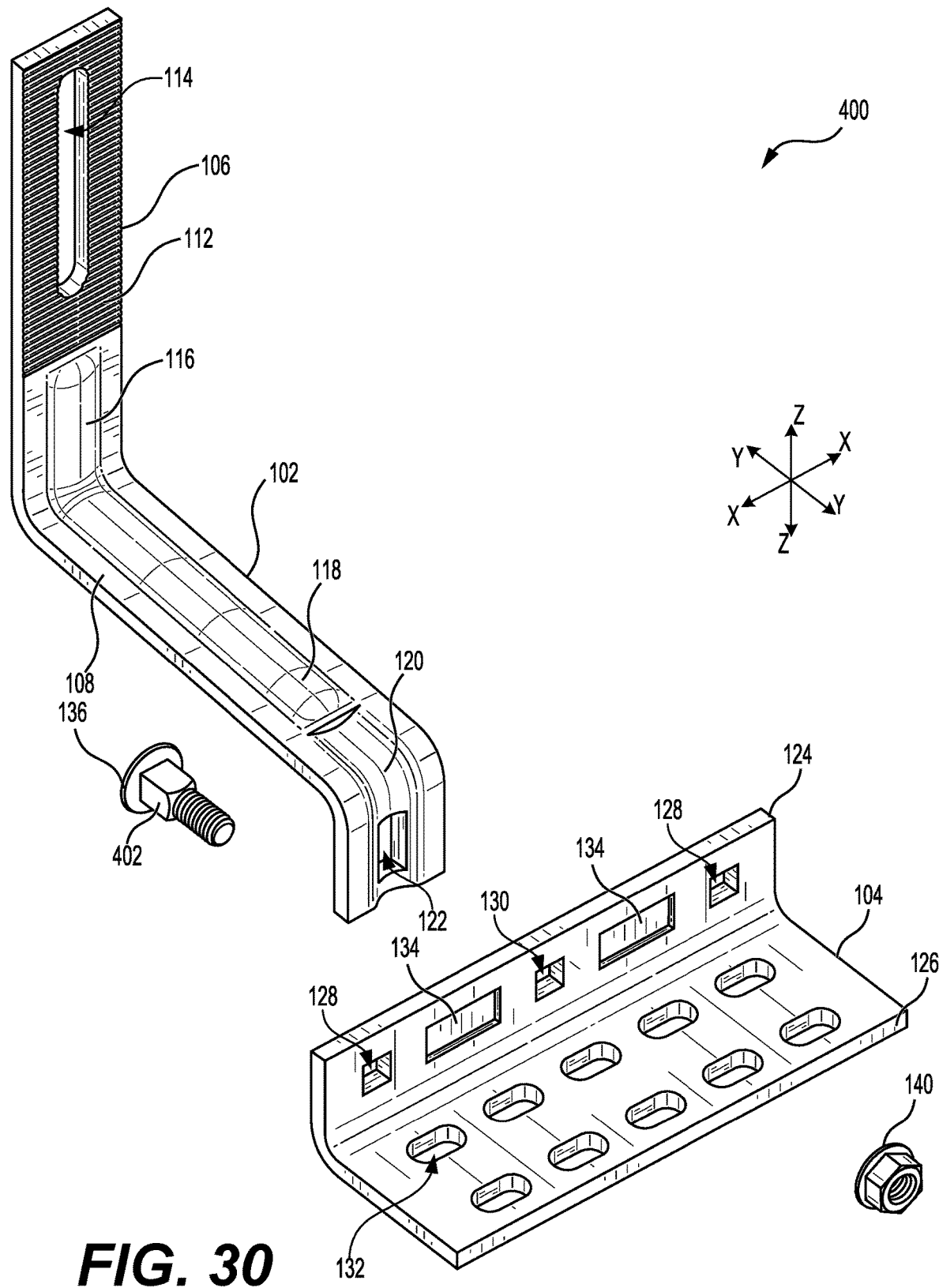
Figure 31:
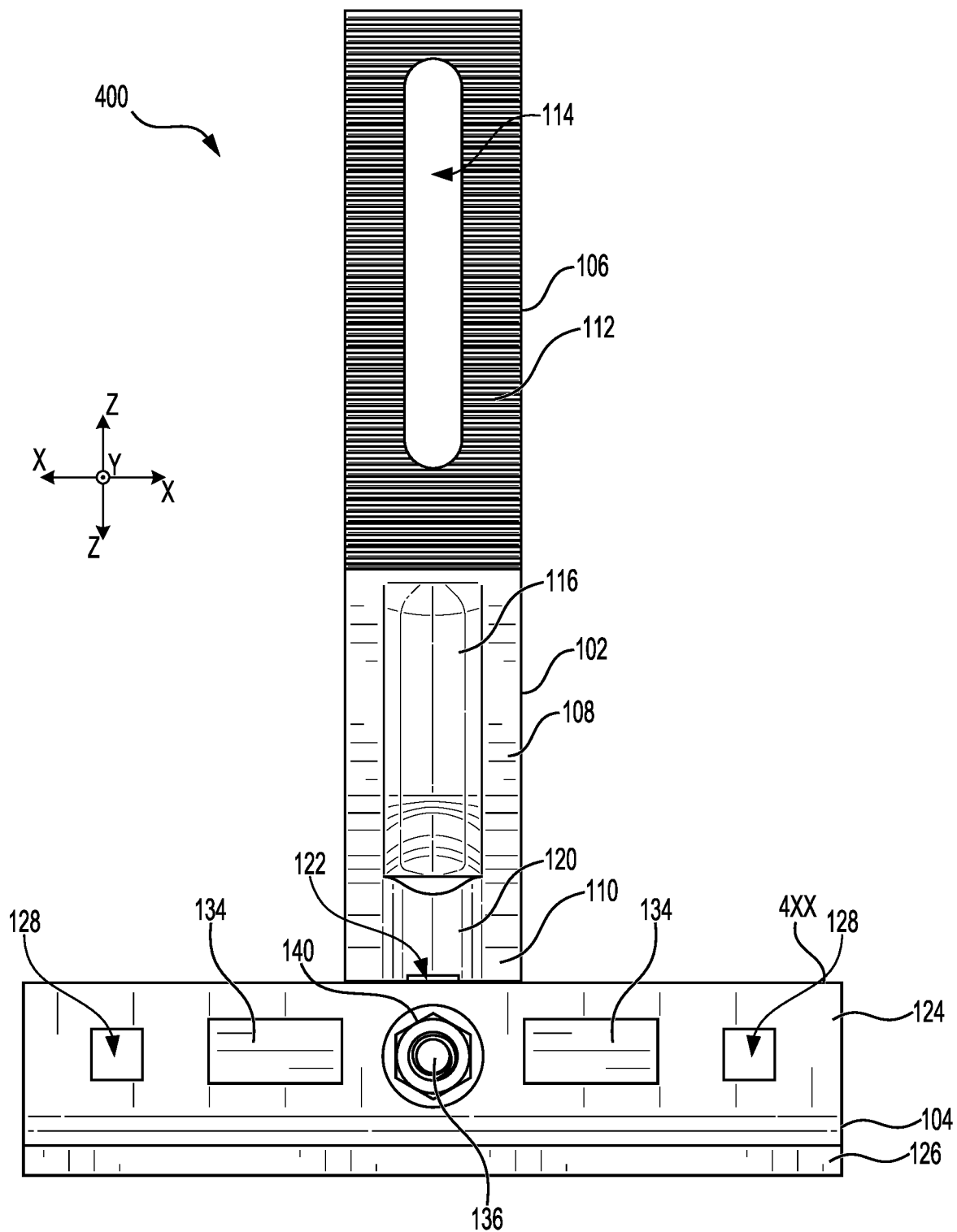
Figure 32:
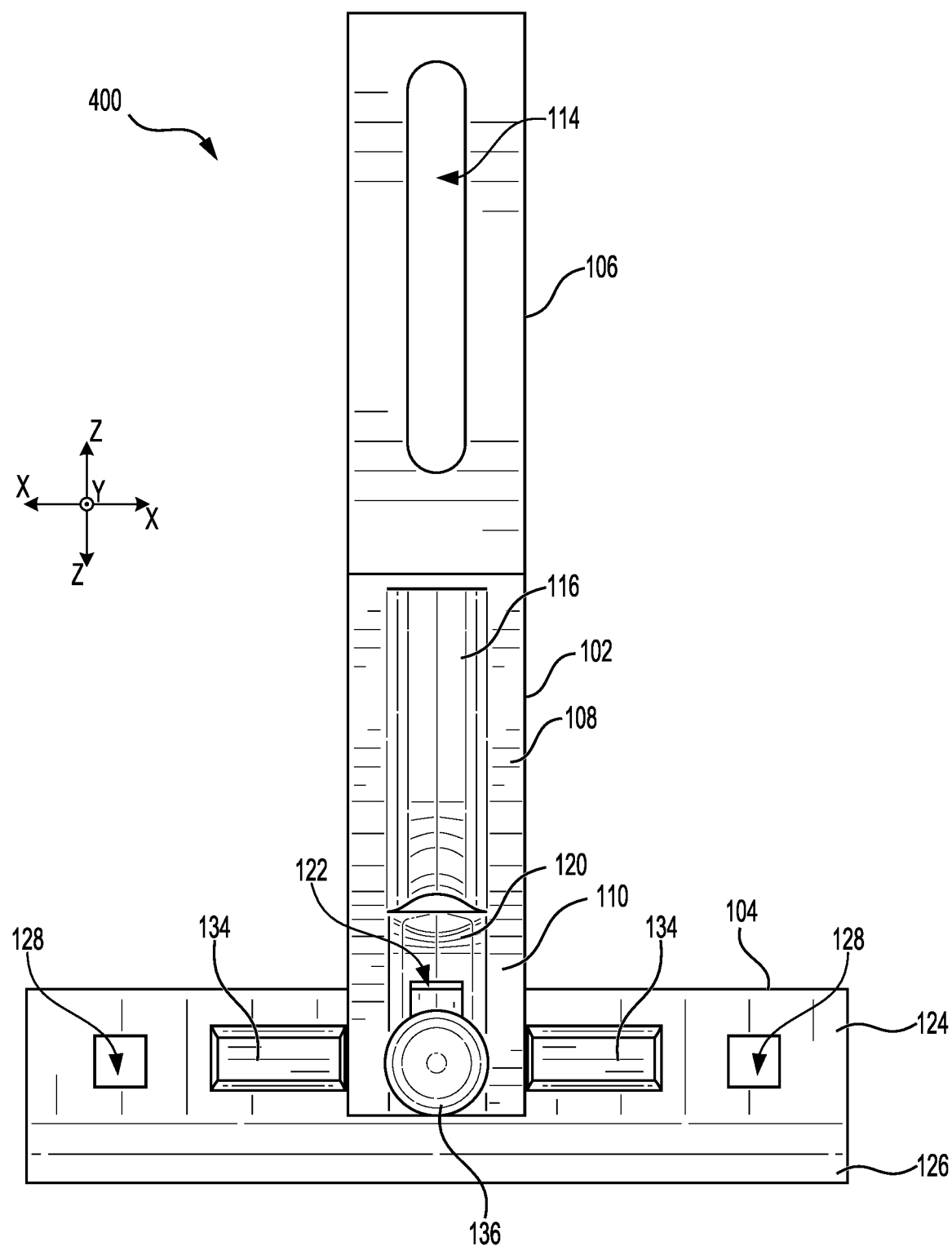
Figure 33:
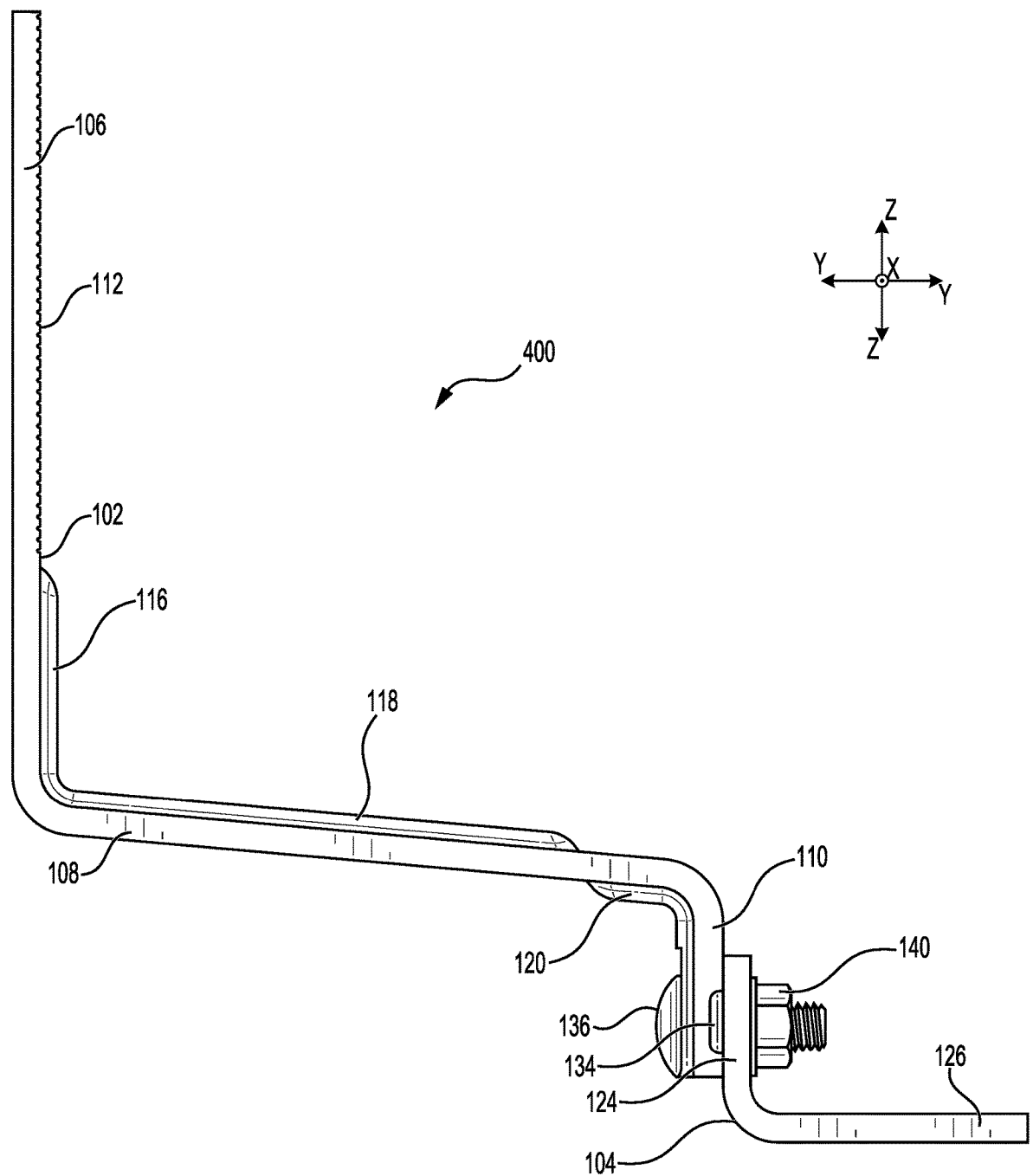
Figure 34:
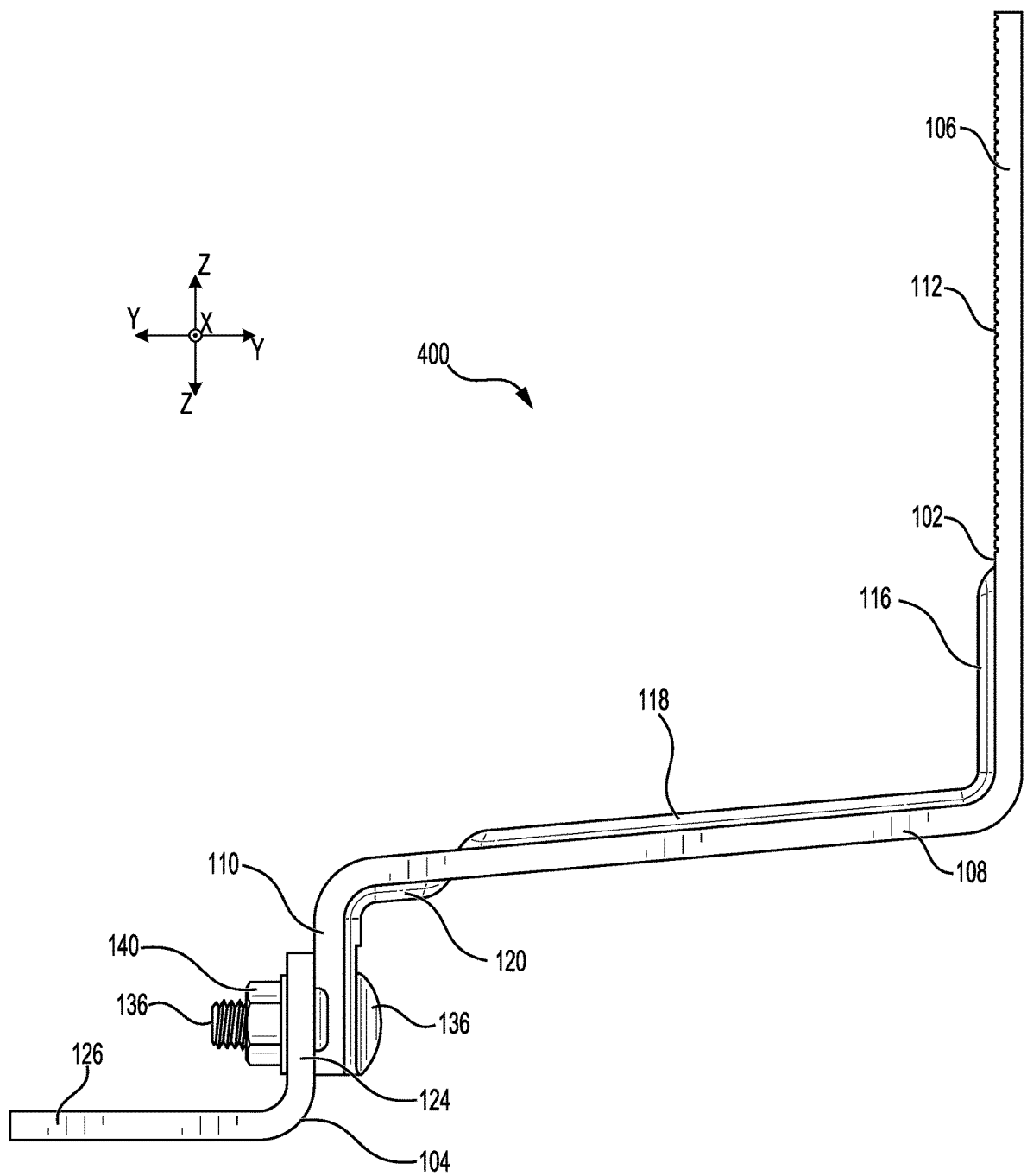
Figure 35:
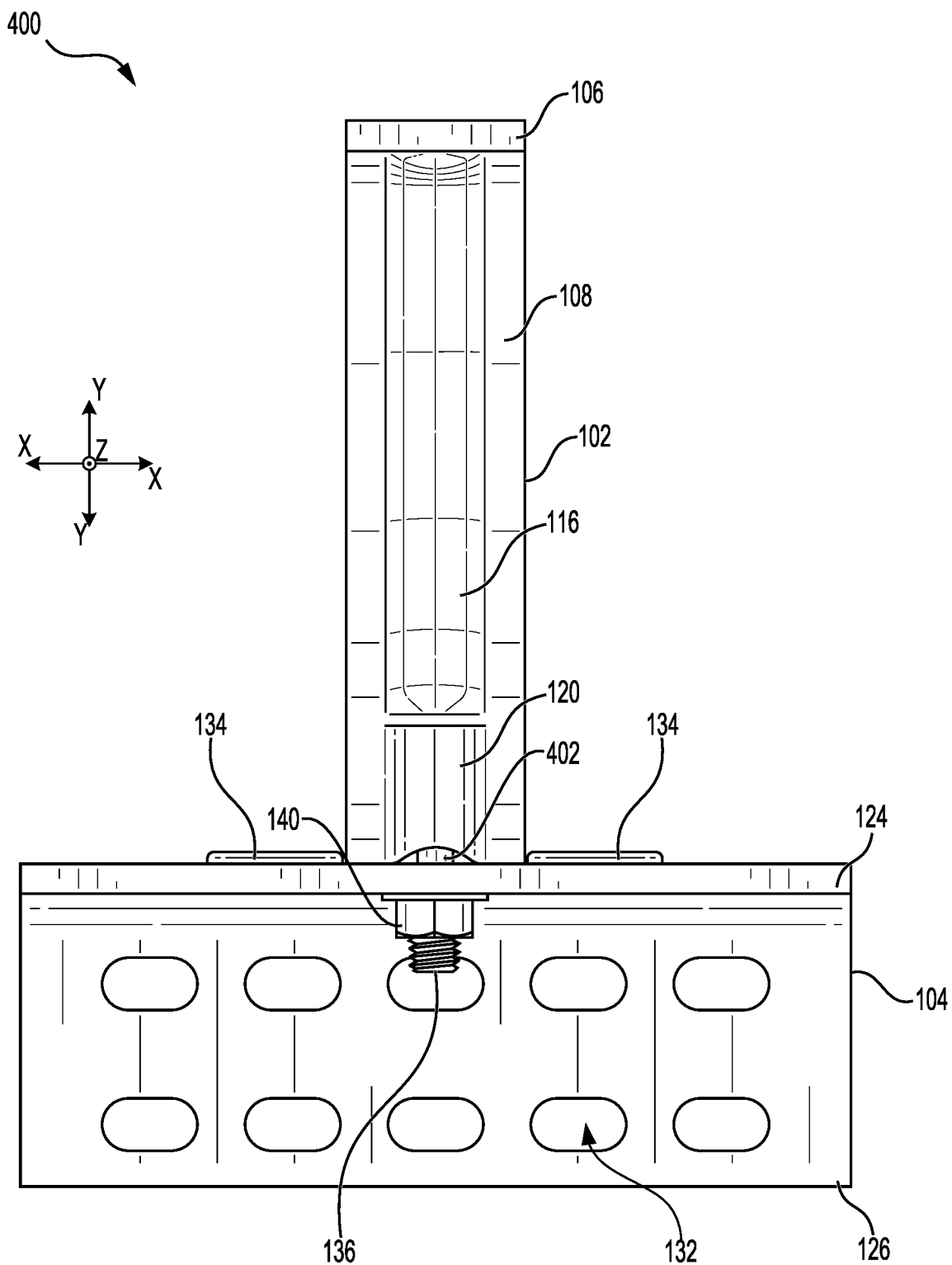
Figure 36:
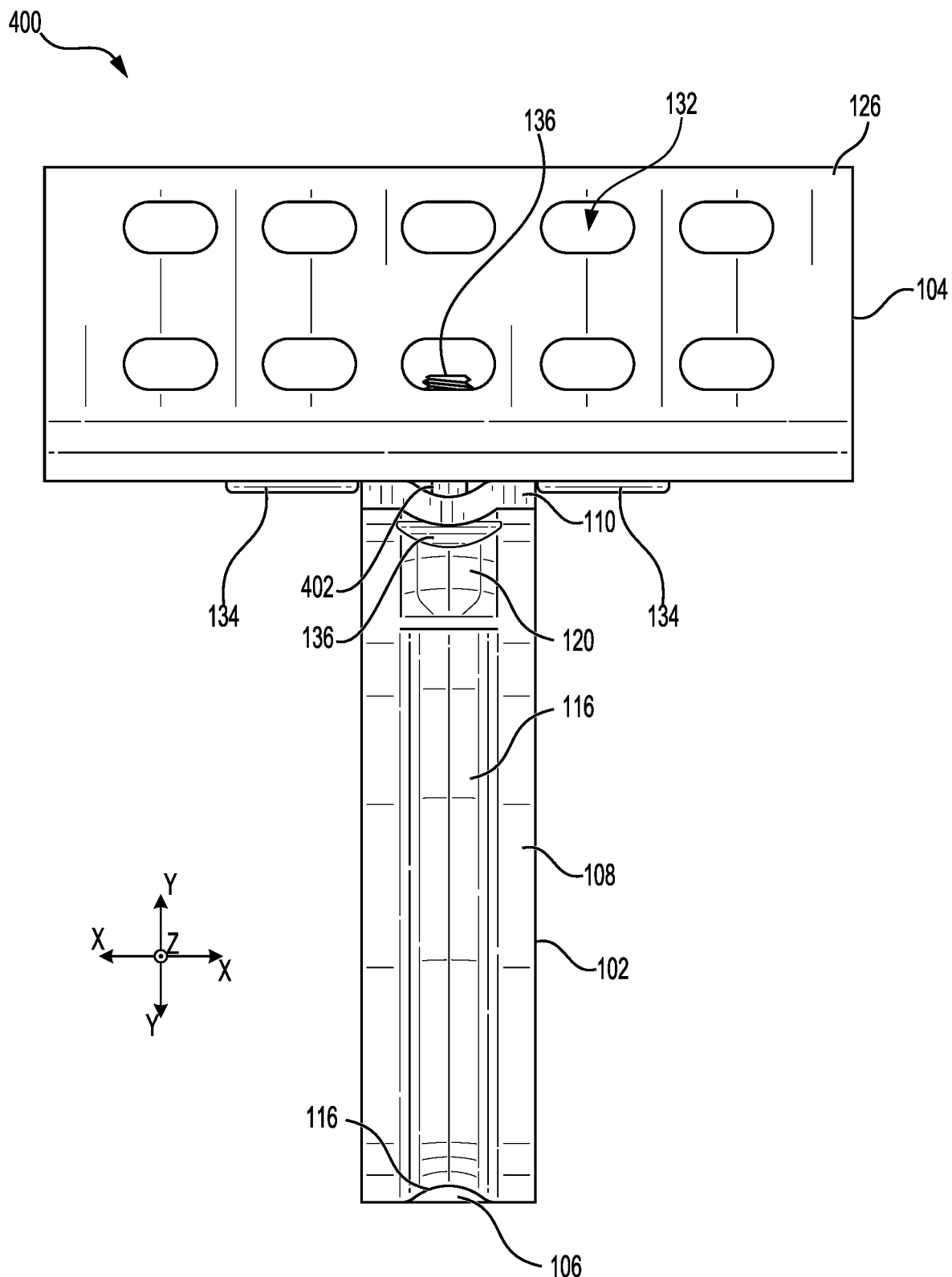
Figure 37:
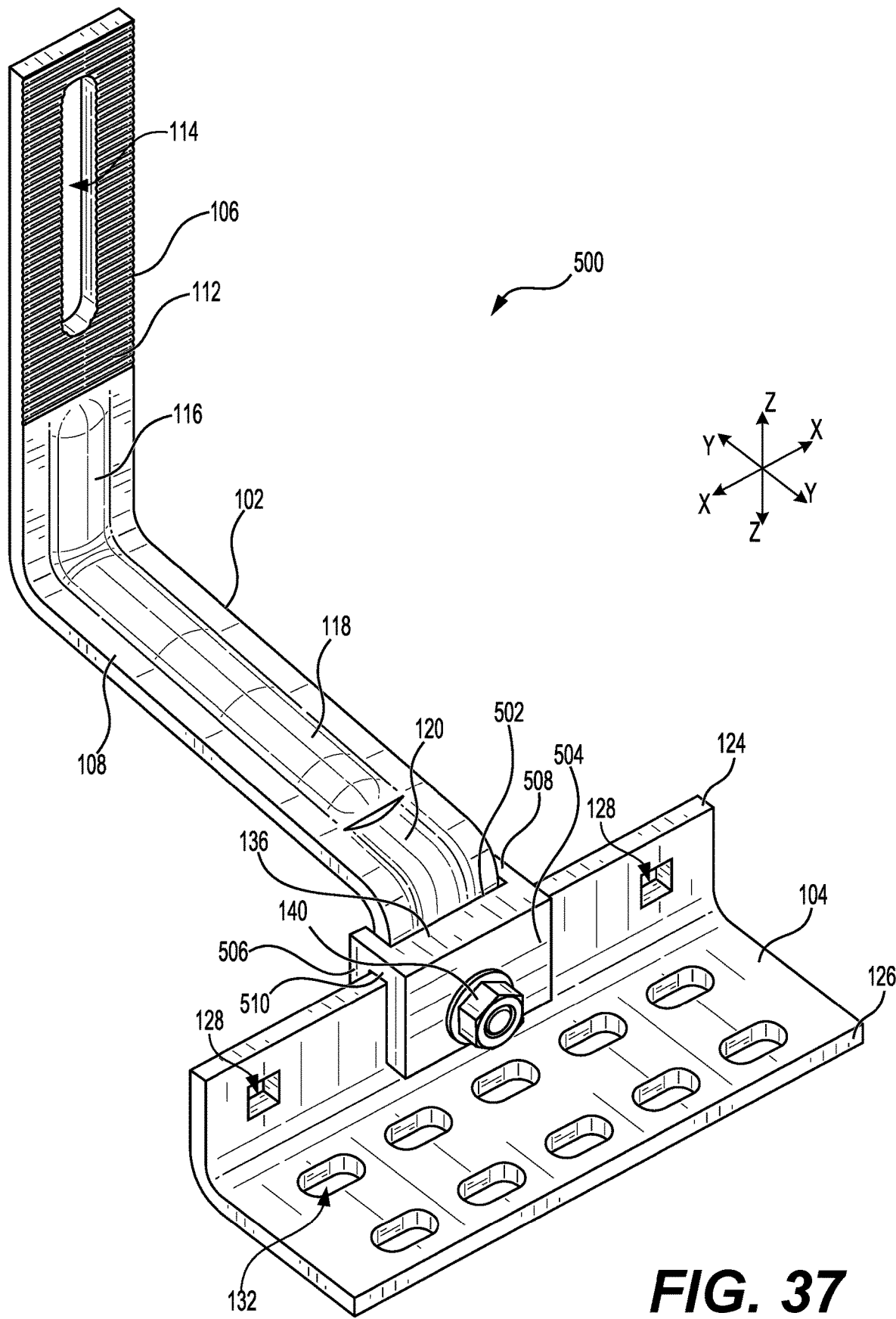
FIGS. 37 through 45 illustrate a mounting device including a u-shaped plate as an anti-rotation system, according to an example of the principles described herein.

FIGS. 28 through 36 illustrate a mounting device 400 including a carriage bolt 136 as an anti-rotation system, according to an example of the principles described herein. Again, with the description of FIGS. 1 through 9 provided above detailing common elements of the hook arm 102 and the hook plate 104, the anti-rotation system of the example of FIGS. 28 through 36 will now be described. As to FIGS. 28 through 36, FIG. 28 illustrates a top, front, right-side perspective view of the mounting device 400 including a carriage bolt 136 as an anti-rotation system, according to an example of the principles described herein. FIG. 29 is a bottom, rear, left-side perspective view thereof. FIG. 30 is a top, front, right-side, exploded, perspective view thereof. FIG. 31 is a front side view thereof. FIG. 32 is a rear side view thereof. FIG. 33 is a right-side view thereof. FIG. 34 is a left-side view thereof. FIG. 35 is a top view thereof. FIG. 36 is a bottom view thereof.

As to the anti-rotation system of the example mounting device 400 of FIGS. 28 through 36, the anti-rotation system may include a carriage bolt 136 that includes an extended neck 402 depicted in, for example, FIG. 30 which is longer than the neck 138 of the carriage bolts 136 described herein in connection with other examples.

In the examples described herein, the aperture 122 defined within the second vertical portion 110 of the hook arm 102 may include a square shape in order to interface with the square cross-sectional shape of the neck 138, 402 of the carriage bolts 136 described herein. However, the aperture 122 may include any interior shape and the neck 138, 402 of the carriage bolts 136 may include any cross-sectional shape that includes at least one point therein where a derivative of a continuous function is discontinuous or does not exist (e.g., a corner, a cusp, etc.). The square cross-sectional shape of the neck 138, 402 of the carriage bolts 136 described herein, therefore, have four such discontinuous points. Likewise, the square interior shape of the aperture 122 described herein also has four such discontinuous points. The interior shape of the aperture 122 and the cross-sectional shape of the neck 138, 402 of the carriage bolts 136 may include any shape that has at least one point where a derivative of a continuous function is discontinuous or does not exist. These shapes may include, for example, a triangle, a square, a quadrilateral, a polygon (e.g., a hexagon), a star polygon, and other shapes that have at least one point where a derivative of a continuous function is discontinuous or does not exist. Stated another way, the interior shape of the aperture 122 and the cross-sectional shape of the neck 138, 402 of the carriage bolts 136 may include any non-circular shape such that the carriage bolt 136 does not rotate with respect to the aperture 122.

Further, the one or more apertures 128 and central aperture 130 may similarly include an interior profile shape that has at least one point where a derivative of a continuous function is discontinuous or does not exist (e.g., a corner, a cusp, etc.) in a manner as similarly described above in connection with the aperture 122 and the neck 402 of the carriage bolt 136. Alternatively, in an embodiment not shown, the one or more apertures 128 and central aperture 130 may have an interior that matches the interior profile shape of the aperture 122 and/or the cross-sectional shape of the neck 402 of the carriage bolts 136 as described above. In the example of FIGS. 28 through 36, the carriage bolt 136 that includes an extended neck 402 may be long enough to extend through the aperture 122 and one of the one or more apertures 128 and central aperture 130 of the hook plate 104. Thus, the neck 402 of the carriage bolt 136 may be dimensioned to engage with both the aperture 122 and one of the one or more apertures 128 and central aperture 130. In this manner, if the hook arm 102 is coupled to the vertical portion 124 of the hook plate 104 at one of the one or more apertures 128 and central aperture 130, the extended neck 402 of the carriage bolt 136 restrict rotation of the hook arm 102 relative to the hook plate 104. In an embodiment, the extended neck 402 of the carriage bolt 136 may extend further than an off-the-shelf carriage bolt may provide, and a custom carriage bolt may be manufactured for these examples of FIGS. 28 through 36.

FIGS. 30 and 36 depict the interface between the extended neck 402 of the carriage bolt 136 and the aperture 122 and one or more apertures 128 and central aperture 130. When the carriage bolt 136 is extended through the aperture 122 and one of the one or more apertures 128 and central aperture 130 and the nut 140 is engaged with the carriage bolt 136, the extended neck 402 of the carriage bolt 136 engages with these elements and, in this state, restricts rotation of the hook arm 102 with respect to the hook plate 104. Thus, the extended neck 402 of the carriage bolt 136 serves as the anti-rotation system for the example of FIGS. 28 through 36. Specifically, the extended neck 402 of the carriage bolt 136 serving as the anti-rotation system for the example of FIGS. 28 through 36 may restrict rotation of the hook arm 102 with respect to the hook plate 104 about the Y-axis as indicated throughout the figures.

In an embodiment, the anti-rotation system including the carriage bolt 136 having the extended neck 402 may be implemented in any of the other embodiments of the mounting device in addition to the respective anti-rotation systems described herein. The inclusion of the carriage bolt 136 having the extended neck 402 into other examples may further support other anti-rotation systems in order to further restrict rotation of the hook arm 102 relative to the hook plate 104. For example, FIGS. 28 through 36 further depict the at least one raised portion 134 formed on the vertical portion 124 of the hook plate 104 as described above in connection with FIGS. 1 through 9. The raised portion(s) 134 may be used in conjunction with the carriage bolt 136 having the extended neck 402 in order to further restrict rotation of the hook arm 102 relative to the hook plate 104. The carriage bolt 136 having the extended neck 402 may be used in connection with the raised portion(s) 134 of FIGS. 1 through 9 and FIGS. 28 through 36, the formed portion(s) 202 of FIGS. 10 through 18, the protrusion(s) 302 of FIGS. 19 through 27, and the u-shaped plate 502 of FIGS. 37 through 45.

Figure 38:
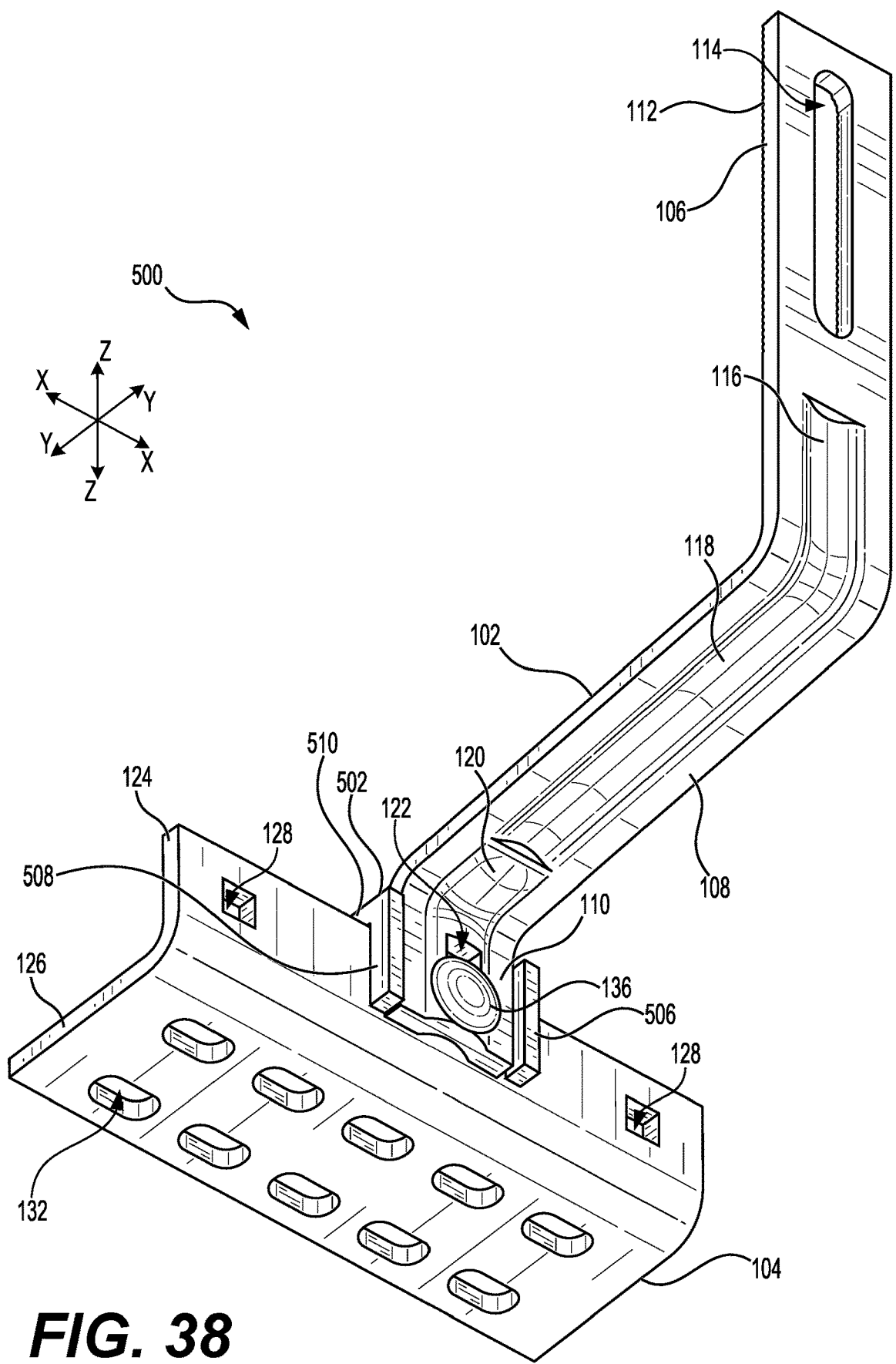
Figure 39:
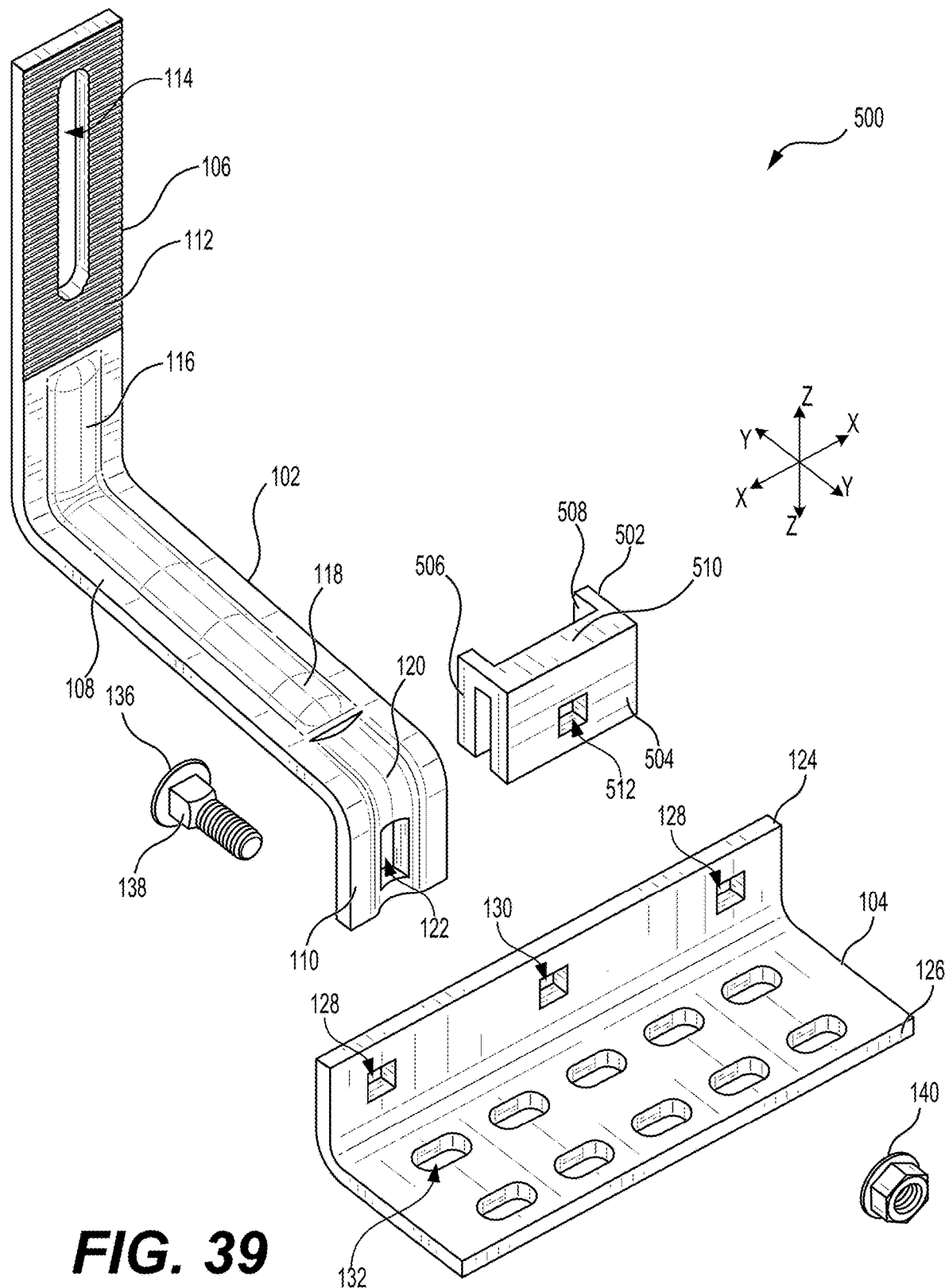
Figure 40:
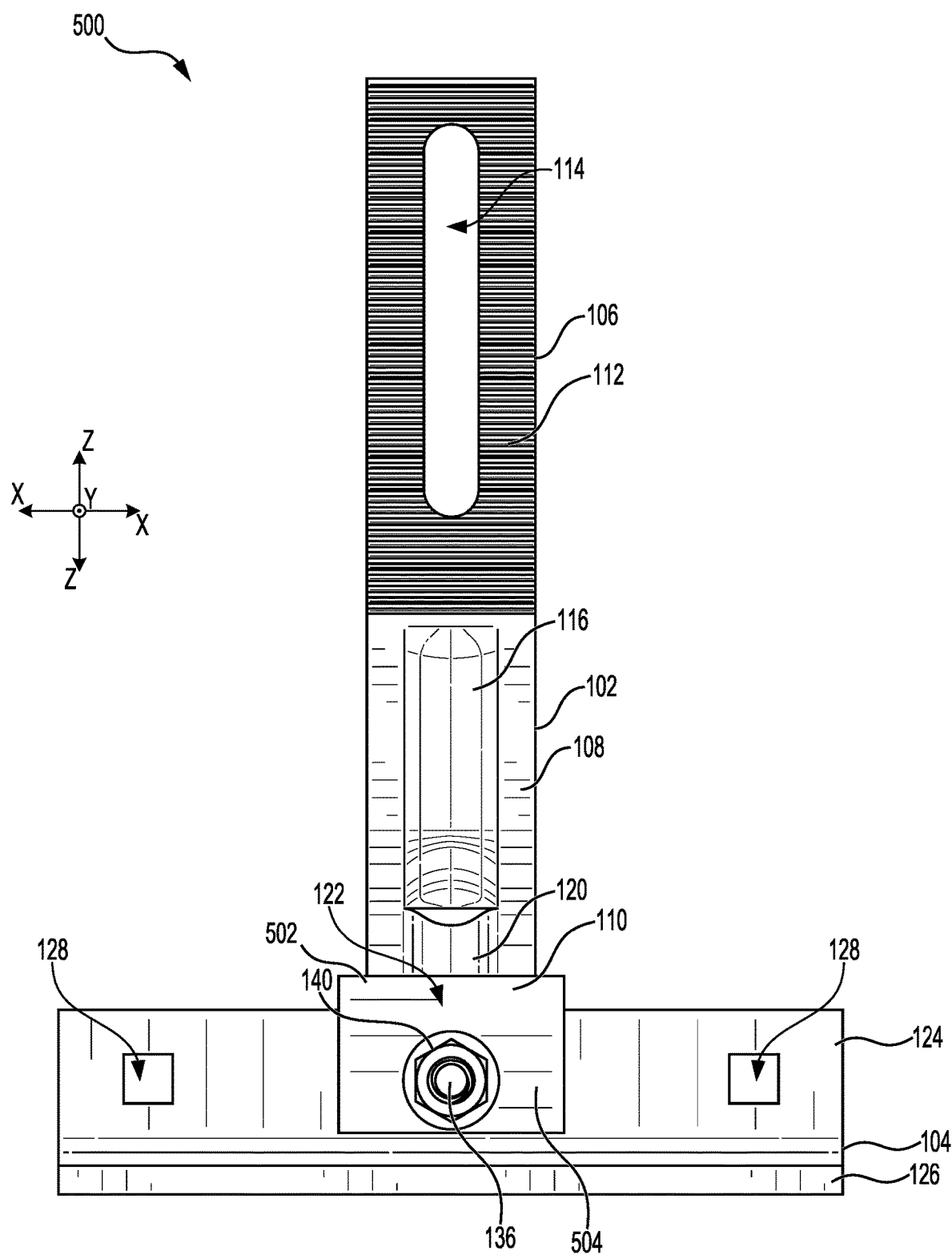
Figure 41:
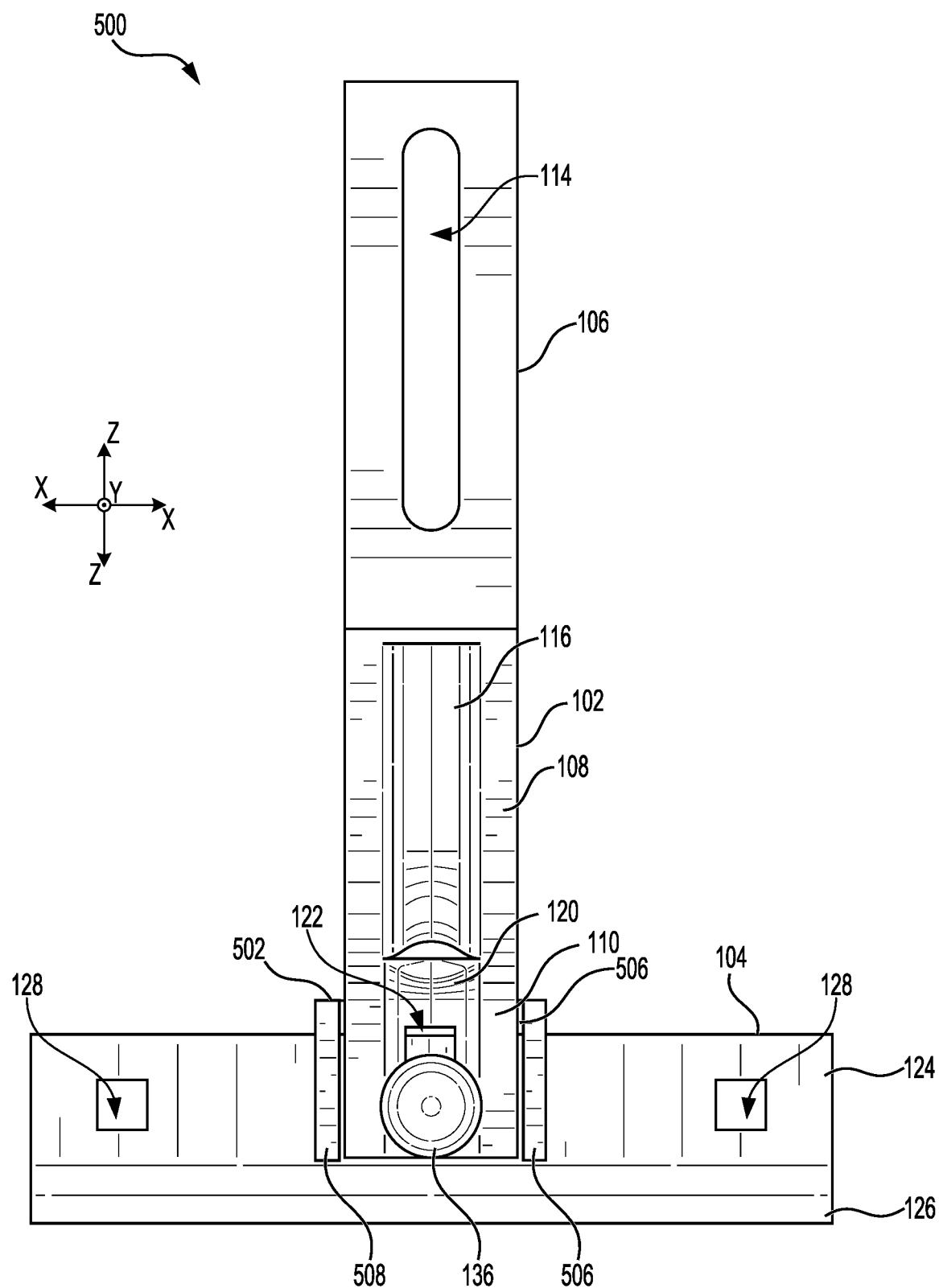
Figure 42:
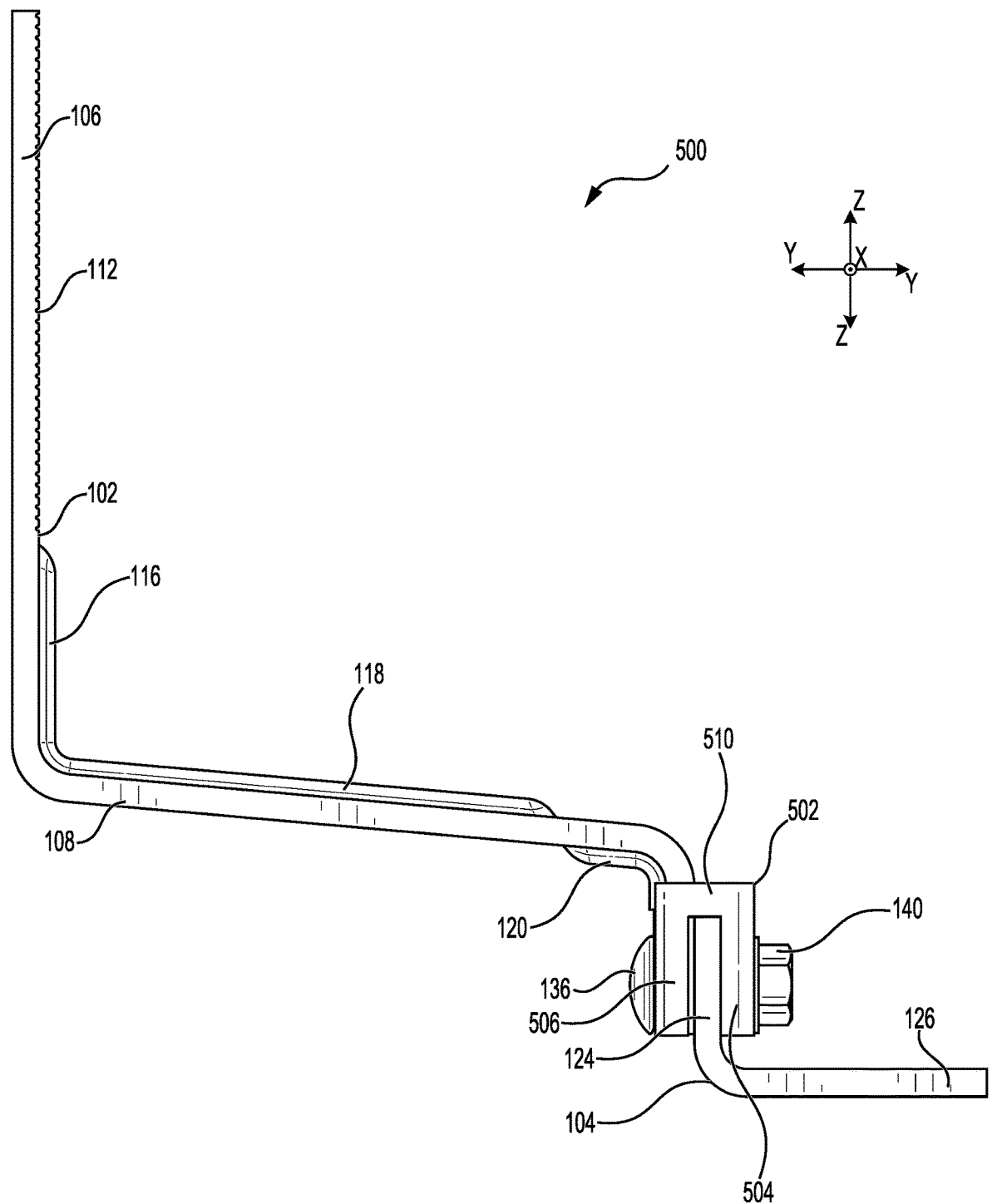
Figure 43:
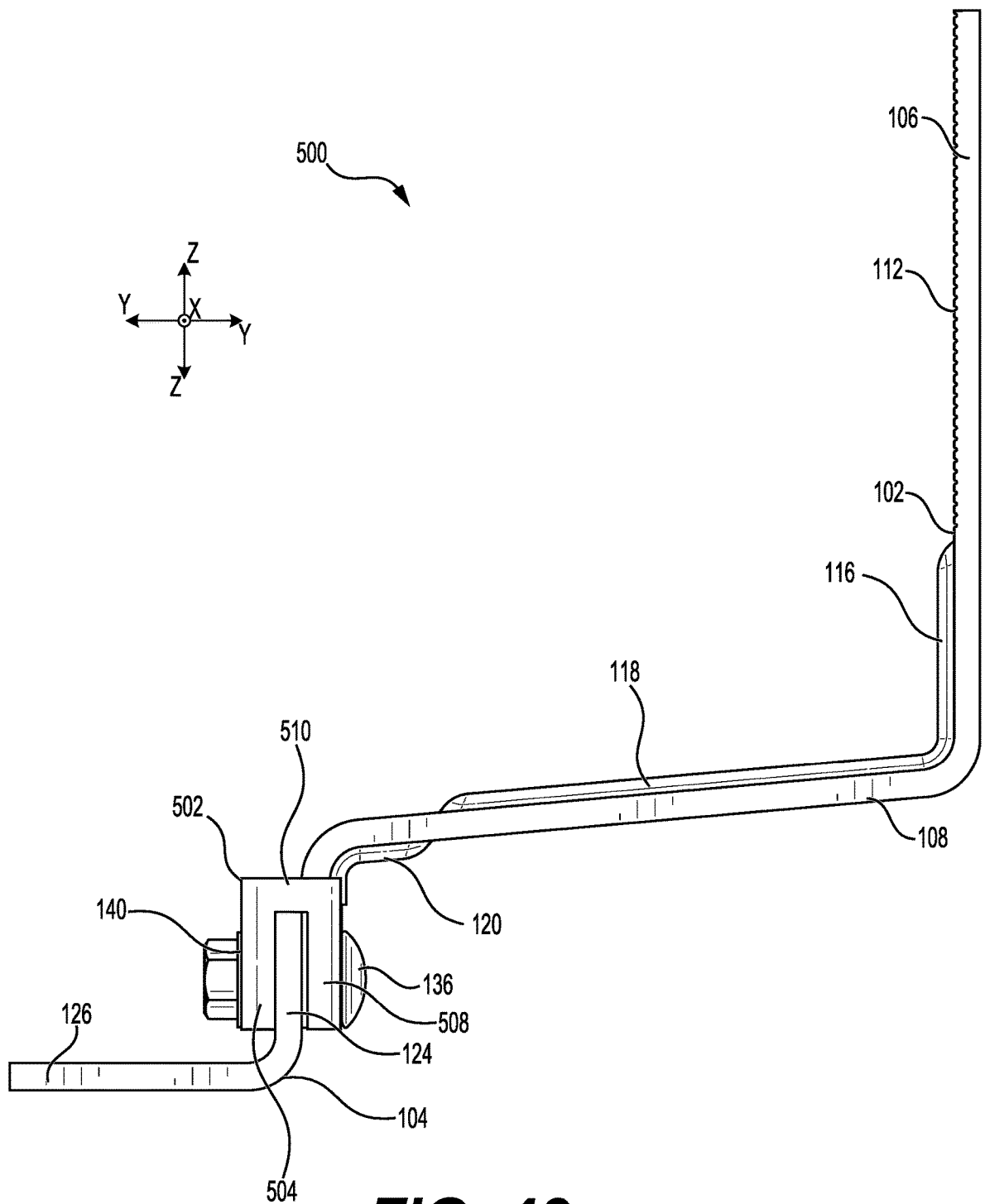
Figure 44:
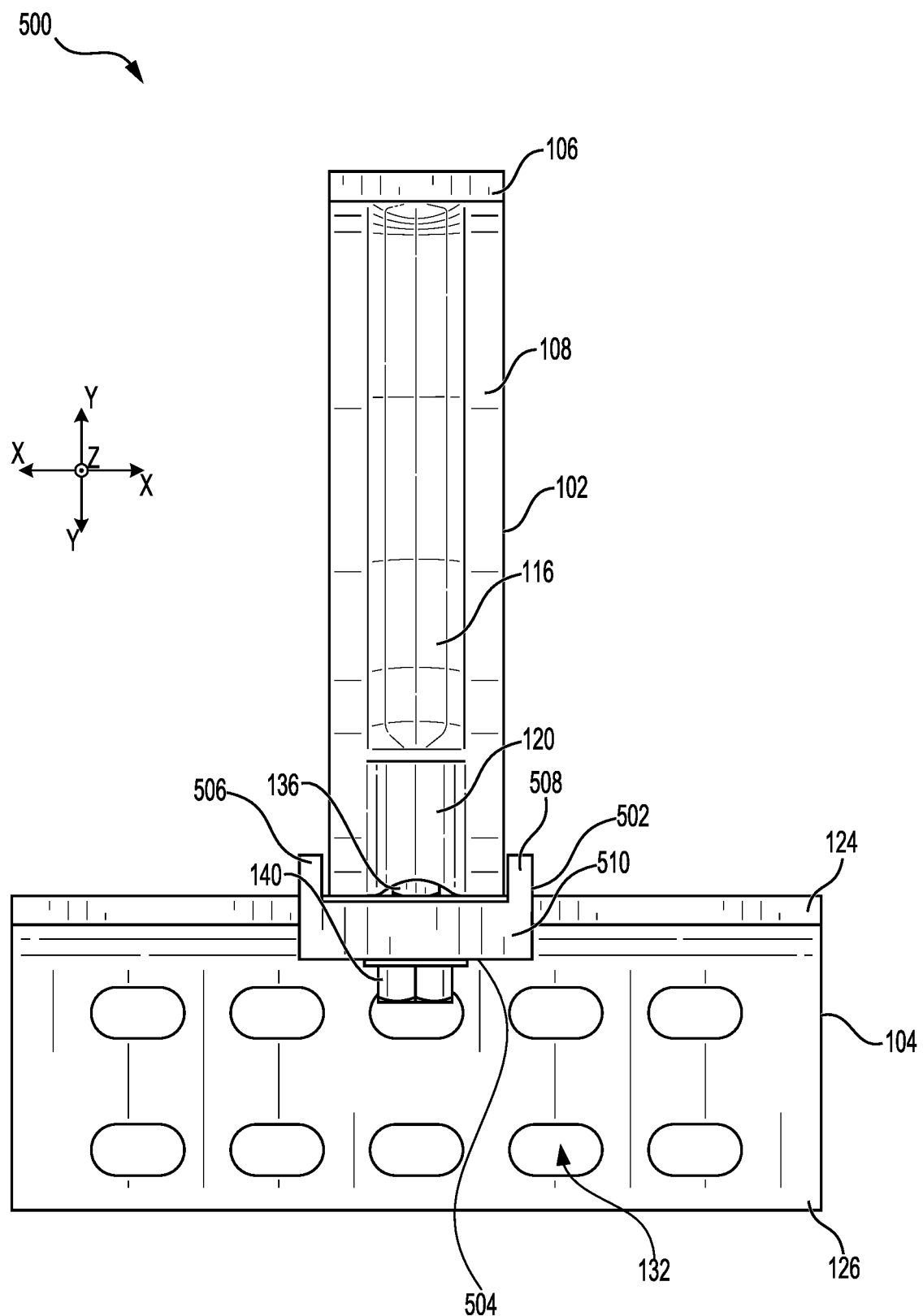
Figure 45:
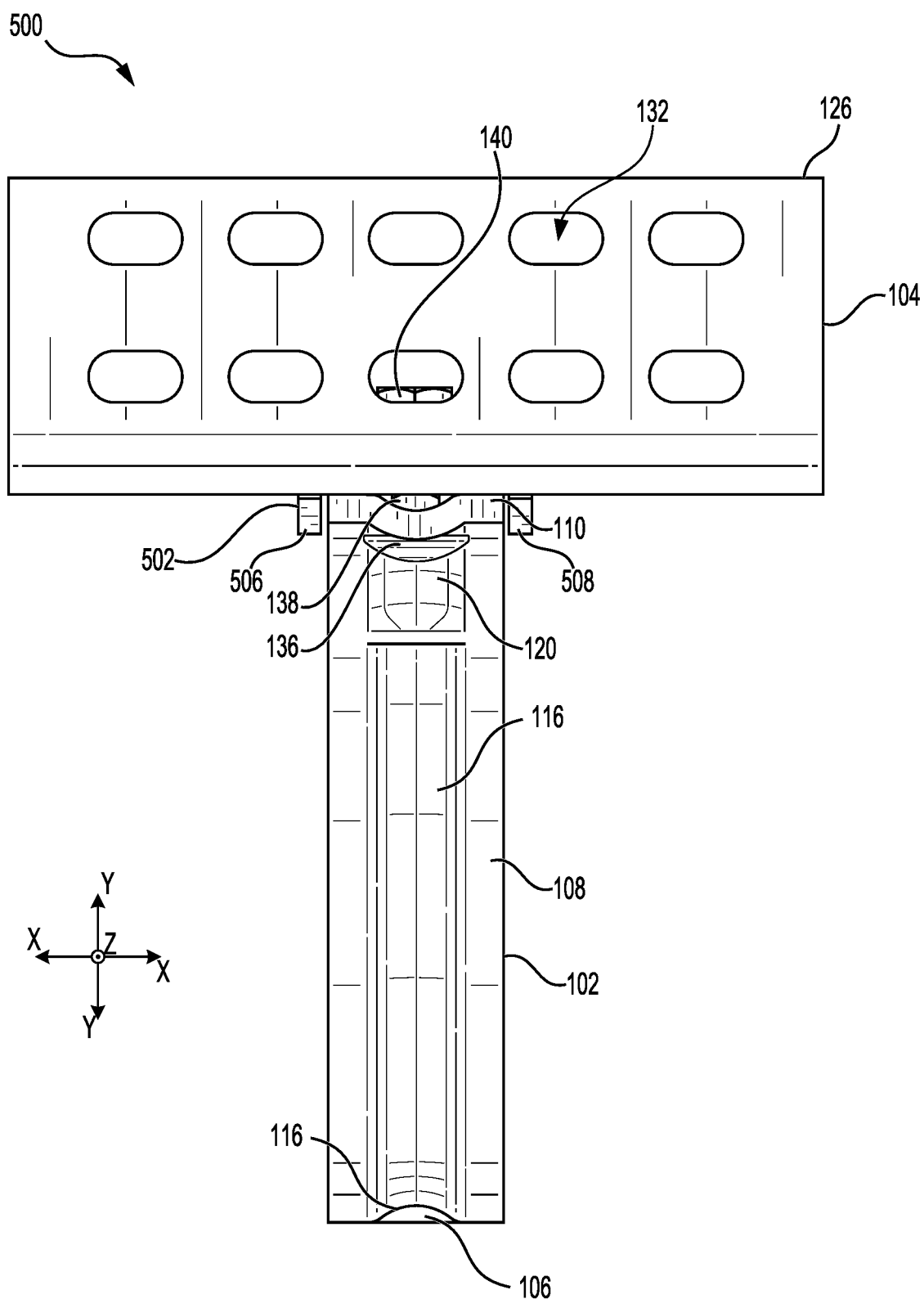

FIGS. 37 through 45 illustrate a mounting device 500 including a u-shaped plate 502 as an anti-rotation system, according to an example of the principles described herein. Again, with the description of FIGS. 1 through 9 provided above detailing common elements of the hook arm 102 and the hook plate 104, the anti-rotation system of the example of FIGS. 37 through 45 will now be described. As to FIGS. 37 through 45, FIG. 37 illustrates a top, front, right-side perspective view of the mounting device 500 including the u-shaped plate 502 as an anti-rotation system, according to an example of the principles described herein. FIG. 38 is a bottom, rear, left-side perspective view thereof. FIG. 39 is a top, front, right-side, exploded, perspective view thereof. FIG. 40 is a front side view thereof. FIG. 41 is a rear side view thereof. FIG. 42 is a right-side view thereof. FIG. 43 is a left-side view thereof. FIG. 44 is a top view thereof. FIG. 45 is a bottom view thereof.

As to the anti-rotation system of the example mounting device 500 of FIGS. 37 through 45, the anti-rotation system may include a u-shaped plate 502 that may be coupled to the vertical portion 124 of the hook plate 104. The u-shaped plate 502 may include a front face 504 monolithically formed with a first arm 506 and a second arm 508. A bridging portion 510 may couple the front face 504 with the first arm 506 and the second arm 508. The bridging portion 510 may separate the front face 504 from the first arm 506 and the second arm 508 such that the first arm 506 and the second arm 508 may run parallel with the front face 504. In this manner, when the u-shaped plate 502 is engaged with the vertical portion 124 of the hook plate 104, the first arm 506 and the second arm 508 may extend down a first side of the vertical portion 124, the front face 504 may extend down a second side of the vertical portion 124, and the bridging portion 510 may seat on top of the vertical portion 124.

The first arm 506 and the second arm 508 may be distanced from one another such that the second vertical portion 110 of the hook arm 102 may seat between the first arm 506 and the second arm 508 when the second vertical portion 110 is engaged with the vertical portion 124 of the hook plate 104. In this manner, the first arm 506 and the second arm 508 of the u-shaped plate 502 function in a manner similar to the raised portion(s) 134 of FIGS. 1 through 9 and FIGS. 28 through 36, and the formed portion (s) 202 of FIGS. 10 through 18 by restricting rotation of the rotation of the hook arm 102 with respect to the hook plate 104.

In an embodiment, the u-shaped plate 502 may include an aperture 512 through which the carriage bolt 136 may be extended. As mentioned above, the apertures 128, 132 defined in the vertical portion 124 of the hook plate 104 may be located at different portions of the vertical portion 124 of the hook plate 104 in order to allow for the hook arm 102 to be coupled to the hook plate 104 at different and various positions along the vertical portion 124. Thus, in an embodiment, the u-shaped plate 502 may be placed on the vertical portion 124 of the hook plate 104 such that the aperture 512 of the u-shaped plate 502 aligns with one of the one or more apertures 128 and central aperture 130. The carriage bolt 136 may be extended through the aperture 122 defined within the second vertical portion 110 of the hook arm 102, the aperture 512 of the u-shaped plate 502, and one of the one or more apertures 128 and central aperture 130. The nut 140 may be engaged with the carriage bolt 136. The u-shaped plate 502 may be engaged with the mounting device 500 along the length of the vertical portion 124 of the hook plate 104 where an aperture 128 or central aperture 132 defined therein may exist including at positions other than those depicted in FIGS. 37 through 45.

The second vertical portion 110 of the hook arm 102 seats between the first arm 506 and the second arm 508 of the u-shaped plate 502. FIGS. 38, 41, 44, and 45 depict the interface between the first arm 506 and the second arm 508 of the u-shaped plate 502 and the second vertical portion 110 of the hook arm 102. In this state, the first arm 506 and the second arm 508 restrict rotation of the hook arm 102 with respect to the hook plate 104. Thus, the first arm 506 and the second arm 508 of the u-shaped plate 502 serve as the anti-rotation system for the example of FIGS. 37 through 45 as they interface with the hook arm 102. Thus, the u-shaped plate 502 serves as the anti-rotation system for the example of FIGS. 28 through 36. Specifically, the u-shaped plate 502 serving as the anti-rotation system for the example of FIGS. 37 through 45 may restrict rotation of the hook arm 102 with respect to the hook plate 104 about the Y-axis as indicated throughout the figures.

Conclusion

The examples described herein provide a mounting device that may be used to mount panels, modules, and arrays of photovoltaic devices to a structure. The mounting device includes an anti-rotation system to restrict rotation of a hook plate of the mounting device relative to a hook arm of the mounting device.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

What is claimed is:

1. A mounting device comprising:
   a hook arm including:
      a first vertical portion;
      a center portion coupled to the first vertical portion at a first end of the center portion; and
      a second vertical portion coupled to the center portion at a second end of the center portion, the second vertical portion including:
         a front surface,
         a rear surface opposite the front surface,
         an aperture extending through the front surface and the rear surface,
         a first side surface extending from the front surface to the rear surface, and
         a second side surface opposite the first side surface, the second side surface extending from the front surface to the rear surface;
   a hook plate couplable to the hook arm at the front surface of the second vertical portion via a fastener, the hook plate including:
      a third vertical portion to engage with the front surface of the second vertical portion of the hook arm; and
      a base portion extending from the third vertical portion, the base portion to couple the hook plate to a surface upon installation; and
   an anti-rotation system to restrict rotation of the hook arm relative to the hook plate, wherein the anti-rotation system is configured to engage with the first side surface of the second vertical portion and the second side surface of the second vertical portion.

2. The mounting device of claim 1, wherein the anti-rotation system includes at least one raised portion formed on the third vertical portion adjacent to the second vertical portion of the hook arm, the at least one raised portion abutting against one of the first side surface or the second side surface of the second vertical portion along at least a portion of a length of the second vertical portion.

3. The mounting device of claim 1, wherein the anti-rotation system includes at least one formed portion along a length of the third vertical portion of the hook plate, the at least one formed portion abutting against one of the first side surface or the second side surface of the second vertical portion along at least a portion of a length of the second vertical portion.

4. The mounting device of claim 1, wherein the center portion is horizontal with respect to the first vertical portion and the second vertical portion.

5. The mounting device of claim 1, further comprising at least one arched indent formed along at least a portion of a center line of at least one of the first vertical portion, the center portion, or the second vertical portion.

6. The mounting device of claim 5, comprising:
   a first arched indent formed on the center portion; and
   a second arched indent formed on the second vertical portion, the second arched indent being deflected in an opposite direction with respect to the first arched indent.

7. The mounting device of claim 1, further comprising at least one aperture formed on the base portion.

8. The mounting device of claim 1, wherein the first vertical portion includes at least one of a textural feature formed on at least one side of the first vertical portion, an aperture defined in the first vertical portion, or combinations thereof.

9. A mounting device comprising:
   a hook arm having a vertical portion, the vertical portion including:
      a front surface,
      a rear surface opposite the front surface, the rear surface configured to engage with a fastener, and
      a side surface extending from the front surface to the rear surface;
   a hook plate couplable to the front surface of the vertical portion of the hook arm; and
   an anti-rotation system to restrict rotation of the hook plate relative to the hook arm, wherein the anti-rotation system is configured to engage with the side surface of the vertical portion.

10. The mounting device of claim 9, wherein:
   the hook arm further includes:
      a center portion coupled to the vertical portion at a first end of the center portion; and
      a second vertical portion coupled to the center portion at a second end of the center portion; and
   the hook plate being coupled to the front surface of the vertical portion of the hook arm at the vertical portion via a fastener, the hook plate including:
      a third vertical portion; and
      a base portion to couple the hook plate to a surface upon installation.

11. The mounting device of claim 9, wherein the anti-rotation system includes at least one raised portion formed on a third vertical portion of the hook plate adjacent to the vertical portion of the hook arm, the at least one raised portion abutting the side surface of the vertical portion along at least a portion of a length of the vertical portion.

12. The mounting device of claim 9, wherein the anti-rotation system includes at least one formed portion along a length of a third vertical portion of the hook plate, the at least one formed portion configured to abut against the side surface of the vertical portion of the hook arm along at least a portion of a length of the vertical portion.

13. The mounting device of claim 9, further comprising at least one arched indent formed along at least a portion of a center line of at least one of a first vertical portion, a center portion, or a second vertical portion of the hook arm.

14. The mounting device of claim 9, wherein a first vertical portion of the hook arm includes at least one of a textural feature formed on at least one side of the first vertical portion, an aperture defined in the first vertical portion, or combinations thereof.

15. A mounting device comprising:
   a hook arm including:
      a first vertical portion,
      a center portion coupled to the first vertical portion at a first end of the center portion,
      a second vertical portion coupled to the center portion at a second end of the center portion,
      a first arched indent formed along at least a portion of a center line of the center portion, and
      a second arched indent formed on the second vertical portion, the second arched indent being deflected in an opposite direction with respect to the first arched indent;
   a hook plate coupled to the hook arm at the second vertical portion via a fastener, the hook plate including:
      a third vertical portion configured to attach to the hook arm, and a base portion to couple the hook plate to a surface upon installation; and an anti-rotation system to restrict rotation of the hook arm relative to the hook plate.

16. The mounting device of claim 15, wherein the anti-rotation system includes at least one raised portion formed on the third vertical portion adjacent to the second vertical portion of the hook arm, the at least one raised portion abutting an edge of the second vertical portion along at least a portion of a length of the second vertical portion.

17. The mounting device of claim 15, wherein the anti-rotation system includes at least one formed portion along a length of the third vertical portion of the hook plate, the at least one formed portion abutting an edge of the second vertical portion along at least a portion of a length of the second vertical portion.

18. The mounting device of claim 15, wherein the center portion is horizontal with respect to the first vertical portion and the second vertical portion.

19. The mounting device of claim 15, further comprising at least one aperture formed on the base portion.

20. The mounting device of claim 15, wherein the first vertical portion includes at least one of a textural feature formed on at least one side of the first vertical portion, an aperture defined in the first vertical portion, or combinations thereof.

* * * * *